(12) United States Patent
Nagamasa et al.

(10) Patent No.: US 8,860,841 B2
(45) Date of Patent: Oct. 14, 2014

(54) CAMERA CONTROL APPARATUS, CAMERA CONTROL METHOD, AND CAMERA SYSTEM

(71) Applicant: Canon Kabushiki Kaisha, Tokyo (JP)

(72) Inventors: Yoshinobu Nagamasa, Kawasaki (JP); Junya Masaki, Kawasaki (JP); Toshiyuki Fukui, Yokohama (JP); Hiroki Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/939,277

(22) Filed: Jul. 11, 2013

(65) Prior Publication Data

US 2013/0300892 A1    Nov. 14, 2013

Related U.S. Application Data

(63) Continuation of application No. 12/330,383, filed on Dec. 8, 2008, now Pat. No. 8,493,467.

(30) Foreign Application Priority Data

Dec. 11, 2007 (JP) .................................. 2007-320065
Dec. 11, 2007 (JP) .................................. 2007-320066

(51) Int. Cl.
| | |
|---|---|
| *H04N 9/73* | (2006.01) |
| *H04N 5/247* | (2006.01) |
| *H04N 9/68* | (2006.01) |
| *H04N 5/232* | (2006.01) |
| *H04N 5/222* | (2006.01) |

(52) U.S. Cl.
CPC ............... *H04N 9/735* (2013.01); *H04N 5/247* (2013.01); *H04N 9/68* (2013.01); *H04N 5/23206* (2013.01); *H04N 5/222* (2013.01)
USPC ........................................................ 348/223.1

(58) Field of Classification Search
USPC ........................................................ 348/223.1
See application file for complete search history.

(56) References Cited

U.S. PATENT DOCUMENTS

| | | | |
|---|---|---|---|
| 4,626,893 | A | 12/1986 | Yamanaka |
| 6,256,062 | B1 | 7/2001 | Endo |

(Continued)

FOREIGN PATENT DOCUMENTS

| | | |
|---|---|---|
| JP | 08-102936 A | 4/1996 |
| JP | 10-327427 A | 12/1998 |

(Continued)

OTHER PUBLICATIONS

Japanese Office Action issued on Sep. 21, 2012 in corresponding application No. 2007-320065.

(Continued)

*Primary Examiner* — James Hannett

(74) *Attorney, Agent, or Firm* — Carter, DeLuca, Farrell & Schmidt, LLP

(57) ABSTRACT

A camera control apparatus comprises a processor adapted to control a display to display a plurality of sensed images respectively obtained from a plurality of cameras and a transmitter adapted to transmit a command to control another camera to execute color adjustment based on an image signal of a reference region of an image of a reference camera of the images displayed as a list by the processor.

18 Claims, 44 Drawing Sheets

(56) References Cited

U.S. PATENT DOCUMENTS

| | | |
|---|---|---|
| 6,618,079 B1 | 9/2003 | Higuchi |
| 7,133,071 B2 | 11/2006 | Takeuchi |
| 7,385,633 B2 | 6/2008 | Takeuchi |
| 2008/0122949 A1* | 5/2008 | Kindborg et al. ........ 348/231.99 |
| 2008/0211934 A1 | 9/2008 | Takeuchi |

FOREIGN PATENT DOCUMENTS

| | | |
|---|---|---|
| JP | 2001-320717 A | 11/2001 |
| JP | 2002-010275 A | 1/2002 |
| JP | 2002-135789 A | 5/2002 |
| JP | 2002-271825 A | 9/2002 |
| JP | 2003-061103 A | 2/2003 |
| JP | 2004-088247 A | 3/2004 |
| JP | 2004-221637 A | 8/2004 |
| JP | 2004-349951 A | 12/2004 |
| JP | 2006-114995 A | 4/2006 |

OTHER PUBLICATIONS

Japanese Office Action issued on Sep. 21, 2012 in corresponding application No. 2007-320066.

* cited by examiner

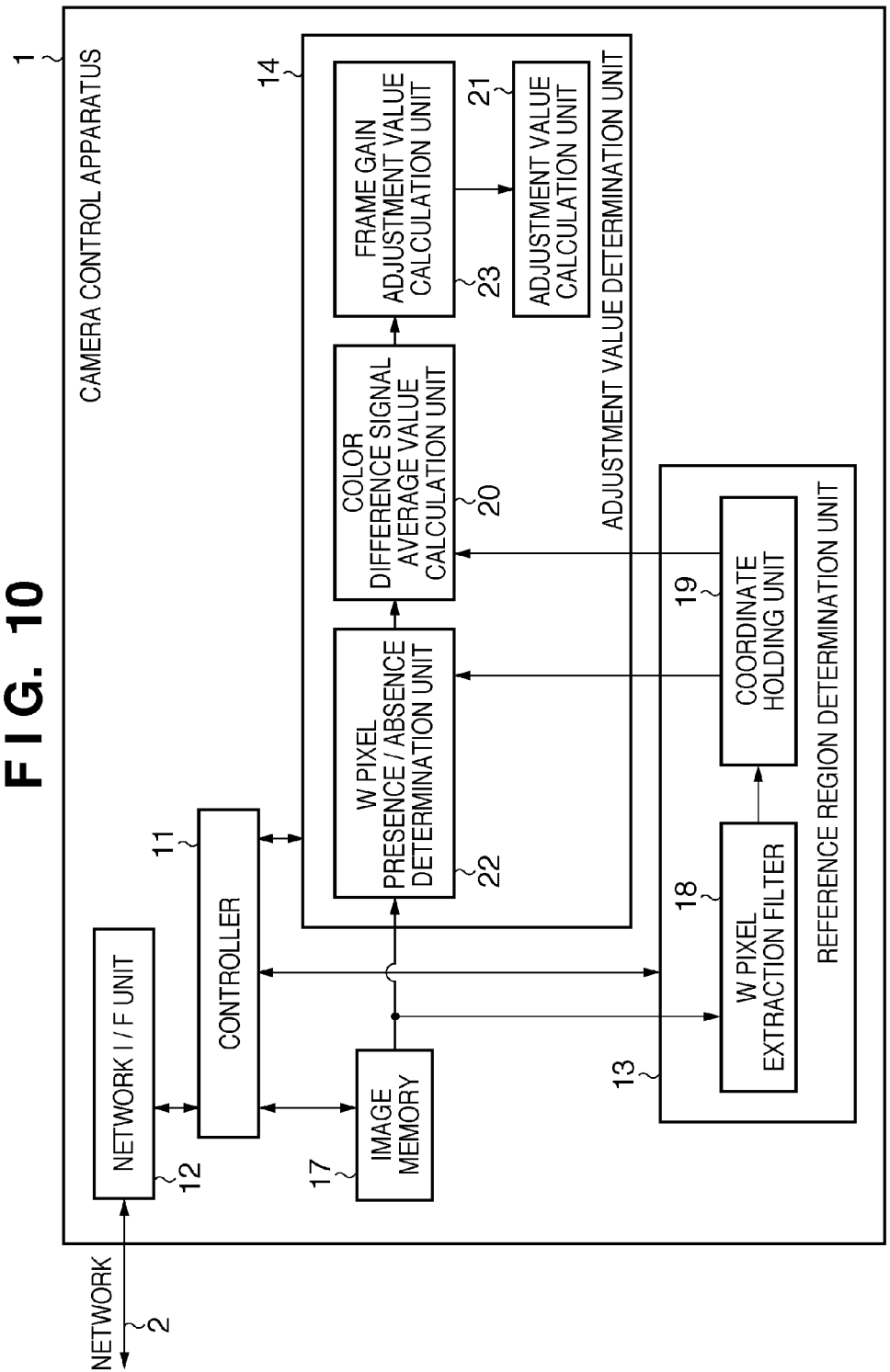

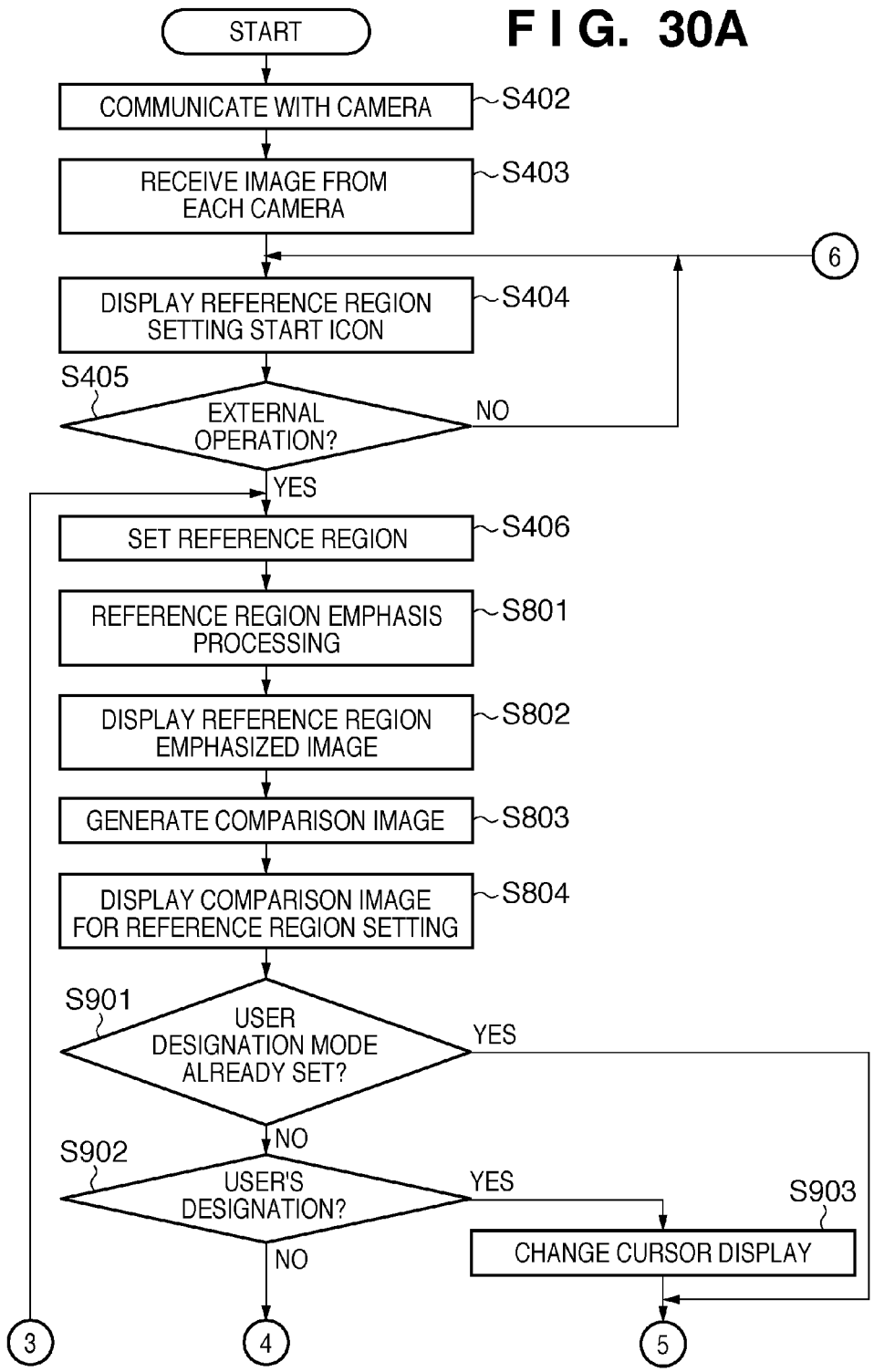

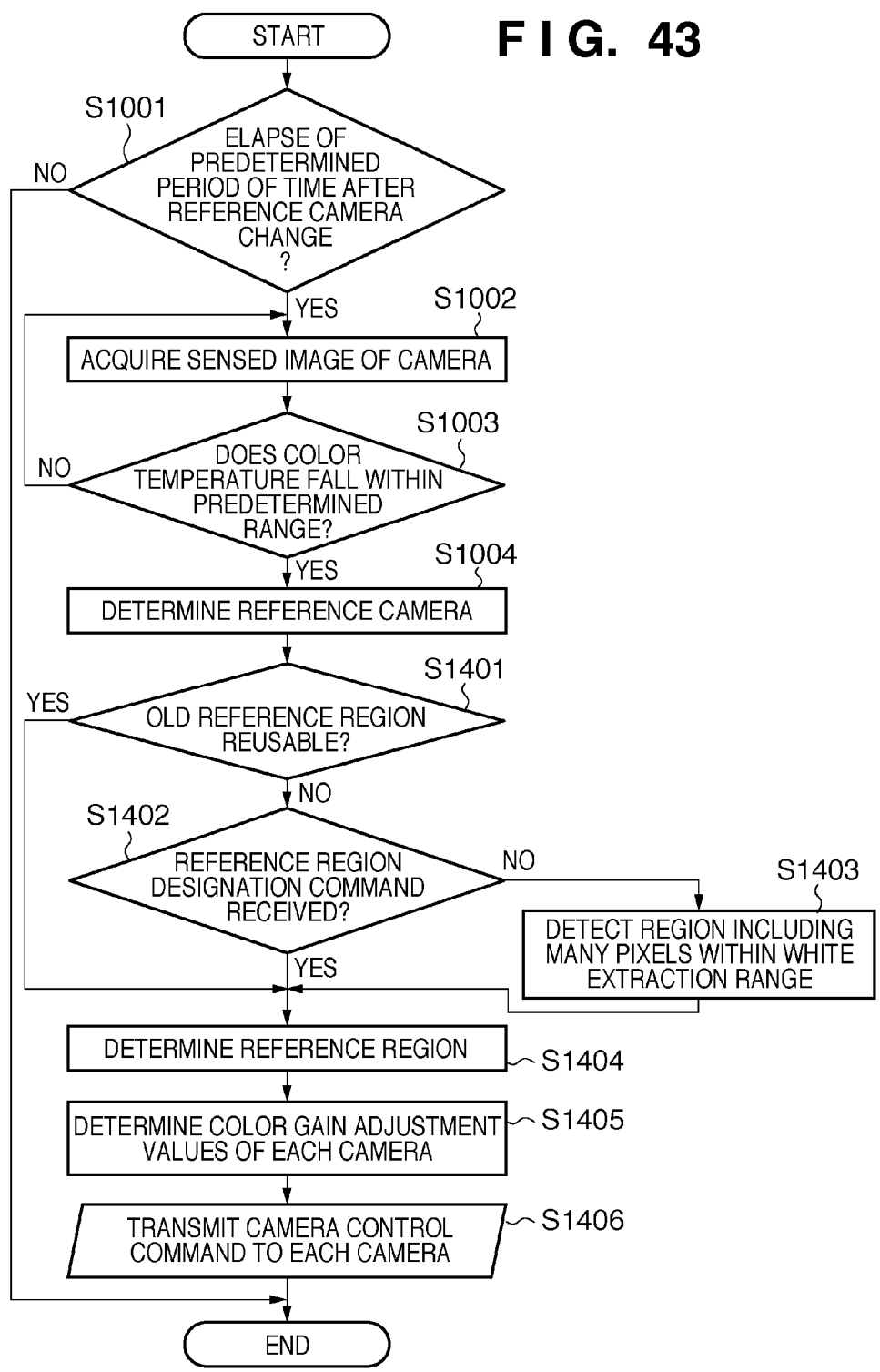

CAMERA CONTROL APPARATUS, CAMERA CONTROL METHOD, AND CAMERA SYSTEM

CROSS REFERENCE TO RELATED APPLICATIONS

This application is a continuation of U.S. patent application Ser. No. 12/330,383, filed Dec. 8, 2008, which claims the benefit of and priority to Japanese Patent Application No. 2007-320065 filed Dec. 11, 2007 and Japanese Patent No. 2007-320066 filed Dec. 11, 2007, the entire contents of each of which are hereby incorporated by reference herein in their entirety.

BACKGROUND OF THE INVENTION

1. Field of the Invention

The present invention relates to an image processing technique for displaying images of a plurality of cameras connected via a network.

2. Description of the Related Art

Conventionally, a camera system which simultaneously displays, on a display apparatus, a plurality of still images and movies (to be referred to as images hereinafter) sensed by a plurality of digital still cameras and digital video cameras (to be referred to as cameras hereinafter) connected via a network is available. In this camera system, each individual camera executes auto white balance (AWB) control and the like of a sensed image.

The AWB processing detects a white (achromatic) part of image data obtained by an image sensing element, and calculates a color temperature of an illumination light source with respect to an object in a sensed image based on the detection result (white part). Then, the processing multiplies image data obtained by the image sensing element by a color adjustment value (a control value used to set an object region of the white part in an achromatic color) according to the color temperature.

Note that Japanese Patent Laid-Open No. 2002-135789 discloses the following technique. That is, when a plurality of cameras sense images of an identical object, correction data required to match with reference data is calculated so as to set nearly equivalent colors of images, and images of the respective cameras are corrected based on the correction data.

Japanese Patent Laid-Open No. 2002-271825 and Japanese Patent Laid-Open No. 2004-349951 disclose a technique for sharing a reference color temperature so as to control the AWB processing of a plurality of cameras under the same color temperature.

Japanese Patent Laid-Open No. 2004-221637 describes a technique for presenting a reference candidate region required to determine a color adjustment value associated with AWB control in a sensed image in a digital camera.

In the conventional system, when each individual camera executes AWB processing, and a sensed image of that camera is individually displayed, the user may hardly feel unnatural about the color reproducibility of the image. However, when a plurality of sensed images of respective cameras are simultaneously displayed parallel to each other, the user may feel unnatural due to differences of color reproducibility among the plurality of cameras.

In Japanese Patent Laid-Open No. 2002-135789 above, for example, in an environment in which an image sensing range changes from a sunny area to a shaded area along with an elapse of time and a color temperature changes accordingly, such change in environment is not reflected, a region which is the same as the reference data has color reproducibility of the reference data, and the remaining region has unnatural color reproducibility. When the user arbitrarily determines white for different objects in place of an identical object to fail color adjustment of those objects, and arranges a plurality of cameras which do not sense an identical object, correction cannot be made.

When the color temperature is shared as in Japanese Patent Laid-Open No. 2002-271825, unnatural color reproducibility is obtained in at least one setting environment among sensed images by cameras having different setting environments like indoors and outdoors, and follow light and back light.

In Japanese Patent Laid-Open No. 2004-221637, since priority levels of extracted candidate regions are displayed, when numbers indicating the priority levels of candidate regions, frames, and the like are simultaneously displayed on a single screen, the user hardly visually recognizes the color of a desired region, thus impairing operability. When the priority numbers of regions, frames, and the like are merely displayed on the single screen at the same time, it is difficult for the user to compare the colors of a plurality of regions. Hence, the operability upon region settings often impairs.

Also, when a plurality of images received from a plurality of cameras are displayed on a single screen via a network, the number of candidate regions to be displayed becomes large, thus further impairing the operability.

SUMMARY OF THE INVENTION

The present invention has been made in consideration of the aforementioned problems, and attains a technique which can eliminate unnatural feeling of the user by reducing color reproducibility differences among a plurality of images sensed by a plurality of cameras when these images are simultaneously displayed on a display apparatus.

The present invention attains a technique which improves operability upon setting a reference candidate region for color adjustment.

In order to solve the aforementioned problems, there is provided a camera control apparatus comprising a processor adapted to control a display to display a plurality of sensed images respectively obtained from a plurality of cameras and a transmitter adapted to transmit a command to control another camera to execute color adjustment based on an image signal of a reference region of an image of a reference camera of the images displayed as a list by the processor.

There is also provided a camera system in which a plurality of cameras each having a color adjustment unit adapted to perform color adjustment of a sensed image, and a camera control apparatus are connected via a network, the camera control apparatus comprising a reception unit adapted to receive sensed images from the plurality of cameras, a camera designation unit adapted to designate, from the plurality of cameras, a reference camera used as a color reference for the plurality of sensed images received from the plurality of cameras, a reference region determination unit adapted to determine a reference region, which should include an equivalent color among the plurality of sensed images received from the plurality of cameras, in the sensed image received from the reference camera, an adjustment value determination unit adapted to determine a color adjustment value for another camera based on a color of the reference region of the sensed image of the reference camera and a color of a region corresponding to the reference region in a sensed image of the other camera and a transmitter adapted to transmit the color adjustment value and a command to control the color adjustment unit to execute color adjustment based on the color adjustment value to the other camera via the network, and each of the plurality of cameras comprising a transmitter adapted to transmit a sensed image to the camera control apparatus via the network, wherein the color adjustment unit executes color adjustment based on the color adjustment value and the command to control to execute the color adjustment received from the camera control apparatus via the network.

There is also provided a camera control method of controlling a plurality of cameras, each having a color adjustment unit adapted to execute color adjustment of a sensed image, via a network, the method comprising a reception step of receiving sensed images from the plurality of cameras, a camera designation step of designating, from the plurality of cameras, a reference camera used as a color reference for the plurality of sensed images received from the plurality of cameras, a reference region determination step of determining a reference region, which should include an equivalent color among the plurality of sensed images received from the plurality of cameras, in the sensed image received from the reference camera, an adjustment value determination step of determining a color adjustment value for another camera based on a color of the reference region of the sensed image of the reference camera and a color of a region corresponding to the reference region in a sensed image of the other camera and a transmission step of transmitting the color adjustment value and a command to control the color adjustment unit to execute color adjustment based on the color adjustment value to the other camera via the network.

According to the present invention, upon simultaneously displaying images sensed by a plurality of cameras on a display apparatus, color reproducibility differences among images are reduced, thus eliminating the user's feeling of unnaturalness.

Also, the operability upon setting a reference candidate region for color adjustment can be improved.

Further features of the present invention will become apparent from the following description of exemplary embodiments with reference to the attached drawings.

BRIEF DESCRIPTION OF THE DRAWINGS

FIG. 10 is a block diagram showing the arrangement of a camera control apparatus according to the fourth embodiment;

FIGS. 30A and 30B are flowcharts showing image display processing by a system according to the 12th Embodiment;

FIG. 43 is a flowchart showing an example upon implementing the 13th to 17th embodiments by programs.

DESCRIPTION OF THE EMBODIMENTS

Exemplary embodiments of the present invention will be described in detail hereinafter with reference to the accompanying drawings.

Note that embodiments to be described hereinafter are implementation examples of the present invention, and are to be modified or changed depending on the arrangements of apparatuses and various conditions to which the present invention is applied. Hence, the present invention is not limited to the following embodiments.

Figure 1:
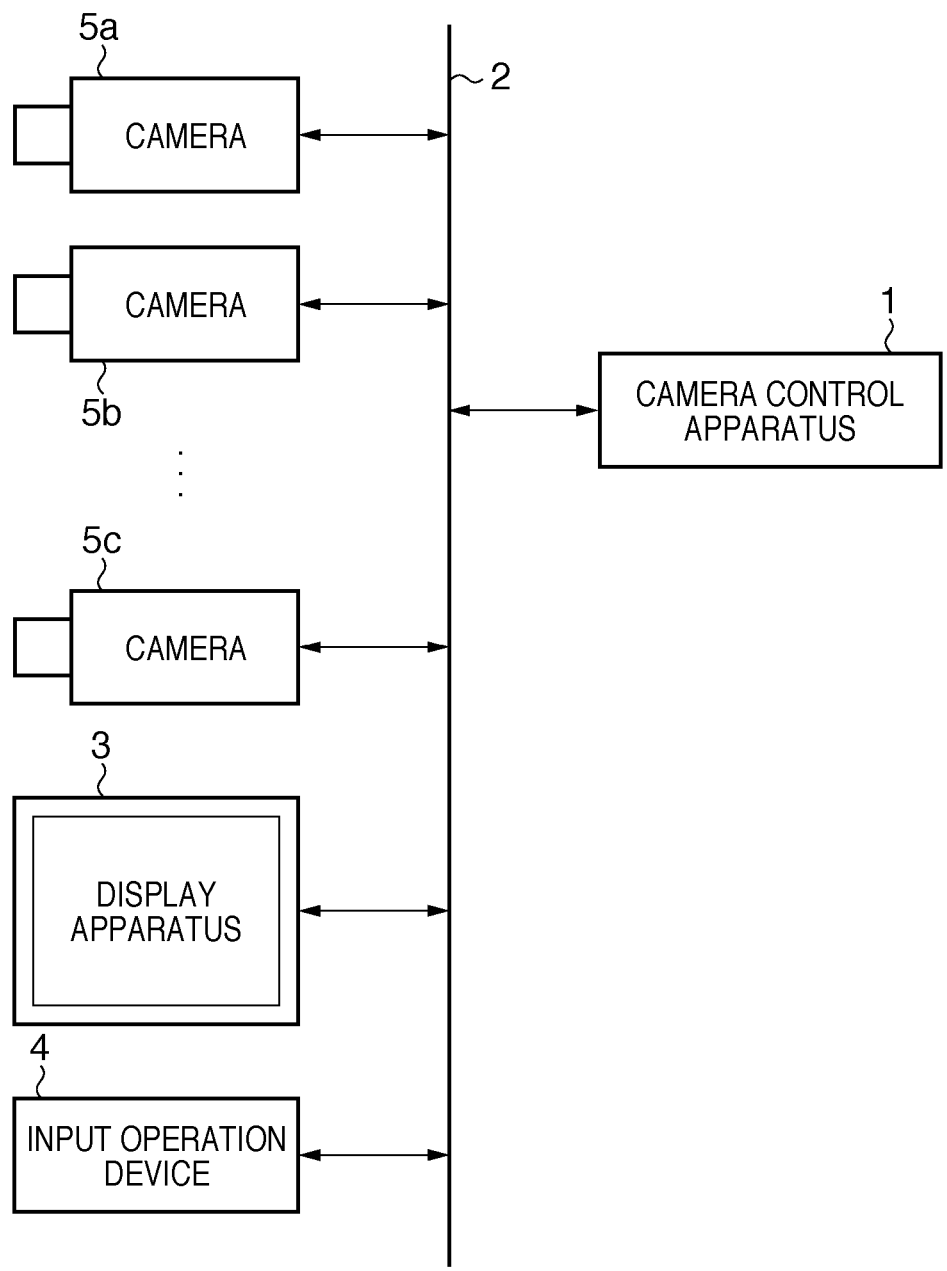
FIG. 1 is a block diagram showing the arrangement of a camera system having a camera control apparatus according to the first embodiment.
Figure 2:
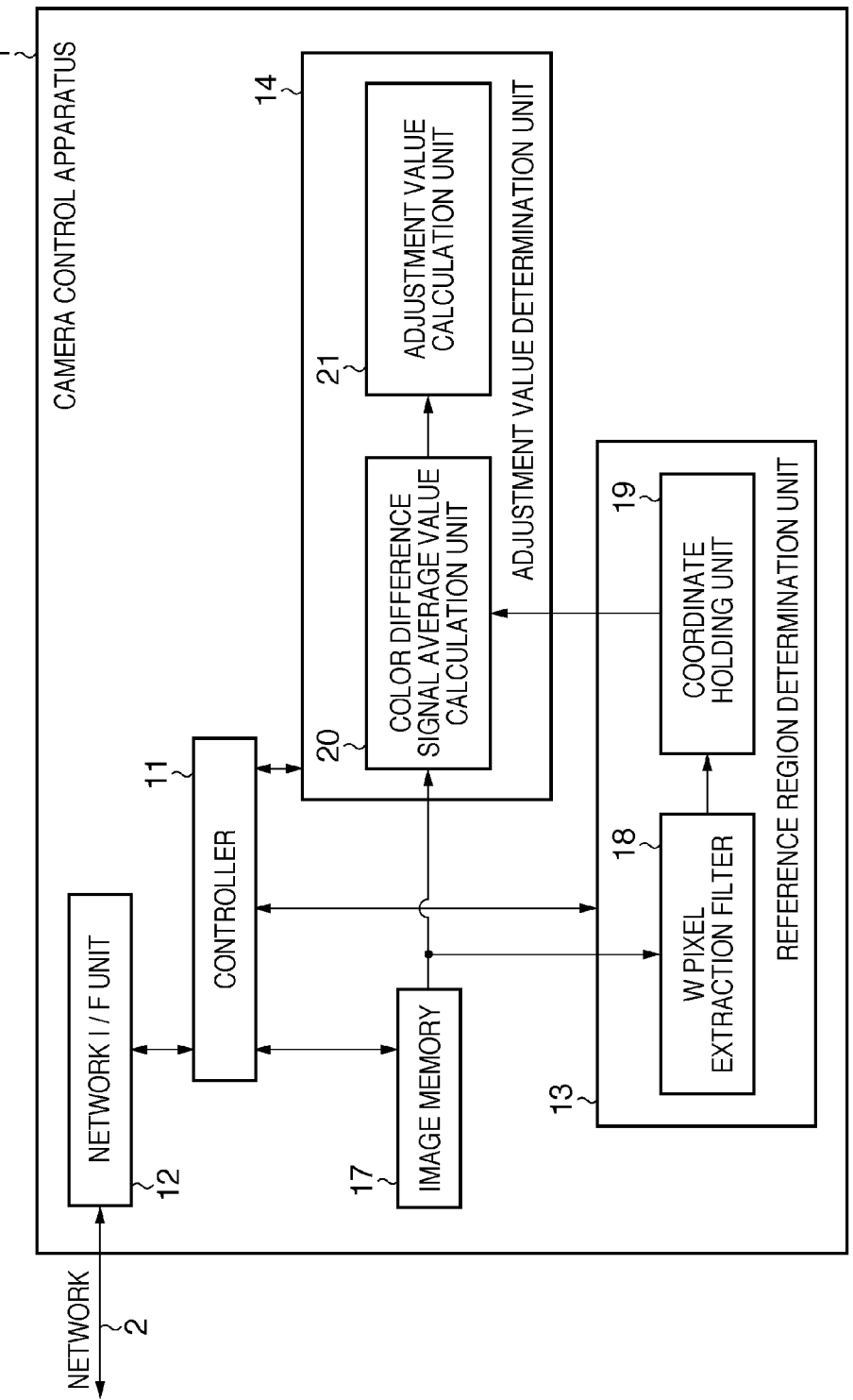
FIG. 2 is a block diagram showing the arrangement of the camera control apparatus according to the first embodiment.

A first embodiment of the present invention will be described below referring to the drawings. FIG. 1 is a block diagram showing the arrangement of a camera system having a camera control apparatus according to the first embodiment. FIG. 2 is a block diagram showing the arrangement of the camera control apparatus of this embodiment.

Referring to FIG. 1, cameras 5a to 5c are digital still cameras, digital video cameras, and the like having a function that allows communications via a network 2. In this embodiment, the number of cameras is three, but the present invention is not limited to such specific number of cameras.

The network 2 is a communication line which comprises a general-purpose network such as a Local Area Network (LAN) or a dedicated line, and can be used in communications.

A display apparatus 3 comprises a display device having a CRT, LCD, or the like, and receives and displays data of images sensed by the cameras 5a to 5c via the network 2. This display apparatus 3 may be implemented by a display device of a personal computer (PC) which allows communications via the network 2.

An input operation device 4 is a device with which the user operates a camera control apparatus 1 and display apparatus 3. The input operation device 4 may be implemented by a keyboard, buttons, mouse, remote controller, or the like, or may be implemented by a touch panel and may be integrated with the display apparatus 3. Also, the input operation device 4 may be implemented by a keyboard of a PC.

The camera control apparatus 1, cameras 5a to 5c, display apparatus 3, and input operation device 4 are connected to be able to communicate with each other via the network 2.

Note that a system of operation signals output from the input operation device 4 to the camera control apparatus 1 and display apparatus 3 may be any of a wired communication system, wireless communication system, and optical communication system, and it is not particularly limited.

The arrangement of the camera control apparatus 1 will be described below with reference to FIG. 2.

A controller 11 comprises a CPU (Central Processing Unit) which controls the camera control apparatus 1, and a ROM, RAM, and the like as memories which store programs required for the operations of the CPU.

A network interface unit (to be referred to as a network I/F unit hereinafter) 12 receives images from the cameras 5a to 5c, stores them in an image memory 17, and transmits the received images to the display apparatus 3 connected to the network 2.

Furthermore, the network I/F unit 12 receives a camera designation command, reference region designation command, and camera control command as control commands transmitted from the input operation device 4 which is equipped near the display apparatus 3.

The camera designation command is a command that designates a camera (reference camera) which senses an image which is to be used as a reference of color reproducibility. The user visually confirms images which are sensed by the cameras 5a to 5c and are displayed on the display apparatus 3 connected to the network 2, and transmits the camera designation command by operating the input operation device 4 equipped near the display apparatus 3.

The reference region designation command is a command that designates a white or achromatic region where equivalent color reproducibility is to be set for each of images of the respective cameras. The user visually confirms images which are sensed by the cameras 5a to 5c and are displayed on the display apparatus 3 connected to the network 2, and transmits camera determination reference information and the reference region designation command by operating the input operation device 4 equipped near the display apparatus 3. Assume that the camera 5a is designated by the camera designation command.

A reference region determination unit 13 comprises a W pixel extraction filter 18 and coordinate holding unit 19. When the reference region designation command is received, the reference region determination unit 13 determines a region designated by the reference region designation command on each of images sensed by the cameras 5a to 5c as a reference region of each camera, and holds the coordinate information of the region in the coordinate holding unit 19.

On the other hand, when the reference region designation command is not received, the reference region determination unit 13 extracts, using the W pixel extraction filter 18, a region including pixels (to be referred to as W pixels hereinafter) as many as the predetermined number of pixels or more within a color difference range of a white extraction range W shown in FIG. 5 from each of images sensed by the cameras 5a to 5c, and holds the coordinate information of the region in the coordinate holding unit 19.

An adjustment value determination unit 14 comprises a color difference signal average value calculation unit 20 and adjustment value calculation unit 21. After the reference region is determined, the adjustment value determination unit 14 calculates a color adjustment value according to the flowchart of FIG. 4.

The color difference signal average value calculation unit 20 calculates average values (Ba, Ra) of color difference signals (B−Y, R−Y) of W pixels included in the reference region of the camera 5a (S101).

The color difference signal average value calculation unit 20 calculates average values (Bb, Rb) of color difference signals (B−Y, R−Y) of W pixels included in the reference region of the camera 5b before adjustment (S102).

The adjustment value calculation unit 21 calculates a B gain adjustment value (Ba−Bb) and R gain adjustment value (Ra−Rb) from these values (S103).

The adjustment value determination unit 14 determines these B and R gain adjustment values as color gain adjustment values used to approximate W pixels included in the reference regions of the cameras 5a and 5b (S104).

The camera control apparatus 1 transmits, via the network I/F unit 12, a camera control command that requests to change AWB control based on the color gain adjustment values including these B and R gain adjustment values to the camera 5b (S105).

The color difference signal average value calculation unit 20 calculates average values (Bc, Rc) of color difference signals (B−Y, R−Y) of W pixels included in the reference region of the camera 5c before adjustment (S106).

The adjustment value calculation unit 21 calculates a B gain adjustment value (Ba−Bc) and R gain adjustment value (Ra−Rc) from these values (S107).

The adjustment value determination unit 14 determines these B and R gain adjustment values as color gain adjustment values used to approximate W pixels included in the reference regions of the cameras 5a and 5c (S108).

The camera control apparatus 1 transmits, via the network I/F unit 12, a camera control command that requests to change AWB control based on the color gain adjustment values including these B and R gain adjustment values to the camera 5c (S109).

In the description of the above example, the color gain adjustment values are calculated from the average values of the color difference signals of W pixels included in the reference regions. Alternatively, the color gain adjustment values may be calculated based on mode values of the color difference signals of W pixels included in the reference regions or the color difference signals of specific W pixels included in the reference regions.

In the description of the above example, after the camera control command is transmitted to the camera 5b, the color gain adjustment values of the camera 5c are determined, and the camera control command is transmitted to the camera 5c. Alternatively, after the color gain adjustment values of the cameras 5b and 5c are determined, the camera control commands may be transmitted to the cameras 5b and 5c.

Also, the arrangement that commonly uses the reference region of the camera 5a so as to calculate the color gain adjustment values of the two cameras 5b and 5c has been explained. However, different reference regions may be used upon calculation of the color gain adjustment values of the cameras 5b and 5c.

After the camera control apparatus 1 transmits the camera control commands, the cameras 5b and 5c that received the camera control commands change the AWB control based on the color gain adjustment values. These color gain adjustment values may be continuously used as offset values of the AWB control of the cameras 5b and 5c.

In this embodiment, the controller 11, reference region determination unit 13, and adjustment value determination unit 14 have been described as independent components. However, all or some of these components may be mounted on an LSI together to provide a component having equivalent functions.

The arrangement that receives the reference region designation command has been explained. Alternatively, the reference region determination unit 13 may always determine regions including the predetermined number of W pixels from images sensed by the cameras 5a to 5c as reference regions of these cameras.

In the above description, the reference region determination unit 13 has a function of determining regions including the predetermined number of W pixels from images sensed by the cameras 5a to 5c as reference regions of these cameras. However, the reference region determination unit 13 may not have this function. That is, a region designated by the reference region designation command may always be determined as a reference region of each camera.

The arrangement and operation of the cameras 5a to 5c will be described below with reference to FIG. 3.

Figure 3:
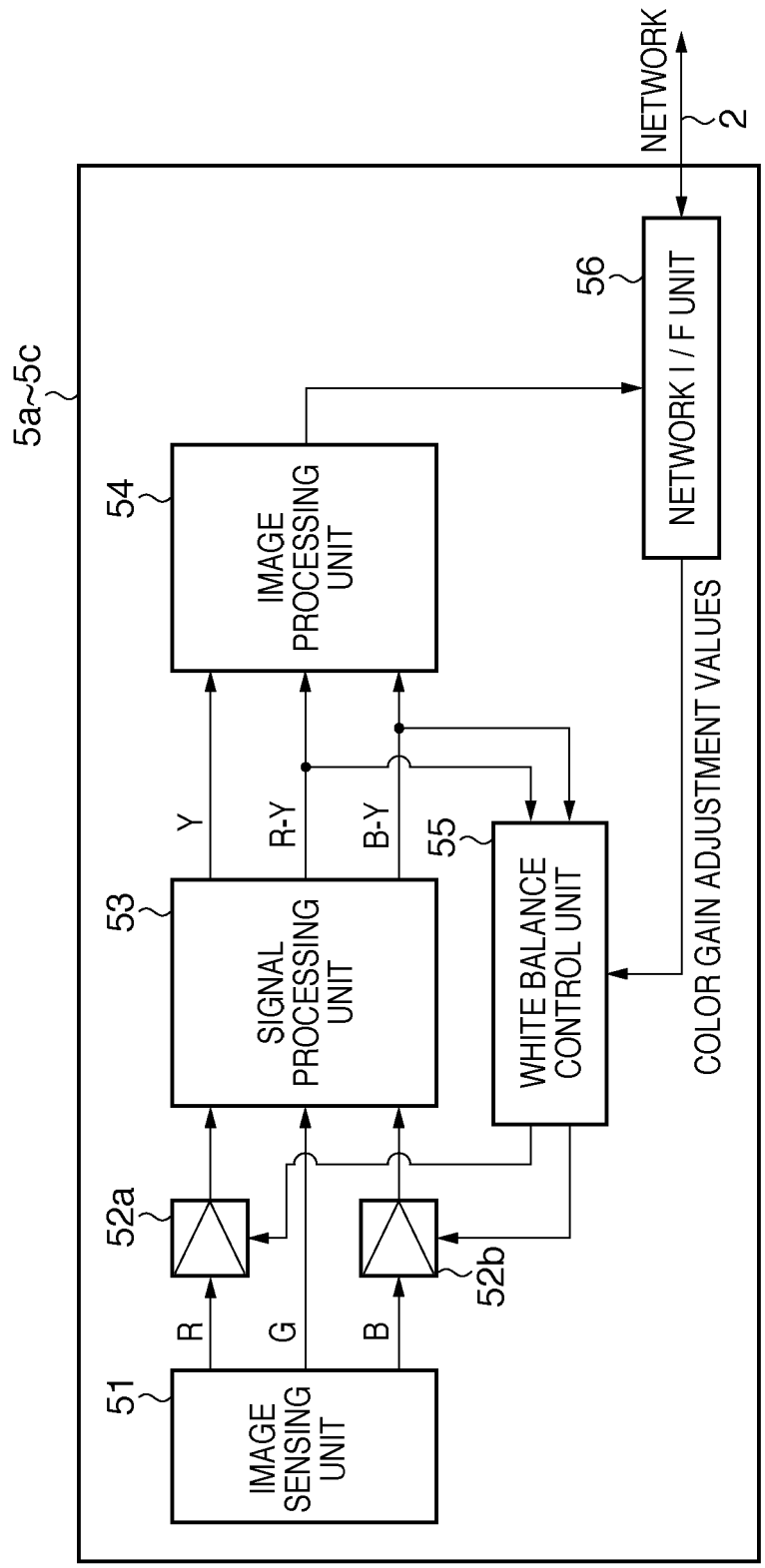
FIG. 3 is a block diagram showing the arrangement of a camera according to the first embodiment.

FIG. 3 is a block diagram showing the arrangement of the cameras 5a to 5c having a WB adjustment function.

An image sensing unit 51 including an image sensing element such as a CCD, CMOS, or the like converts an optical image of an object into electrical signals. In this embodiment, for example, electrical signals are extracted as R, G, and B color signals.

Gain control amplifiers 52a and 52b control the gains of the R and B signals, and a signal processing unit 53 processes the R, G, and B signals obtained from the image sensing unit 51 and the gain control amplifiers 52a and 52b to convert them into a luminance signal Y and color difference signals R−Y and B−Y.

An image processing unit 54 applies image processing to the luminance signal Y and the color difference signals R−Y and B−Y obtained by the signal processing unit 53 so as to be compliant with an image format (size, compression method, and the like) required to output these signals to an external device or the like via the network 2.

A white balance (WB) control unit 55 controls the gain control amplifiers 52a and 52b based on the color difference signals R−Y and R−B, and controls the WB of an image signal by increasing/decreasing the R and B signals with respect to the G signal.

The AWB control by the camera with the above arrangement will be described below.

The WB control unit 55 controls the gains of the gain control amplifiers 52a and 52b based on the color difference signals R−Y and R−B. As a result, the R and B signals are controlled to be increased/decreased so as to minimize signal components of the color difference signals R−Y and R−B.

Upon reception of the camera control command from the camera control apparatus 1, the gains of the gain control amplifiers 52a and 52b, which correspond to minimum signal components of the color difference signals R−Y and R−B in a part where white appears, are adjusted based on the color gain adjustment values given by the camera control command.

For example, when the camera 5a is designated by the camera designation command, the WB control unit 55 adjusts the gains of the gain control amplifiers 52a and 52b to minimize signal components of values obtained by subtracting the B and R gain adjustment values from the input signals B−Y and R−Y with respect to the camera 5b.

Note that the aforementioned camera control apparatus may be incorporated in the camera. In this case, when at least one of a plurality of cameras incorporates the camera control apparatus, the same system as in this embodiment can be built, and the same effects can be provided.

According to this embodiment, a camera control command which requests to change the WB control based on the color gain adjustment values is transmitted to the camera which is not designated by a camera designation command. The color gain adjustment values used to execute the WB control in each camera can be used as offset values to be added to or subtracted from the color difference signals. For this reason, in an environment in which the image sensing range changes along with an elapse of time, and the color temperature changes accordingly, adjustment for a change in environment by the AWB control of each camera and adjustment based on the color gain adjustment values are executed together, thus realizing natural color reproducibility.

Since a region designated by the reference region designation command is determined as a reference region of each camera, the user can determine equivalent white regions for arbitrarily different objects, and can attain color adjustment of these regions.

Since regions including W pixels as many as the predetermined number of pixels or more from images sensed by the plurality of cameras are determined as reference regions of the cameras, regions considered as equivalent white regions can undergo color adjustment not only for a single object but also for different objects.

Figure 6:
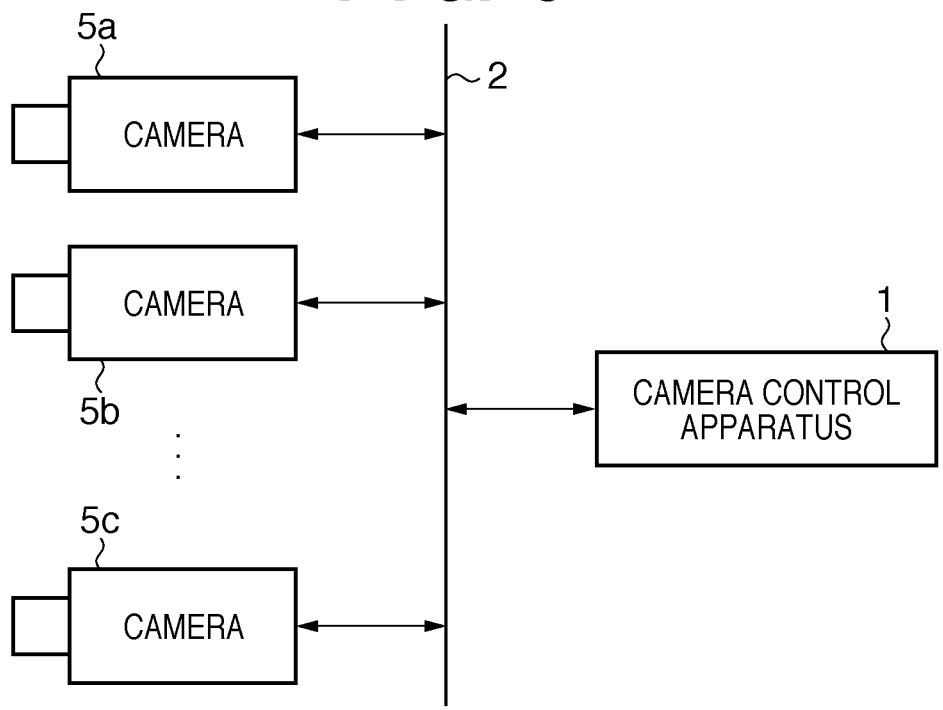
FIG. 6 is a block diagram showing the arrangement of a camera system according to the second embodiment.
Figure 7:
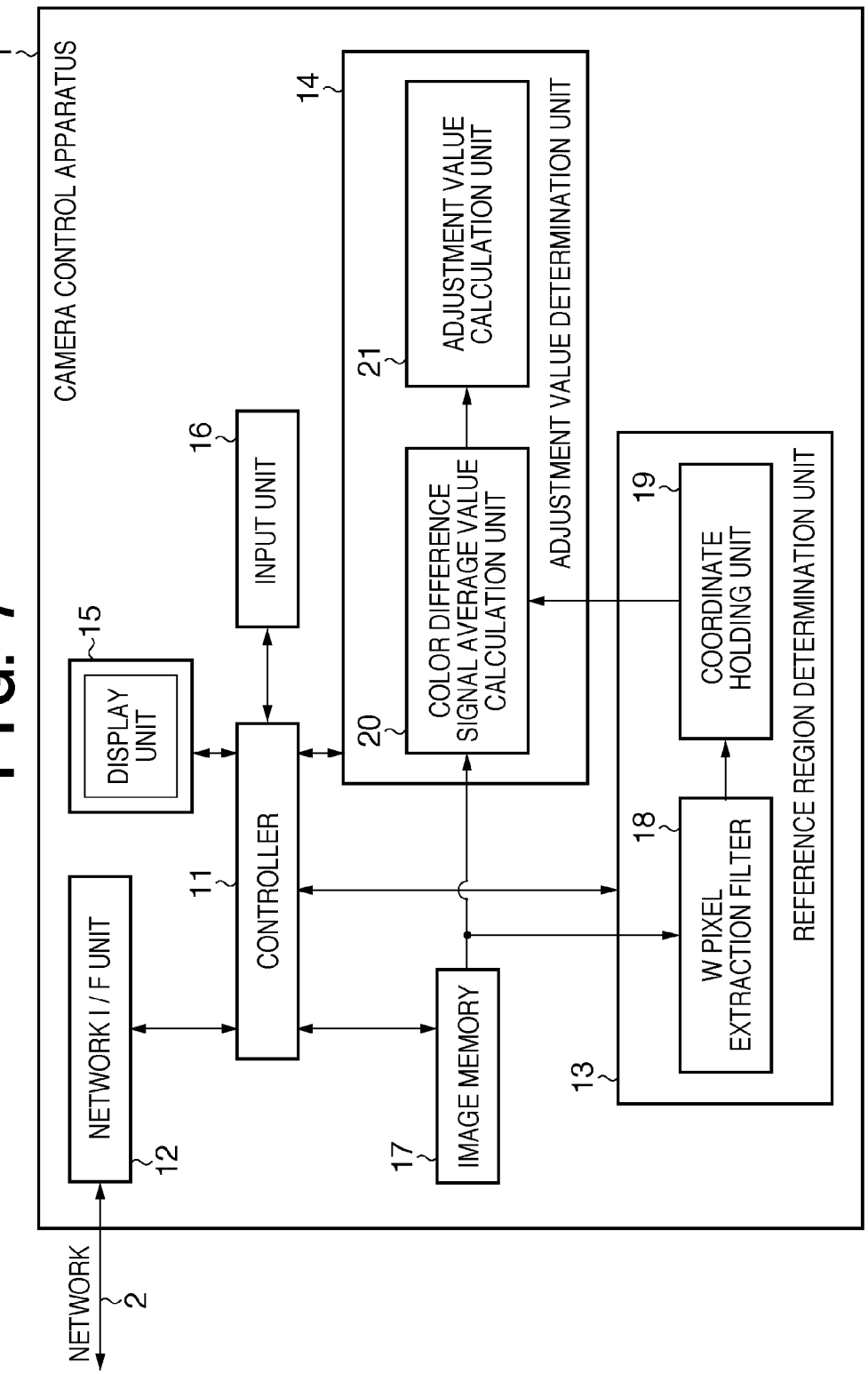
FIG. 7 is a block diagram showing the arrangement of a camera control apparatus according to the second embodiment.

A second embodiment of the present invention will be described below referring to the drawings. FIG. 6 exemplifies the arrangement of a camera system to which a camera control apparatus of the second embodiment is applied, and FIG. 7 is a block diagram showing the arrangement of the camera control apparatus of the second embodiment. The same reference numerals in FIGS. 6 and 7 denote the same parts as in FIGS. 1 and 2 of the first embodiment.

In the system of the second embodiment, the display apparatus 3 and input operation device 4 are excluded from the arrangement of FIG. 1, as shown in FIG. 6, and a camera control apparatus 1 incorporates a display unit 15 and input unit 16 instead, as shown in FIG. 7.

The display unit 15 is a display device such as a CRT, LCD, or the like, and displays images received from other cameras, a user interface (UI) screen (to be described later) of the camera control apparatus 1, and the like.

The input unit 16 may be implemented by a keyboard, buttons, mouse, and the like, or may be implemented by a touch panel and may be integrated with the display unit 15.

The user visually confirms images which are sensed by cameras 5a to 5c and are displayed on the display unit 15, and transmits a camera designation command by operating the input unit 16. Also, the user visually confirms images which are sensed by the cameras 5a to 5c and are displayed on the display unit 15, and transmits a reference region designation command by operating the input unit 16.

The arrangements and operations of a reference region determination unit 13, an adjustment value determination unit 14, and the cameras 5a to 5c are as described in the first embodiment.

As described above, even when the display unit and input unit are incorporated in the camera control apparatus 1, the same effects as in the first embodiment can be provided.

A third embodiment of the present invention will be described below referring to the drawings. The present invention can also be achieved when a computer program that implements the functions of the first and second embodiments is directly or remotely supplied to a system or apparatus. In this case, a program code itself read out from a storage medium implements the functions of the aforementioned embodiments, and the storage medium storing that program code constitutes the present invention.

Figure 8:
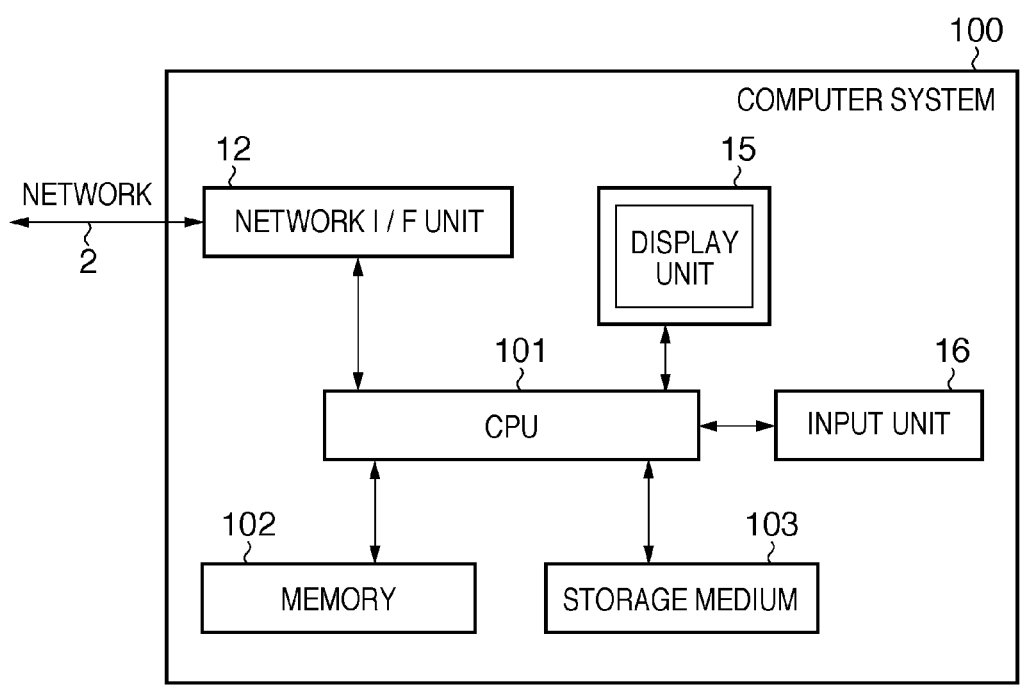
FIG. 8 is a block diagram showing the arrangement of a computer system according to the third embodiment.

FIG. 8 shows an example of a system or apparatus which reads out and executes the program code stored in the storage medium.

A computer system 100 includes a CPU 101, a memory 102 used as an area where the program code is mapped and executed, and a storage medium 103 which stores the program code. Also, the computer system 100 includes an input unit 16 which inputs required operation commands, a display unit 15 which is used to determine an execution state, and a network I/F unit 12 which communicates with another computer systems and cameras via a network 2.

Figure 9:
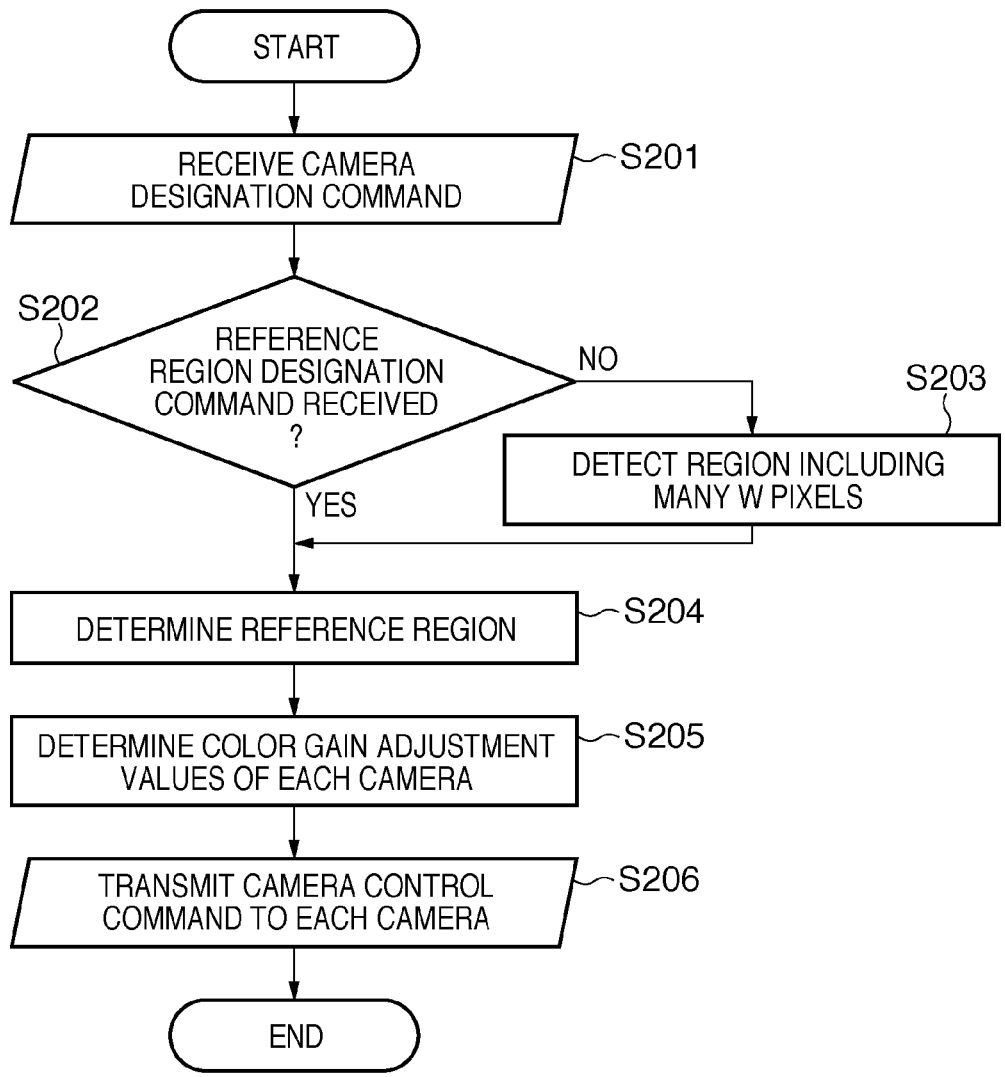
FIG. 9 is a flowchart showing an example upon implementing the first and second embodiments by programs.

FIG. 9 is a flowchart showing an example of functions to be implemented by the program of this embodiment.

Referring to FIG. 9, a camera designation command is received first (S201). The camera designation command is a command that designates a camera which senses an image to be used as a reference of color reproducibility. The user transmits the camera designation command by virtually confirming sensed images.

It is checked if a reference region designation command is received (S202). The reference region designation command is a command which designates a white region that is to be an equivalent color on an image of each camera. The user transmits the reference region designation command by visually confirming sensed images. Assume that a camera 5a is designated by the camera designation command.

If the reference region designation command is received, a region designated by the reference region designation command is determined as a reference region of each camera in images sensed by cameras 5a to 5c (S204).

Figure 5:
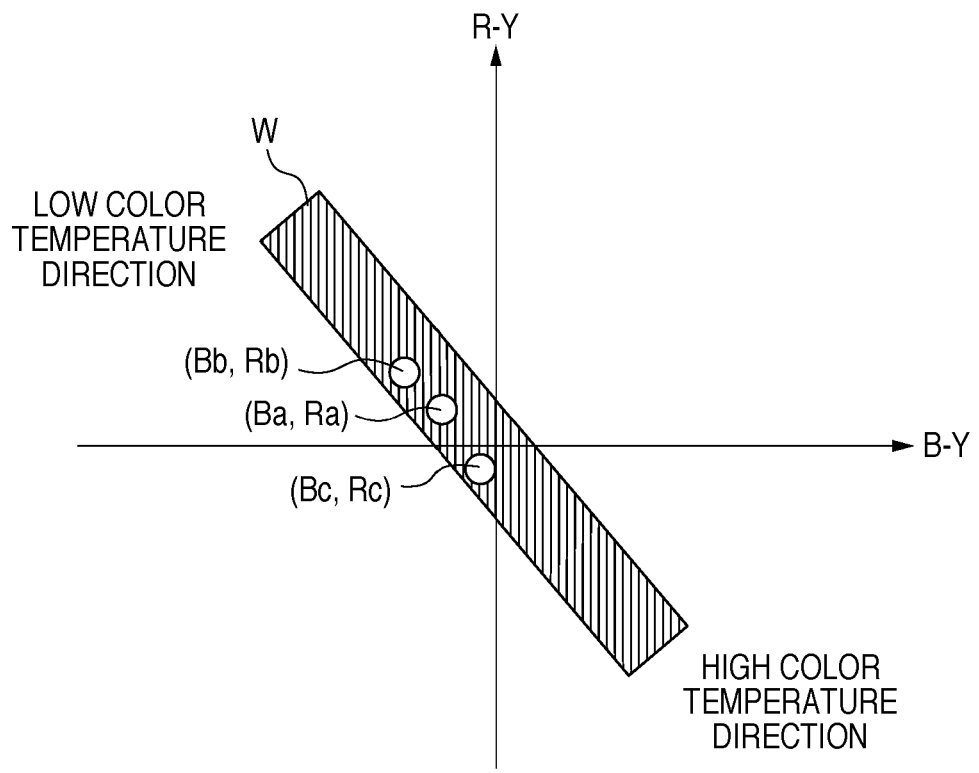
FIG. 5 is a graph showing a color difference range of a white extraction range W and coordinates of W pixels in the first and second embodiments on a coordinate system of color difference signals R−Y and B−Y.

On the other hand, if the reference region designation command is not received, a region including W pixels as many as the predetermined number of pixels or more included in a color difference range of a white extraction range W in FIG. 5 is detected from each of images sensed by the cameras 5a to 5c (S203). The detected region is determined as a reference region of each camera (S204).

After the reference regions are determined, color gain adjustment values which approximate color difference signals R−Y and B−Y of pixels in the reference regions of the cameras 5a and 5b are calculated and determined (S205). For example, in FIG. 5, assuming that pixels in the reference region of the camera 5a have a value Wa, and those in the reference region of the camera 5b have a value Wb, the pixels in the reference region of the camera 5b are approximated to the value Wa. R and B gain adjustment values at that time are calculated. A camera control command which requests to change AWB control based on color gain adjustment values including these R and B gain adjustment values is transmitted to the camera 5b (S206).

The processes in steps S205 and S206 are executed for the camera 5c in the same manner as in the sequence for the camera 5b.

As the storage medium for supplying the program code, for example, a flexible disk, hard disk, optical disk, magneto-optical disk, CD-ROM, CD-R, magnetic tape, nonvolatile memory card, ROM, DVD, and the like may be used.

The functions of the aforementioned embodiments can also be implemented not only when the computer executes the readout program but also when an OS or the like running on the computer executes some or all of actual processes based on an instruction of that program.

Furthermore, the functions of the aforementioned embodiments can also be implemented when the program read out from the storage medium is written in a memory of a function expansion board or unit which is inserted into or connected to the computer, and a CPU of the board or the like then executes some or all of actual processes.

A fourth embodiment of the present invention will be described below referring to the drawings. FIG. 10 is a block diagram showing the arrangement of a camera control apparatus of the fourth embodiment, which is applied to the camera system shown in FIG. 1, and the same reference numerals in FIG. 10 denote the same parts as in FIG. 2.

Referring to FIG. 10, in a camera control apparatus 1 of this embodiment, an adjustment value determination unit 14 comprises a W pixel presence/absence determination unit 22, color difference signal average value calculation unit 20, frame gain adjustment value calculation unit 23, and adjustment value calculation unit 21.

Figure 12:
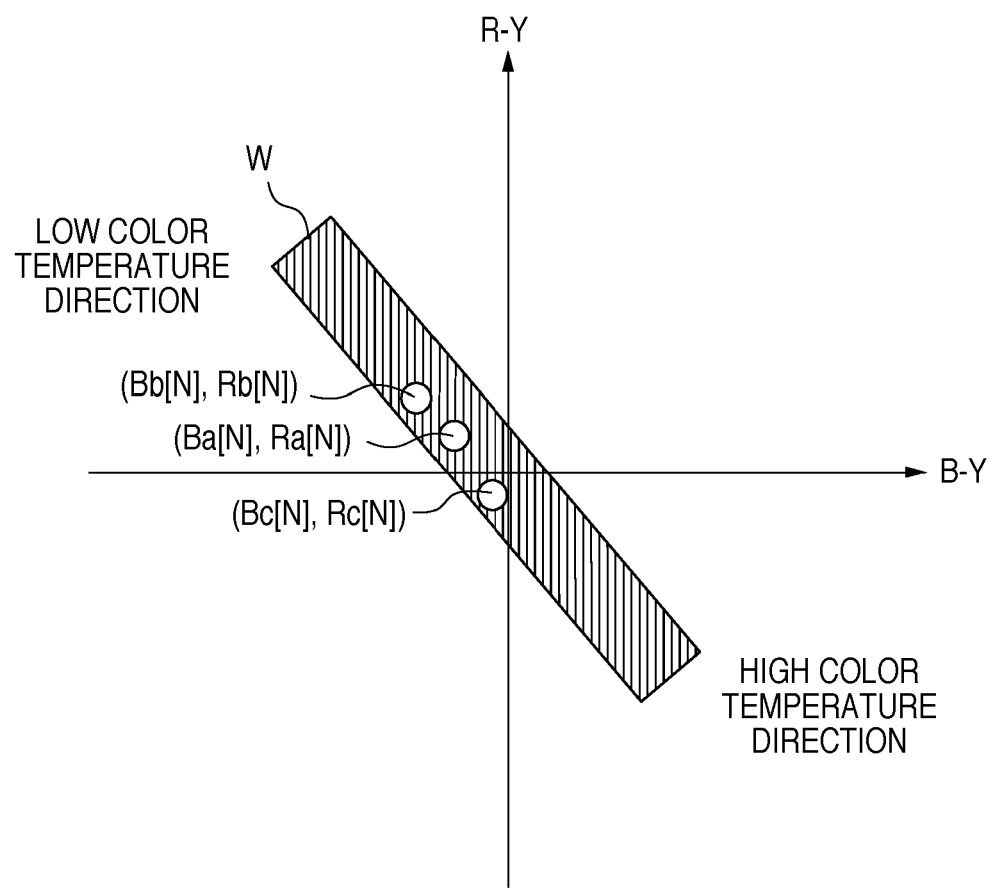
FIG. 12 is a graph showing a color difference range of a white extraction range W and coordinates of W pixels in the fourth and fifth embodiments on a coordinate system of color difference signals R−Y and B−Y.

When a reference region designation command is received, a reference region determination unit 13 determines a region designated by the reference region designation command on each of images sensed by cameras 5a to 5c as a reference region of each camera, and holds the coordinate information of the region in a coordinate holding unit 19. On the other hand, when the reference region designation command is not received, the reference region determination unit 13 detects, using a W pixel extraction filter 18, a region including W pixels as many as the predetermined number of pixels or more within a color difference range of a white extraction range W shown in FIG. 12 from each of images sensed by the cameras 5a to 5c. Then, the reference region determination unit 13 determines the detected region as a reference region of each camera, and holds its coordinates in the coordinate holding unit 19.

Figure 11A:
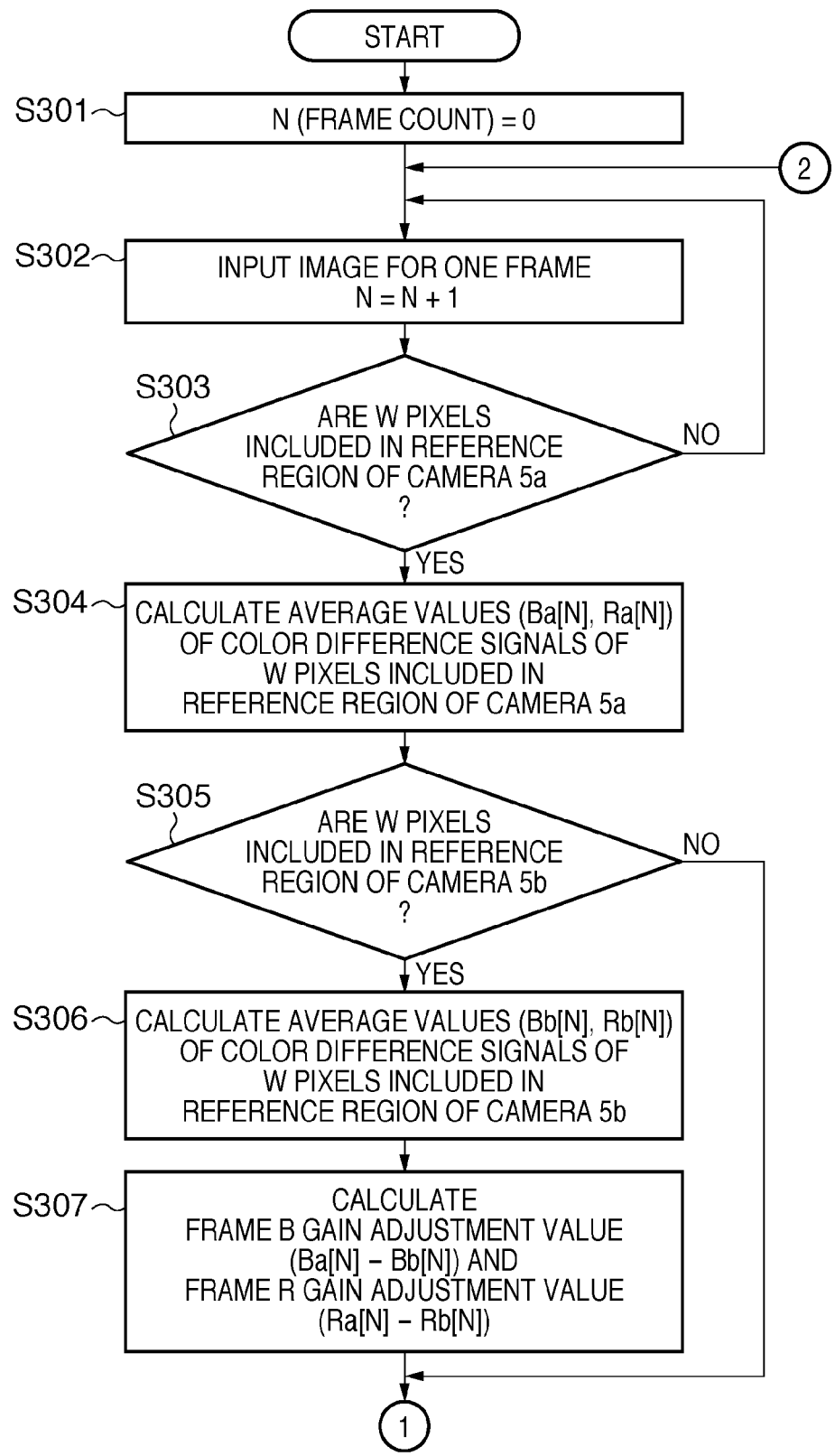
FIGS. 11A and 11B are flowcharts showing color gain adjustment value determination processing according to the fourth embodiment.
Figure 11B:
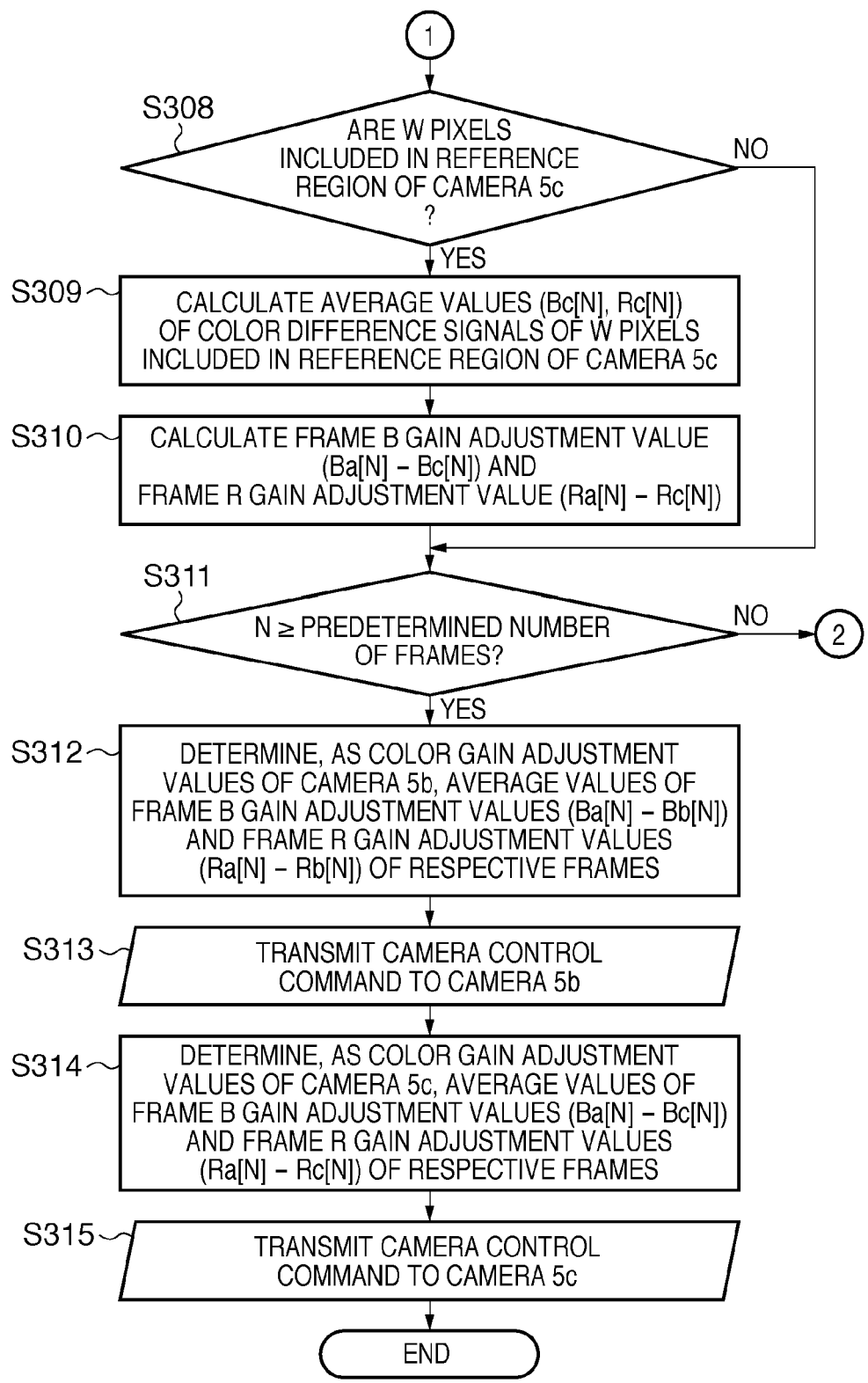

After the reference regions are determined, respective blocks of the adjustment value determination unit 14 operate according to the flowcharts of FIGS. 11A and 11B.

The adjustment value determination unit 14 determines color gain adjustment values for each frame using images of the predetermined number of frames. In this embodiment, the predetermined number of frames is set to be an arbitrary value in advance, and it may be set from an external device or the like via the network 2 together with the reference region designation command.

A controller 11 resets a frame count N to zero (S301).

The controller 11 counts up this frame count N every time an image for one frame is input (S302).

The W pixel presence/absence determination unit 22 checks if the reference region of the camera 5a includes W pixels (S303). Even when the reference region includes W pixels at the time of determination of the reference region, if another object moves into the reference region or when a moving body approaches near the reference region to cast a shadow, the reference region may often not include any W pixels. Hence, a frame R gain adjustment value and frame B gain adjustment value calculated from an image, the reference region of which does not include any W pixels upon calculating the frame R and B gain adjustment values are excluded.

If the reference region of the frame to be processed does not include any W pixels, the next frame image is input (S302).

If the reference region includes W pixels, the color difference signal average value calculation unit 20 calculates average values (Ba[N], Ra[N]) of color difference signals (B−Y, R−Y) of W pixels included in the reference region of the camera 5a (S304).

The W pixel presence/absence determination unit 22 then checks if the reference region of the camera 5b includes W pixels (S305).

If the reference region includes W pixels, the color difference signal average value calculation unit 20 calculates average values (Bb[N], Rb[N]) of color difference signals (B−Y, R−Y) of W pixels included in the reference region of the camera 5b before adjustment (S306).

The frame gain adjustment value calculation unit 23 calculates a frame B gain adjustment value (Ba[N]−Bb[N]) and frame R gain adjustment value (Ra[N]−Rb[N]) from these values (S307). If the reference region does not include any W pixels, the process jumps to step S308 while skipping these processes.

The W pixel presence/absence determination unit 22 then checks if the reference region of the camera 5c includes W pixels (S308).

If the reference region includes W pixels, the color difference signal average value calculation unit 20 calculates average values (Bc[N], Rc[N]) of color difference signals (B−Y, R−Y) of W pixels included in the reference region of the camera 5c before adjustment (S309).

The frame gain adjustment value calculation unit 23 calculates a frame B gain adjustment value (Ba[N]−Bc[N]) and frame R gain adjustment value (Ra[N]−Rc[N]) from these values (S310). If the reference region does not include any W pixels, the process jumps to step S311 while skipping these processes.

The controller 11 then checks if the frame count N reaches the predetermined number of frames (S311).

If the frame count N is less than the predetermined number of frames, the process returns to step S302 to input an image of the next frame, thus repeating the calculations of the average values of the color difference signals of W pixels included in the reference region and the calculations of the frame B and R gain adjustment values.

If the frame count N has reached the predetermined number of frames, the adjustment value calculation unit 21 calculates a B gain adjustment value as the average value of the frame B gain adjustment values (Ba[N]−Bb[N]) and an R gain adjustment value as the average value of the frame R gain adjustment values (Ra[N]−Rb[N]) of the camera 5b. Then, the adjustment value calculation unit 21 determines these values as color gain adjustment values used to approximate W pixels in the reference regions of the cameras 5a and 5b (S312).

This embodiment is premised on that both the cameras 5a and 5b sense one or more frames, the reference regions of which include W pixels. However, if frames as many as the predetermined number N of frames do not include such frame, and the color gain adjustment values cannot be determined, the user or the like is notified of an error.

A camera control command which requests to change AWB control based on the color gain adjustment values including the B and R gain adjustment values is transmitted to the camera 5b via a network I/F unit 12 (S313).

The adjustment value calculation unit 21 calculates a B gain adjustment value as the average value of the frame B gain adjustment values (Ba[N]−Bc[N]) and an R gain adjustment value as the average value of the frame R gain adjustment values (Ra[N]−Rc[N]) of the camera 5c. Then, the adjustment value calculation unit 21 determines these values as color gain adjustment values used to approximate W pixels in the reference regions of the cameras 5a and 5c (S314). This embodiment is premised on that both the cameras 5a and 5c sense one or more frames, the reference regions of which include W pixels. However, if frames as many as the predetermined number N of frames do not include such frame, and the color gain adjustment values cannot be determined, the user or the like is notified of an error.

A camera control command which requests to change AWB control based on the color gain adjustment values including the B and R gain adjustment values is transmitted to the camera 5c via the network I/F unit 12 (S315).

In the description of the above example, the frame B and R gain adjustment values are calculated from the average values of the color difference signals of W pixels included in the reference regions. Alternatively, the color gain adjustment values may be calculated based on mode values of the color difference signals of W pixels included in the reference regions or the color difference signals of specific W pixels included in the reference regions.

In the description of the above example, the average values of the frame B and R gain adjustment values calculated for respective frames are determined as the B and R gain adjustment values. Alternatively, the B and R gain adjustment values may be determined based on mode values in place of the average values.

In the description of the above example, after the camera control command is transmitted to the camera 5b, the color gain adjustment values of the camera 5c are determined, and the camera control command is transmitted to the camera 5c.

Alternatively, after the color gain adjustment values of the cameras 5b and 5c are determined, the camera control commands may be transmitted.

Also, the example that commonly uses the reference region of the camera 5a so as to calculate the color gain adjustment values of the two cameras 5b and 5c has been explained. However, different reference regions of the camera 5a may be used upon calculation of the color gain adjustment values of the cameras 5b and 5c.

After the camera control apparatus 1 transmits the camera control commands, the cameras 5b and 5c that received the camera control commands change the contents of the AWB control based on the color gain adjustment values. These color gain adjustment values may be continuously used as offset values of the AWB control of the cameras 5b and 5c.

Note that the arrangement and operation of the cameras 5a to 5c are the same as those in the first embodiment described with reference to FIG. 3.

As described above, when the adjustment value determination unit 14 is arranged by adding the W pixel presence/absence determination unit 22 and frame gain adjustment value calculation unit 23, the same effects as in the first embodiment can be provided.

The frame B and R gain adjustment values of images of the predetermined number of frames are calculated, and the B and R gain adjustment values are determined using their average values or mode values. In this way, the influence of a temporary change in surrounding environment of an image sensing location (a reflection of reflected light by a surrounding object or the like) on the image can be eliminated.

Figure 13:
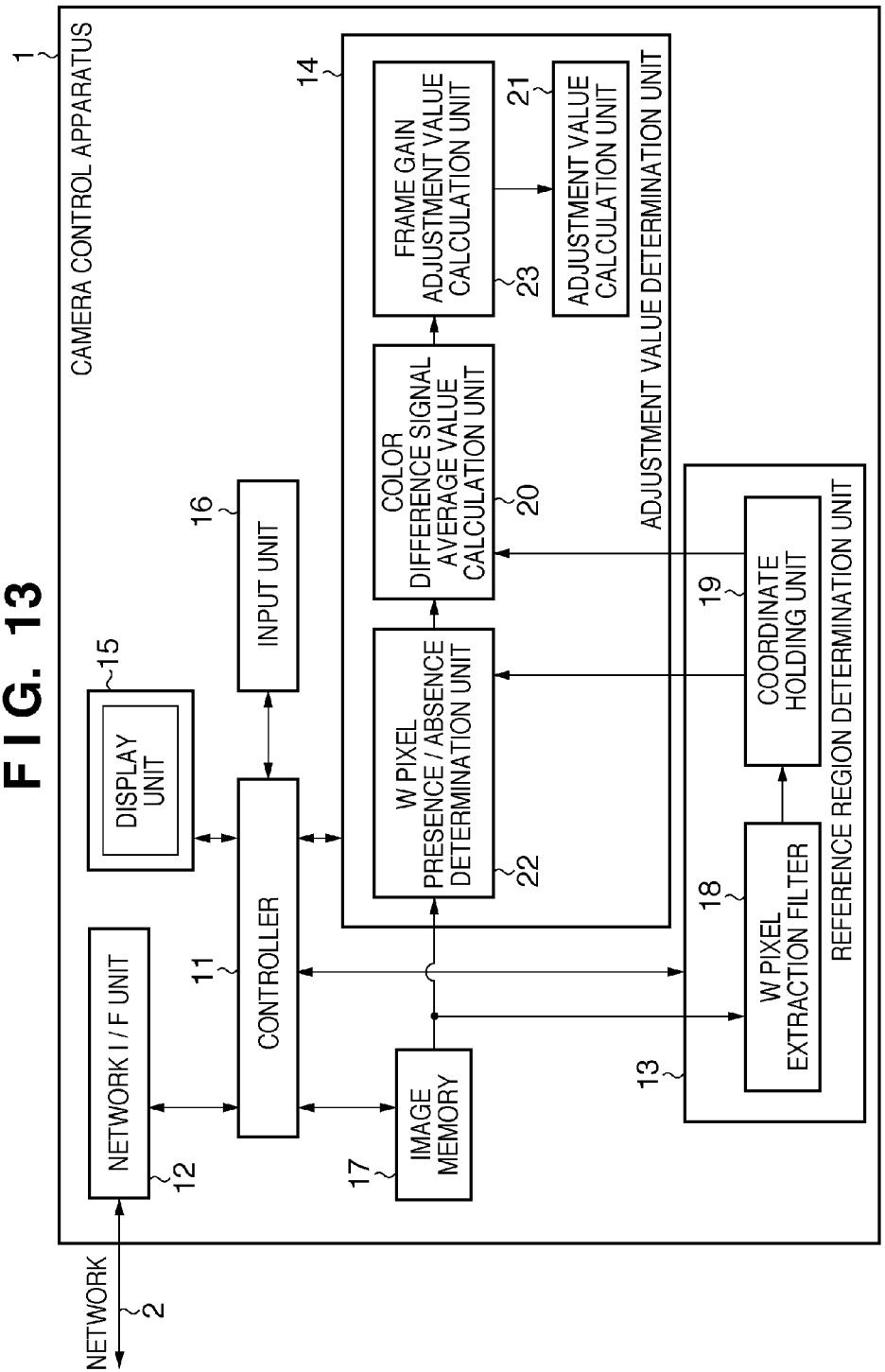
FIG. 13 is a block diagram showing the arrangement of a camera control apparatus according to the fifth embodiment.

A fifth embodiment of the present invention will be described below referring to the drawings. FIG. 13 is a block diagram showing the arrangement of a camera control apparatus according to the fifth embodiment, which is applied to the camera system shown in FIG. 6, and the same reference numerals in FIG. 13 denote the same parts as in FIGS. 7 and 10.

Referring to FIG. 13, a camera control apparatus 1 of this embodiment incorporates a display unit 15 and input unit 16 as in FIG. 7, and an adjustment value determination unit 14 comprises a W pixel presence/absence determination unit 22, color difference signal average value calculation unit 20, frame gain adjustment value calculation unit 23, and adjustment value calculation unit 21 as in FIG. 10. That is, the camera control apparatus 1 of this embodiment has the arrangement by combining the second and fourth embodiments, and its operation is as described in the above embodiments.

With the above arrangement, the same effects as in the first to fourth embodiments can be provided.

A sixth embodiment of the present invention will be described below referring to the drawings. The present invention can also be achieved when a computer program that implements the functions of the fourth and fifth embodiments is supplied to a system or apparatus. In this case, a program code itself read out from a storage medium implements the functions of the aforementioned embodiments, and the storage medium storing that program code constitutes the present invention.

Figure 4:
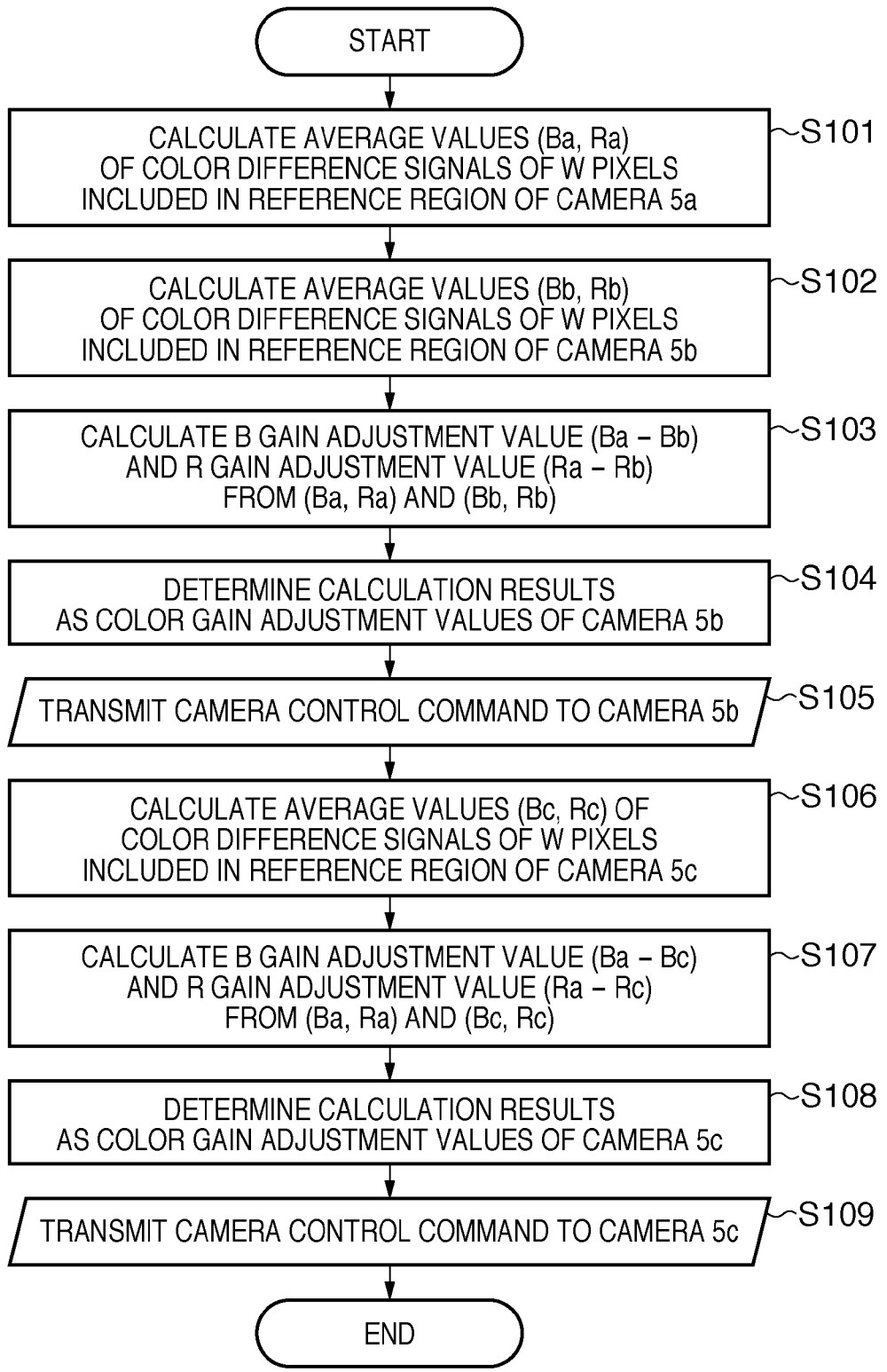
FIG. 4 is a flowchart showing color gain adjustment value determination processing according to the first embodiment.

An example of a system or apparatus which reads out and executes the program code stored in this storage medium is as shown in FIG. 8. An example of the program of this embodiment is as shown in the flowchart of FIG. 4.

With the above arrangement, the same effects as in the fourth and fifth embodiments can be provided.

Figure 14:
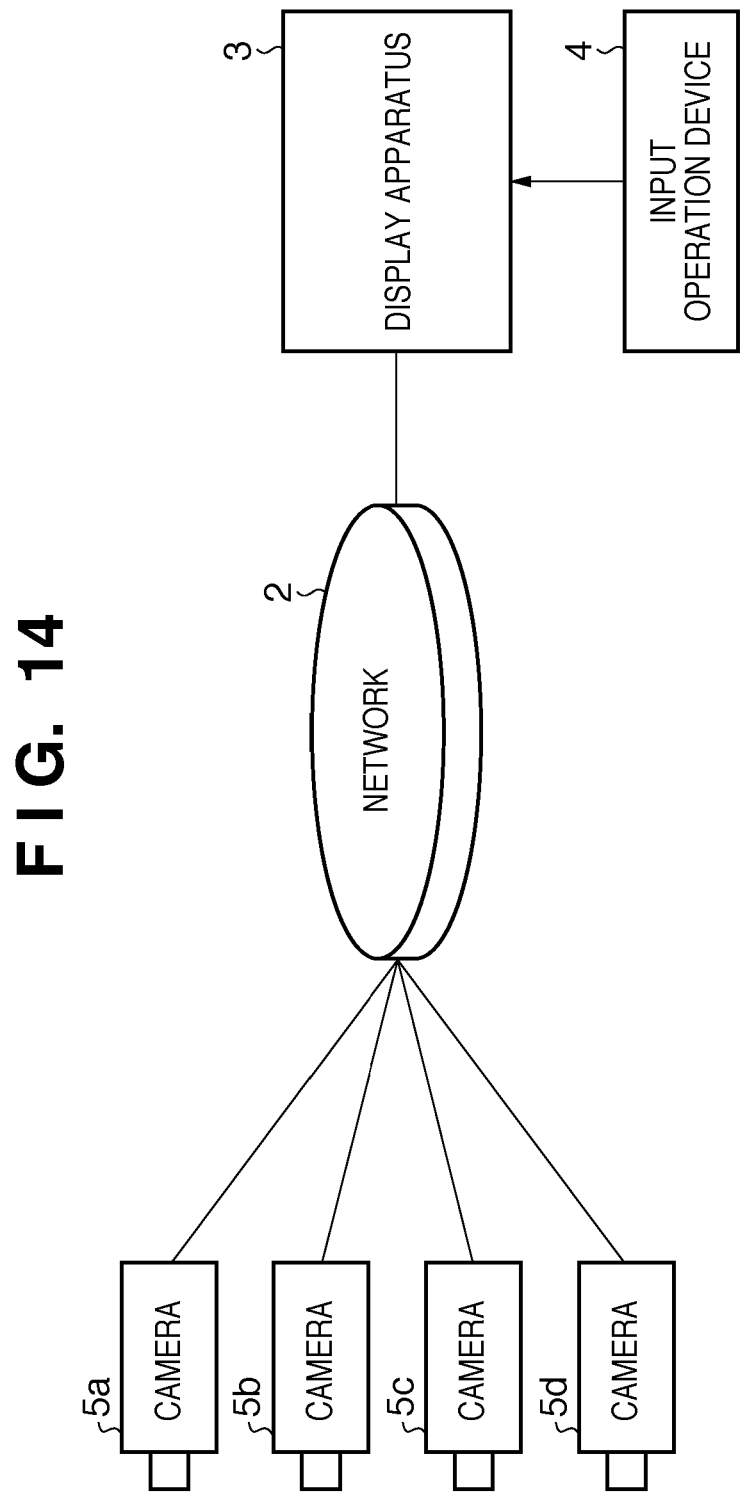
FIG. 14 is a block diagram showing the arrangement of a camera system according to the seventh embodiment.
Figure 15:
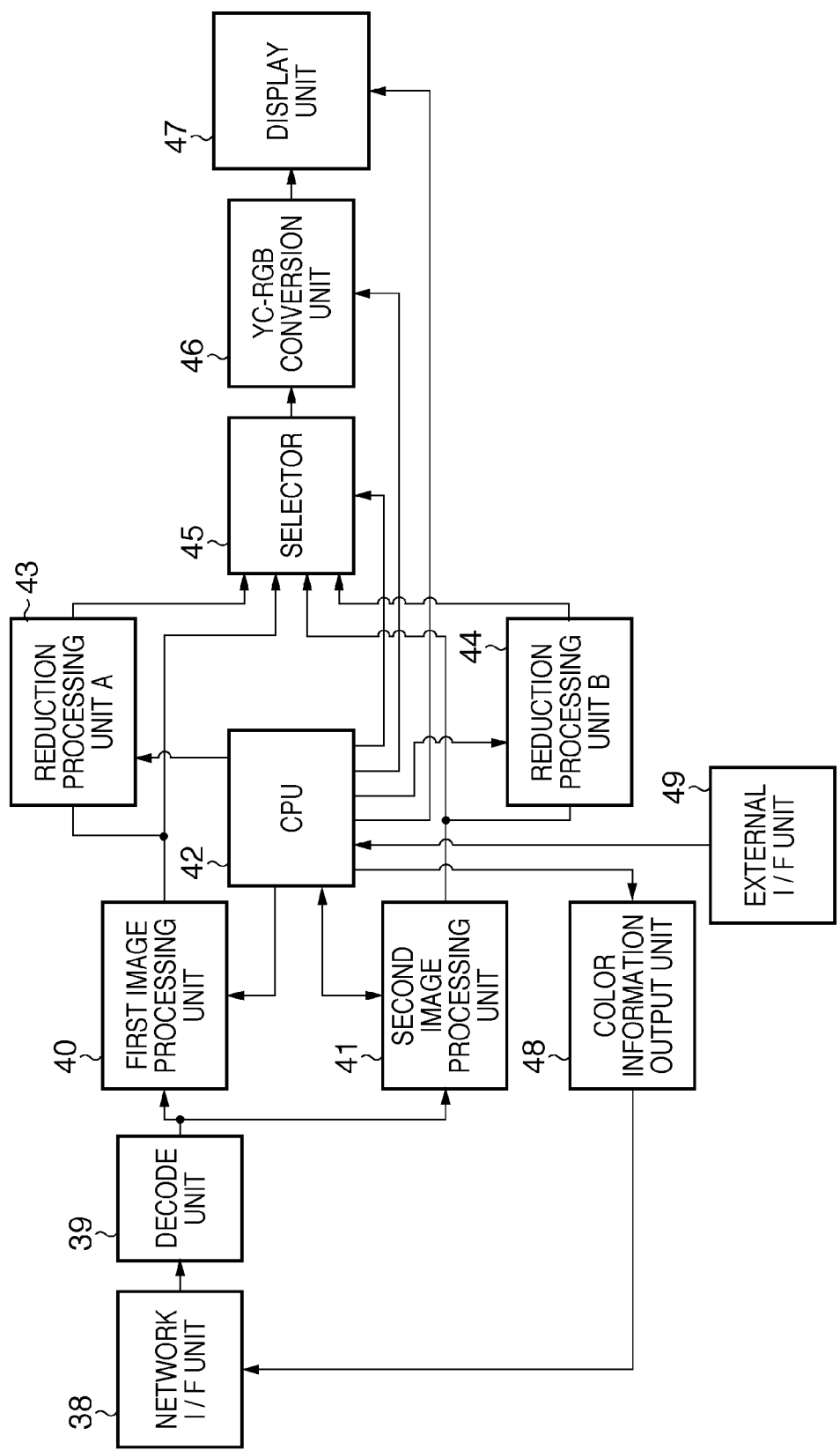
FIG. 15 is a block diagram showing the arrangement of a display apparatus according to the seventh embodiment.
Figure 16:
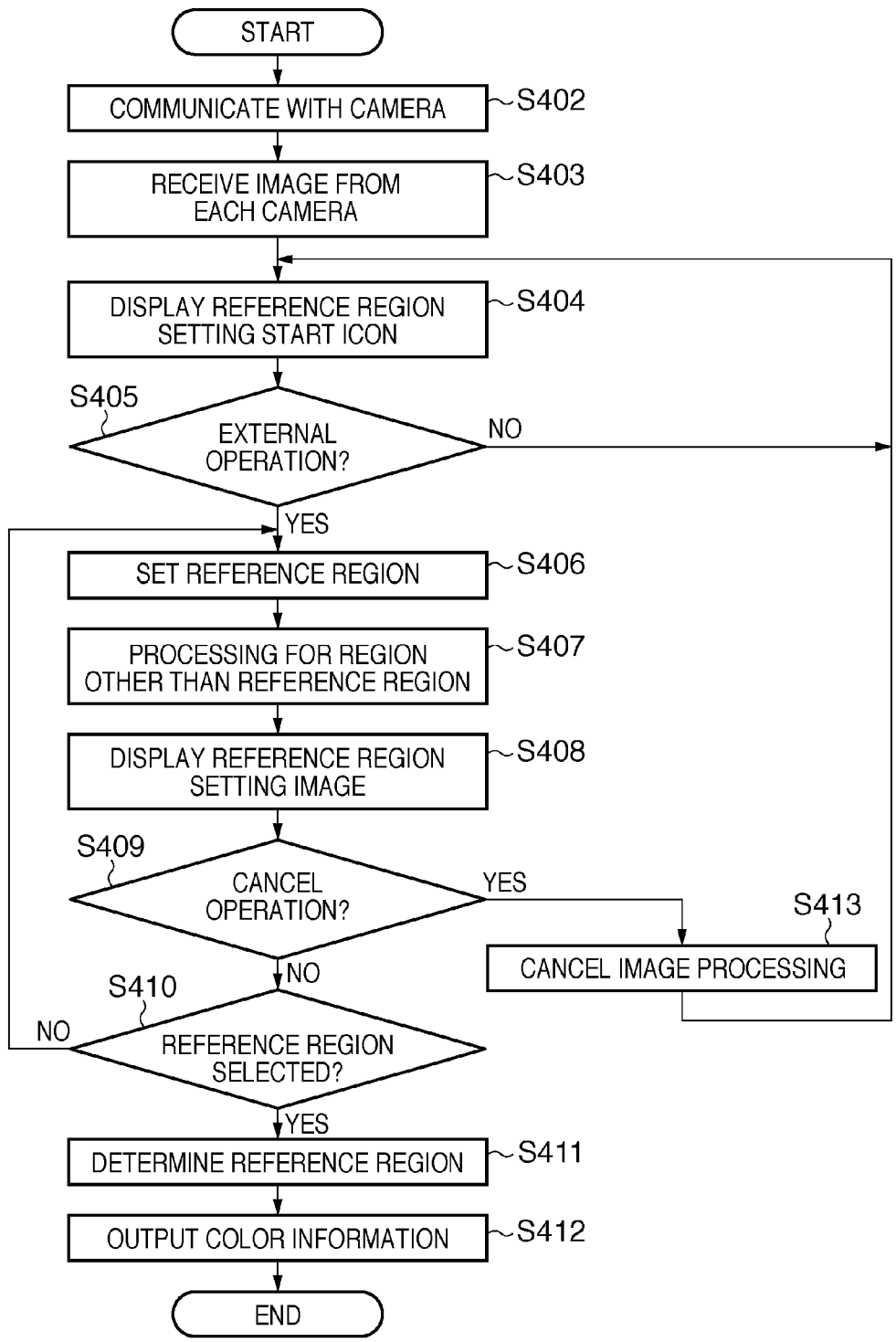
FIG. 16 is a flowchart showing image display processing by the system according to the seventh embodiment.
Figure 17:
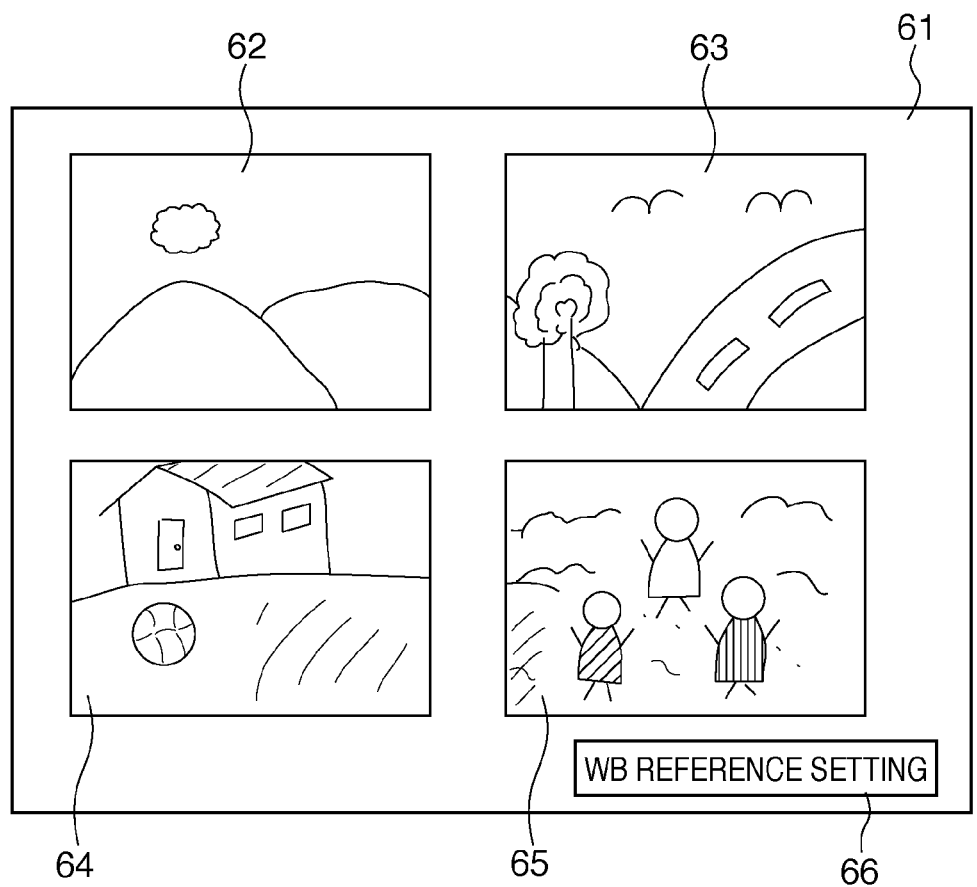
FIG. 17 is a view showing a display example of a UI screen by the system according to the seventh embodiment.
Figure 18:
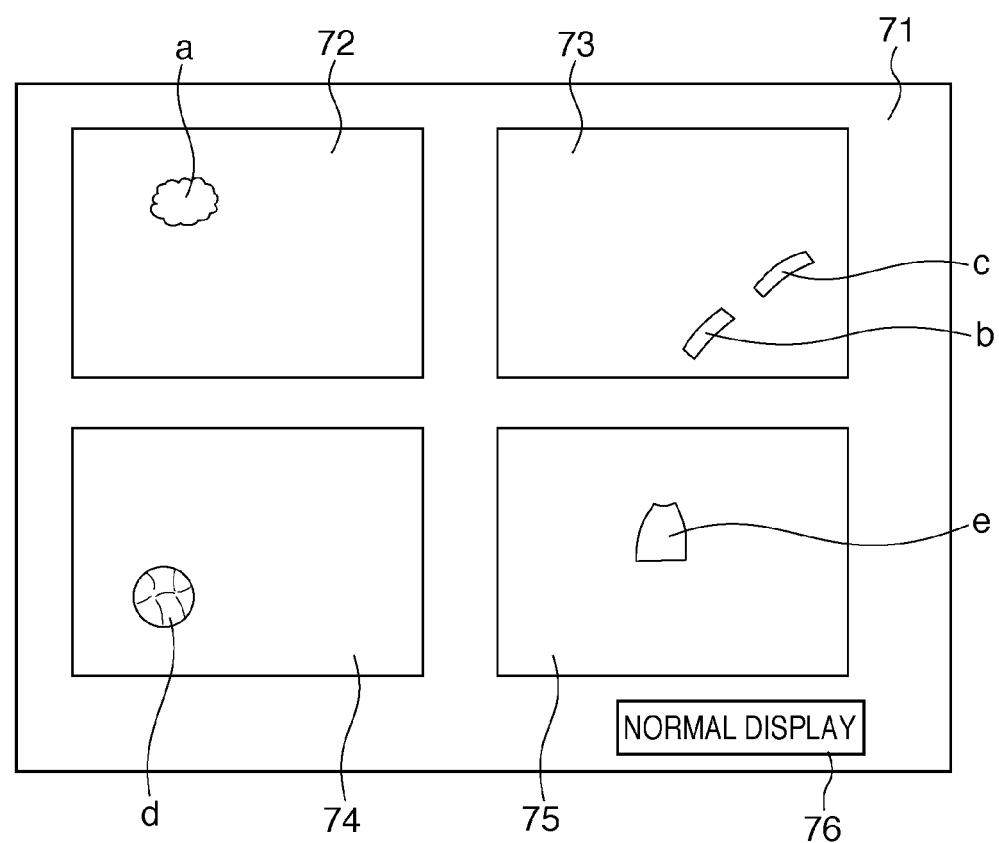
FIG. 18 is a view showing a display example of a UI screen by the system according to the seventh embodiment.
Figure 19:
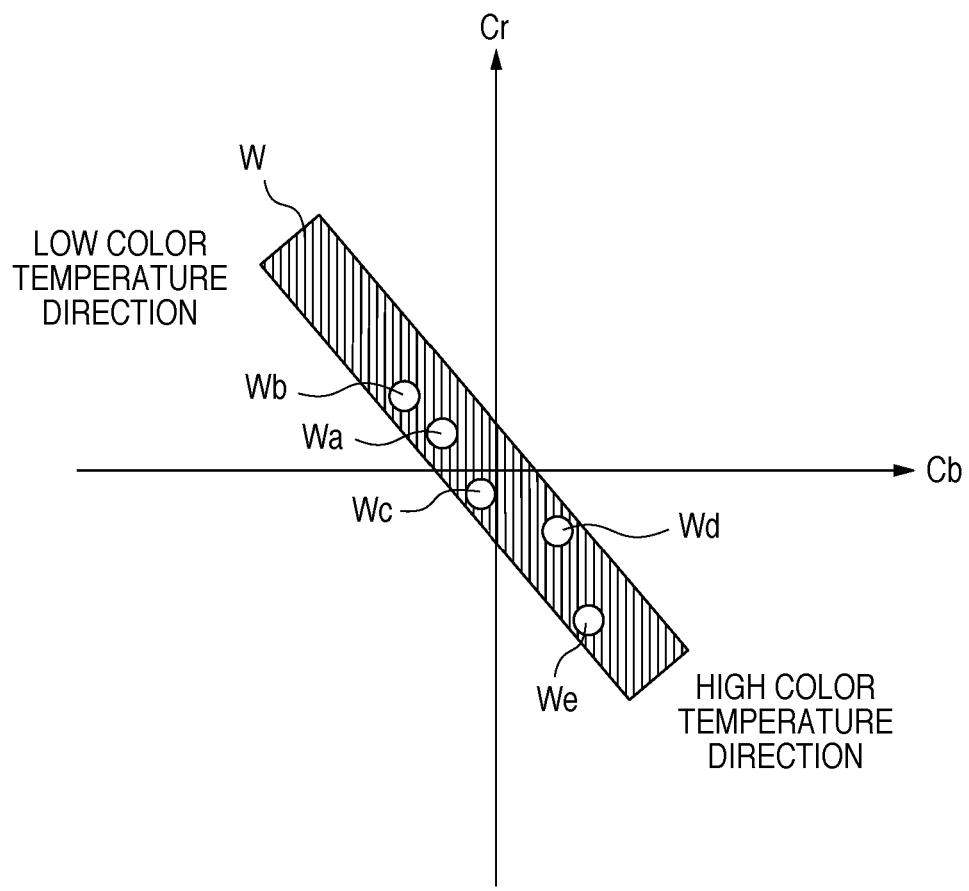
FIG. 19 is a graph showing a color difference range of a white extraction range W and coordinates of W pixels in the seventh embodiment on a coordinate system of color difference signals R−Y and B−Y.

A seventh embodiment of the present invention will be described below referring to the drawings. FIG. 14 is a block diagram showing the arrangement of a camera system according to the seventh embodiment. FIG. 15 is a block diagram showing the arrangement of a display apparatus which is shown in FIG. 14, and is integrated with a camera control apparatus. FIG. 16 is a flowchart showing image display processing by the camera system of this embodiment. FIGS. 17 and 18 are views showing UI screen examples by the system of this embodiment. FIG. 19 is a graph showing a color difference matrix used to explain a change range of a color temperature upon execution of AWB control of a camera.

Referring to FIG. 14, reference numerals 5a to 5d denote cameras. Note that this embodiment will exemplify the four cameras, but the number of cameras is not particularly limited. In addition, the same reference numerals in FIG. 14 denote the same parts as in FIG. 1.

An input operation device 4 is arranged to allow the user to operate a display apparatus 3. As the input operation device 4, a mouse used to scroll a cursor or the like will be explained, but the input operation device 4 may be implemented by a keyboard or remote controller. Also, a system of operation signals output from the input operation device 4 to the display apparatus 3 may be any of a wired communication system, wireless communication system, and optical communication system.

Referring to FIG. 15, a network I/F unit 38 communicates with the cameras 5a to 5d via a network 2 to receive image data from the respective cameras, and to transmit position (coordinate position on a display) information, a camera control command, and the like set in the display apparatus 3 to the cameras.

A decode unit 39 decodes image data sent from each camera to have a predetermined format. The format to be decoded by this decode unit 39 includes JPEG and MPEG, but the format is not particularly limited as long as it is an image format.

A first image processing unit 40 adjusts color reproduction characteristics, luminance reproduction characteristics, and the like of the image data decoded by the decode unit 39 in correspondence with parameters of the display apparatus 3. The first image processing unit 40 may often output data which need not be processed by the display apparatus 3 without applying any processing.

A second image processing unit 41 executes processing for replacing data so that a region other than a reference candidate region indicating a color set in advance of the image data decoded by the decode unit 39 is displayed in an identical color. In this embodiment, a region other than a region determined to be white (region W in FIG. 19) required to adjust the WB of each camera is set in a single color. The region W in FIG. 19 indicates a shift range of color difference data in correspondence with a shift in color temperature of a white region depending on a light source.

A CPU 42 controls respective blocks of the display apparatus 3.

A reduction processing unit A 43 applies reduction processing to the image data which has undergone the image processing optimal to display by the first image processing unit 40 as needed under the control of the CPU 42.

A reduction processing unit B 44 applies reduction processing to the image which has undergone the processing for replacing data so that a region other than a region indicating a color set in advance has a single color by the second image processing unit 41 as needed.

A selector 45 selectively outputs, to the subsequent blocks, the image data processed by the first and second image processing units 40 and 41 and the reduction processing units A 43 and B 44 under the control of the CPU 42.

A YC-RGB conversion unit 46 converts YC data into RGB data (R (red), G (green), and B (blue)) so as to display Y (luminance information) and C (color information).

A display unit 47 is arranged to display image data. A display medium of the display unit 47 is not particularly limited as long as it is implemented by a device for displaying an image represented by an LCD (Liquid Crystal Display panel), CRT (a display using a Cathode Ray Tube), plasma display, or the like.

A color information output unit 48 outputs color information of an image corresponding to a position selected from a reference candidate region of a color in response to a user's operation input.

An external I/F unit 49 communicates with the input operation device 4 and makes an operation required for selection from the reference candidate region of the color in response to a user's operation input.

The operation of the display apparatus 3 will be described below with reference to the flowchart of FIG. 16 and display examples of FIGS. 17 and 18.

Note that in the following description, "image" means a movie or video (movie+audio) unless otherwise specified.

Referring to FIG. 16, the display apparatus 3 communicates with the cameras 5a to 5d to exchange required information such as the format, image size, and the like of image data (S402).

The network I/F unit 38 receives images sensed by the cameras 5a to 5d according to the contents set in step S402 (S403). The images received by the network I/F unit 38 are output to the selector 45 via the decode unit 39 and first image processing unit 40. The selector 45 selects image data output from the first image processing unit 40, and displays them on the display unit 47 via the YC-RGB conversion unit 46. FIG. 17 shows a display example on the display unit 47.

Referring to FIG. 17, reference numeral 61 denotes a size of the full screen of the display unit 47. Reference numerals 62, 63, 64, and 65 respectively denote examples of images of the cameras 5a, 5b, 5c, and 5d.

Referring back to FIG. 16, in step S404 images of the respective cameras are displayed, and a "WB reference setting" icon 66 that prompts the user to start a reference region setting is displayed, as shown in FIG. 17. In the example of this embodiment, the icon 66 is displayed at the lower right position of the screen 61. However, the display position on the screen, display color, display text, and the size of the display icon are not particularly limited. That is, the icon is not particularly limited as long as it is displayed simultaneously with images of the plurality of cameras on the single screen.

Images sequentially transmitted from the respective cameras in the steps executed so far are moving images.

The external I/F unit 49 checks in step S405 if the user moves the cursor to the position of the icon 66 in FIG. 17 and clicks it when he or she externally operates the input operation device 4 to set a reference region of a color associated with the AWB control. This embodiment has explained the case in which the input operation device 4 is the mouse. Alternatively, a method of changing the cursor position using a keyboard, or a method of changing cursor position using a dedicated remote controller may be used, and an operation method of the setting screen is not particularly limited.

If it is determined in step S405 that the user clicks the icon 66, the process advances to step S406; otherwise, the process returns to step S404, and the moving images received from the respective cameras are sequentially updated without changing the display.

In step S406, image data are output to the second image processing unit 41. The second image processing unit 41 detects regions indicating a color which is set in advance, analyzes color difference information of the corresponding images, and the positions of the regions indicating that color in the data on the screen, and feeds back the analysis result to the CPU 42.

In step S407, the second image processing unit 41 executes processing for setting the regions indicating the color set in advance as reference candidate regions, and replacing data of regions other than the reference candidate regions to have a single color. In this embodiment, since the WB control uses white as a reference, processing for setting black or gray close to black as a color used to set the highest contrast ratio to white as the single color is applied.

In step S408, only the images processed by the second image processing unit 41 in step S407 are output to the subsequent blocks by blocking normal images output from the first image processing unit 40 by the selector 45.

Also, in step S408, the reference region setting images processed in step S407 are displayed on the display unit 47. FIG. 18 shows an example of the display screen displayed in this step. Referring to FIG. 18, reference numeral 71 denotes a size of the full screen; and 72, 73, 74, and 75, display windows of the reference region setting images of the cameras 5a, 5b, 5c, and 5d. The sizes of the display windows remain the same.

Extracted images of the respective reference regions are indicated by a, b, c, d, and e on the screen 71. Color matrices of respective color difference data of the portions a, b, c, d, and e on the screen 71 correspond to respective points shown in FIG. 19. That is, Wa corresponds to a; Wb, b; Wc, c; Wd, d; and We, e. In this step, the icon 66 which is displayed in step S404 and is used to set the reference regions is changed to an icon 76 used to make a cancel operation of the reference region setting screen. The icon display method in this step is also not particularly limited.

It is checked in step S409 if the user makes a cancel operation using the input operation device 4. If the user makes a cancel operation, the process advances to step S413; otherwise, the process advances to step S410.

In step S413, the setting and display contents in steps S406 to S408 are reset, and the process returns to step S404 to display normal images sensed by the respective cameras.

It is checked in step S410 which of the images a, b, c, d, and e of the reference regions on the screen 71 the user selects. If the user does not make any operation, the process returns to step S406; if he or she selects one of the reference regions, the process advances to step S411.

In step S411, one of the images a, b, c, d, and e selected in step S410 is determined as a reference region. In the following description of this embodiment, assume that the user selects the image a. The image a is mapped on the color difference matrix corresponding to the point Wa in the W region as a region determined to be white required to adjust the WB of the camera in FIG. 19. This color difference value is determined as a white reference.

In step S412, the value set in step S411 is output to the color information output unit 48, and that data is transmitted from the network I/F unit 38 to the cameras 5a to 5d via the network 2.

Note that the region indicating the color set in advance is set in a white or achromatic pixel range.

According to this embodiment, since operations are simple and display contents are easy to see upon designating reference regions of the AWB control of a plurality of cameras, the operability can be improved.

In the seventh embodiment, images displayed on the screen of FIG. 17 are output from the cameras allocated outdoors. However, when images from the cameras allocated outdoors and videos from those allocated indoors are displayed together on the screen of FIG. 17, since the color temperatures around the cameras are extremely different, trouble may occur in the WB control.

In such case, information associated with the color temperatures around the cameras is received from the respective cameras in step S402. In place of the information associated with the color temperatures, information associated with illuminances around the cameras may be used. If the illuminance is high, the probability of the outdoor camera is high, it is estimated that the color temperature is high. Conversely, if the illuminance is low, it is estimated that the probability of the indoor camera is high. The illuminance is determined by the aperture value, shutter speed (exposure time), gain, and the like of the camera.

In step S411, the cameras which have the same color temperature as that of the camera which transmits an image including a region selected as a reference region are selected based on the received information associated with the color temperatures. In step S412, the value set in step S411 is transmitted to only the selected cameras. Each of the cameras which have color temperatures different from that of the camera which transmits an image including a region selected as a reference region undergoes WB control based on a white region extracted from an image of the self camera.

Figure 20:
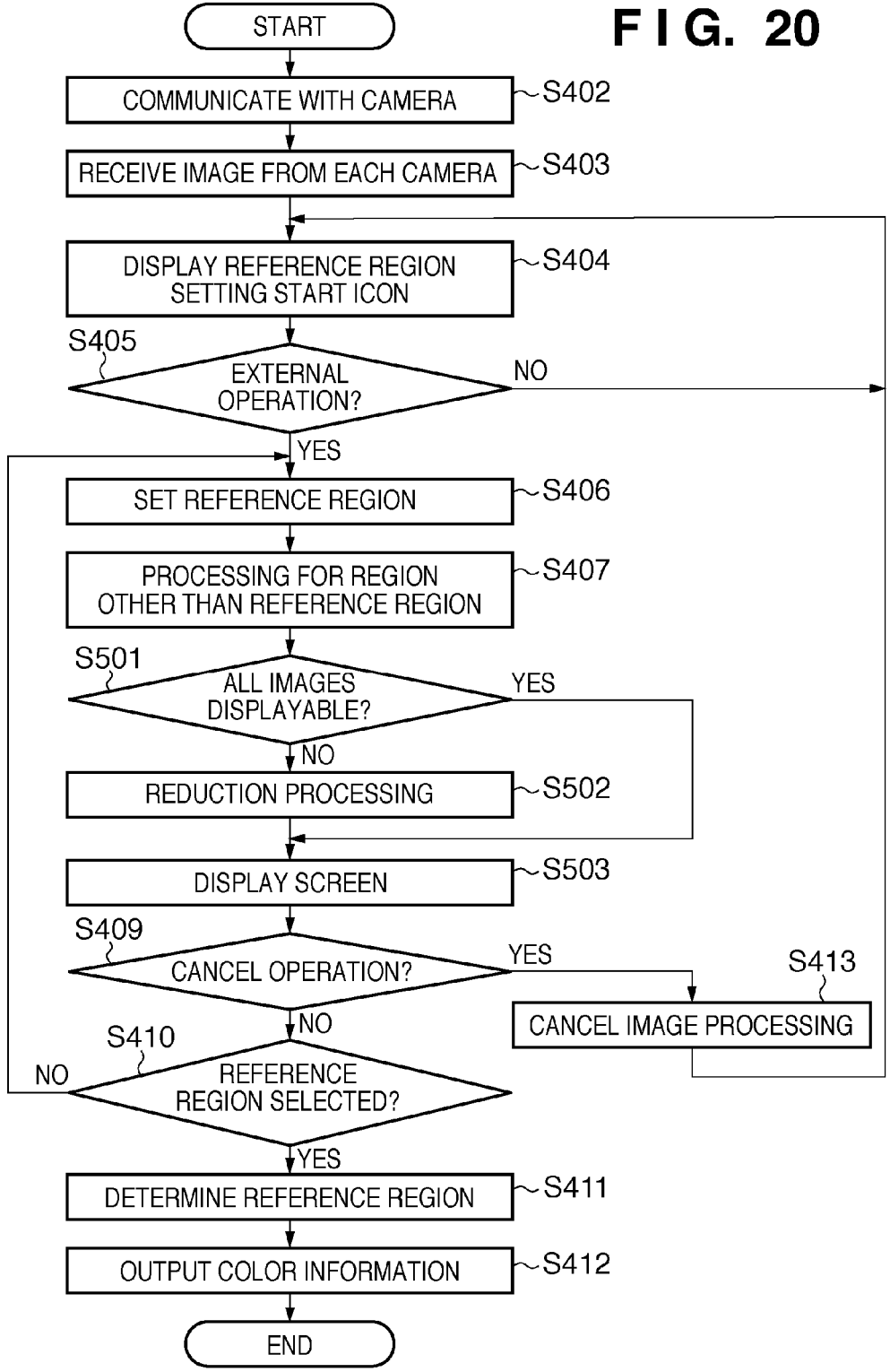
FIG. 20 is a flowchart showing image display processing by a system according to the eighth embodiment.
Figure 21:
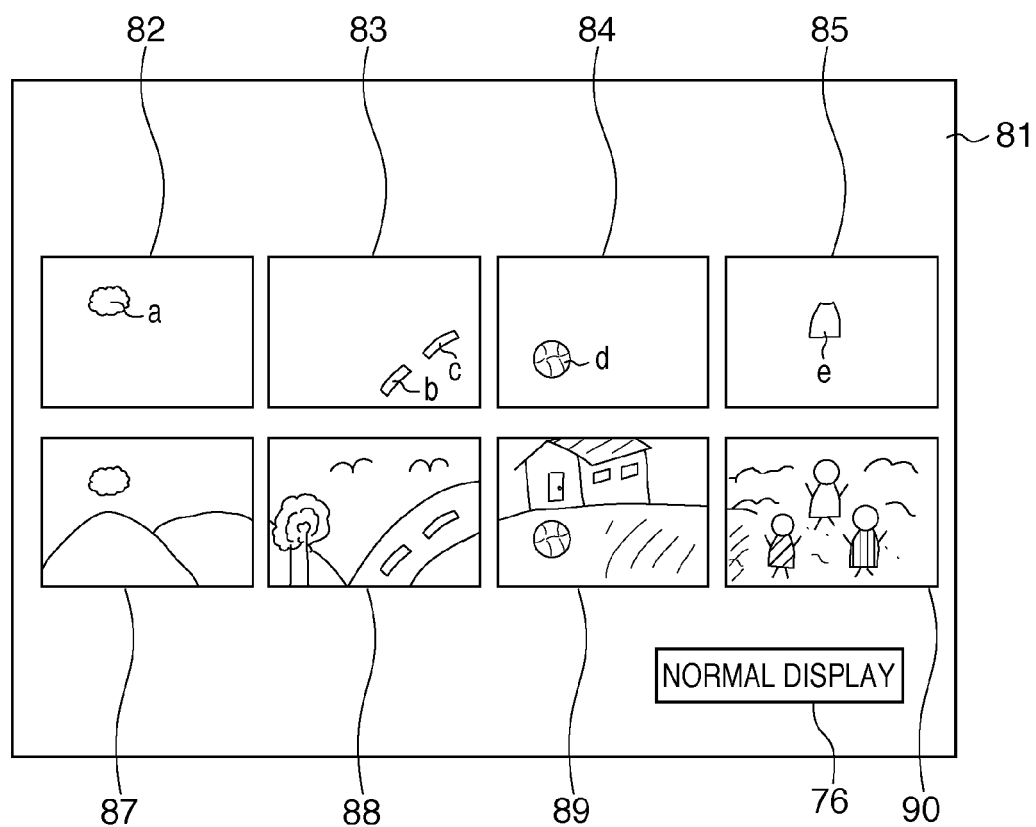
FIG. 21 is a view showing a display example of a UI screen by the system according to the eighth embodiment.

An eighth embodiment of the present invention will be described below referring to the drawings. FIG. 20 is a flowchart showing image display processing by a camera system according to the eighth embodiment. FIG. 21 is a view showing a UI screen example by the system of this embodiment.

Note that the arrangements of the camera system and a display apparatus according to this embodiment are the same as those in FIGS. 14 and 15, and a repetitive description thereof will be avoided.

Also, the same step numbers in FIG. 20 denote the same processes (S402 to S407, S409 to S413) as in FIG. 16, and a repetitive description thereof will be avoided.

It is checked in step S501 based on the sizes of windows that display images of cameras 5a to 5d and the number of cameras if reference region setting windows with the same size can be displayed within the full display screen. As an example of the checking method, it is checked if an occupation ratio of normal camera image sensing windows in the vertical or horizontal direction is 50% or more. As a result of checking, if the reference region setting windows can be displayed, the process jumps to step S503; otherwise, the process advances to step S502.

In step S502, a CPU 42 calculates a size that allows to display normal images and images processed so that regions other than regions indicating a color set in advance has a single color on a display unit 47. Reduction processing units A 43 and B 44 apply reduction processing to an image size according to the calculation result.

In step S503, the reference region setting images and normal images are laid out and displayed so that they can be displayed simultaneously, as exemplified in FIG. 21.

Referring to FIG. 21, reference numeral 81 denotes a size of the full screen of the display unit 47. Windows 82, 83, 84, and 85 respectively display the reference region setting images obtained by extracting set reference region parts from sensed images of the cameras 5a, 5b, 5c, and 5d, and painting the remaining regions in the single color. Windows 87, 88, 89, and 90 respectively display real-time images of the cameras 5a, 5b, 5c, and 5d. The display method shown in FIG. 21 is an example, and the present invention is not limited to such specific display method as long as the reference region setting images and normal images are displayed simultaneously.

With this arrangement as well, the same effects as in the seventh embodiment can be provided.

Figure 22:
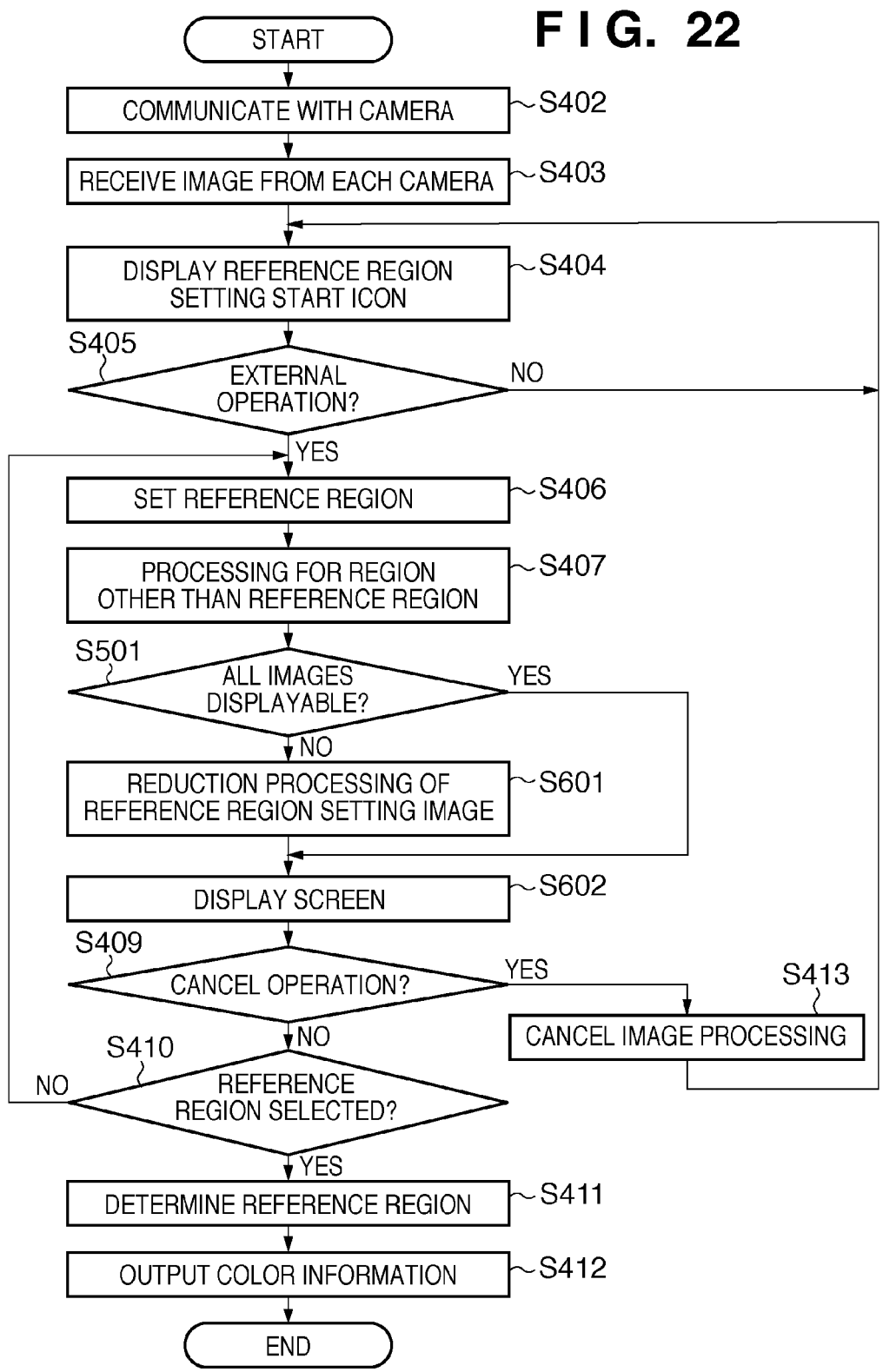
FIG. 22 is a flowchart showing image display processing by a system according to the ninth embodiment.
Figure 23:
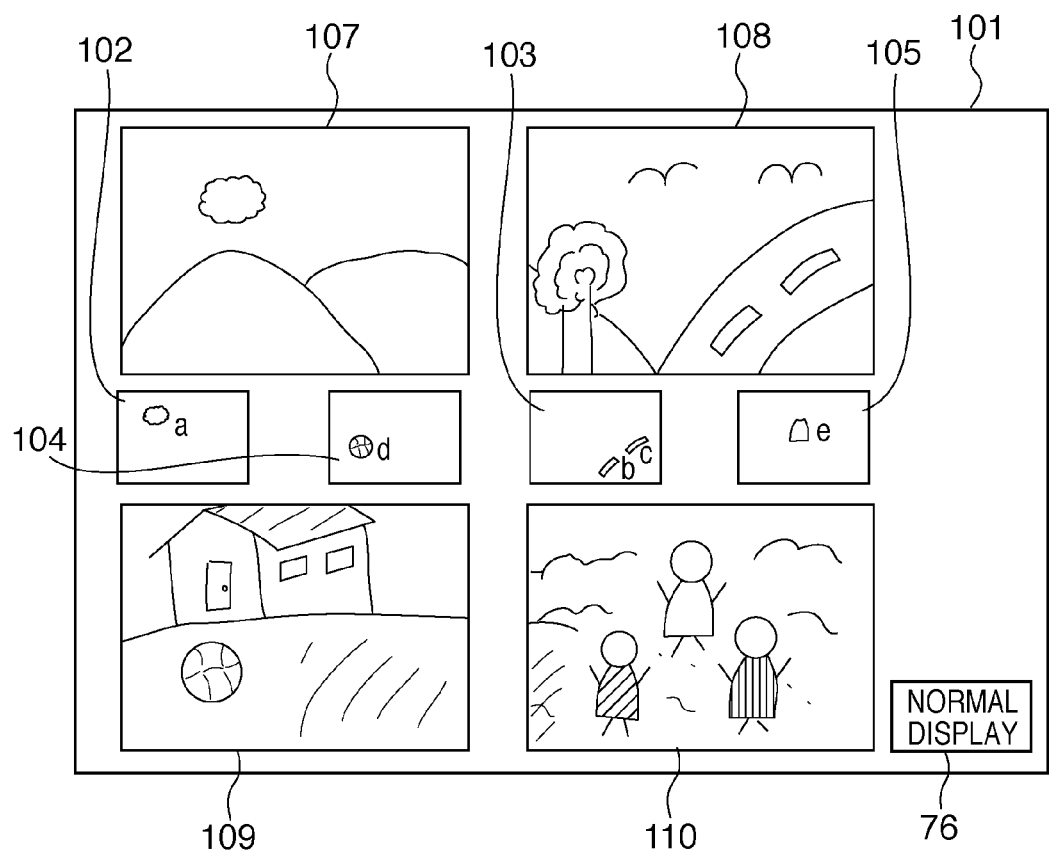
FIG. 23 is a view showing a display example of a UI screen by the system according to the ninth embodiment.

An ninth embodiment of the present invention will be described below referring to the drawings. FIG. 22 is a flowchart showing image display processing by a camera system according to the ninth embodiment. FIG. 23 is a view showing a UI screen example by the system of this embodiment.

Note that the arrangements of the camera system and a display apparatus according to this embodiment are the same as those in FIGS. 14 and 15, and a repetitive description thereof will be avoided.

Also, the same step numbers in FIG. 22 denote the same processes (S402 to S407, S409 to S413, S501) as in FIGS. 16 and 20, and a repetitive description thereof will be avoided.

If it is determined in step S501 that reference region setting windows can be displayed, the process advances to step S601, and a CPU 42 calculates a size that allows to display images processed by a second image processing unit 41 on a display unit 47 without changing the display size of images processed by a first image processing unit 40. A reduction processing unit B 44 applies reduction processing to an image size according to the calculation result.

In step S602, the reference region setting images are reduced in size with respect to normal images, and the reference region setting images and normal images are laid out and displayed without changing the resolution and window size of real-time normal images, so that these images can be simultaneously displayed, as exemplified in FIG. 23.

Referring to FIG. 23, reference numeral 101 denotes a size of the full screen of the display unit 47. Windows 102, 103, 104, and 105 respectively display the reference region setting images obtained by extracting set reference region parts from sensed images of the cameras 5a, 5b, 5c, and 5d, and painting the remaining regions in a single color. Windows 107, 108, 109, and 110 respectively display real-time images of the cameras 5a, 5b, 5c, and 5d. The display method shown in FIG. 23 is an example, and the present invention is not limited to such specific display method as long as the reference region setting images and normal images are displayed simultaneously.

With the aforementioned arrangement as well, the same effects as in the seventh embodiment can be provided.

Figure 24:
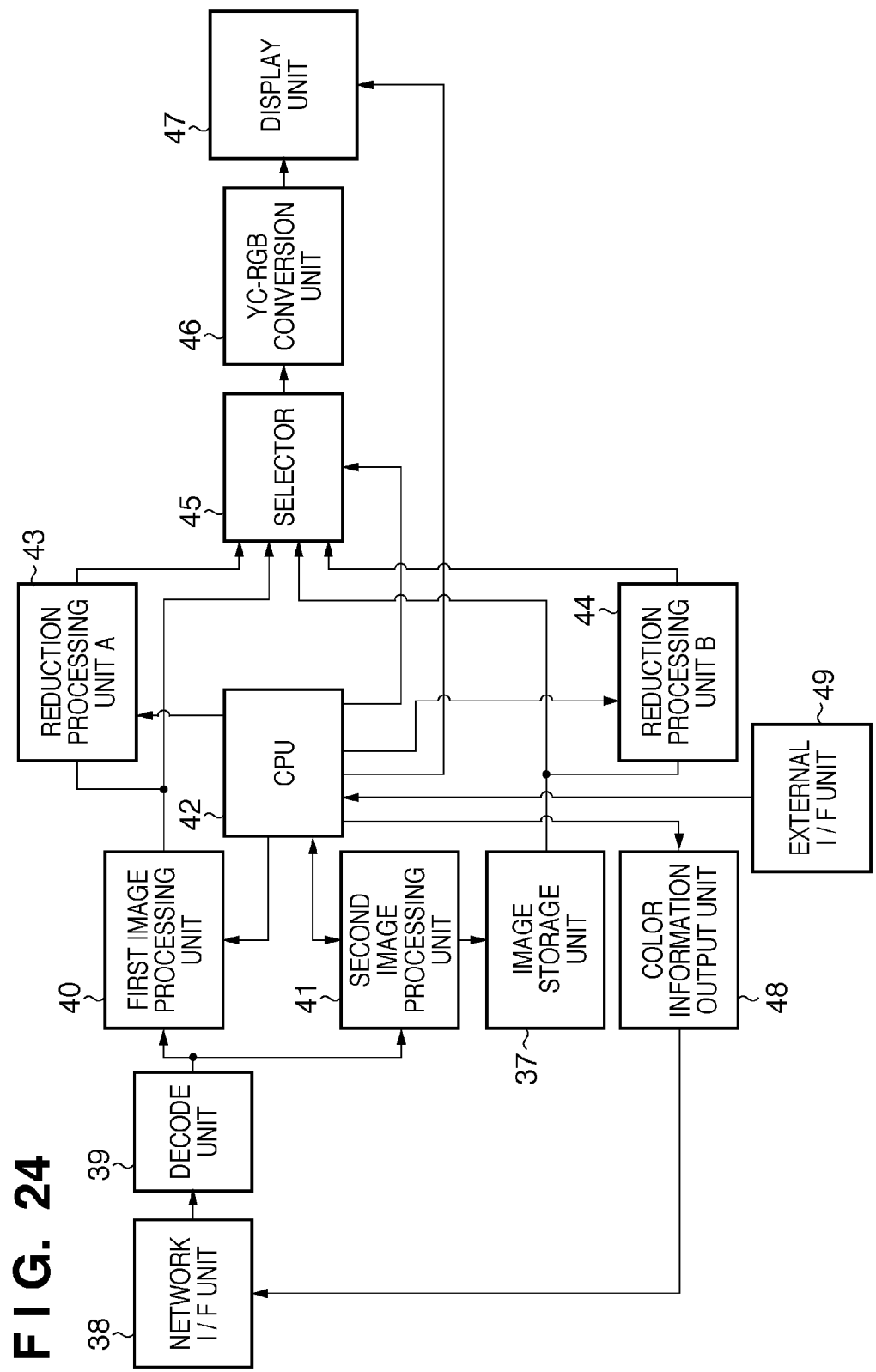
FIG. 24 is a block diagram showing the arrangement of a display apparatus according to the 10th Embodiment.
Figure 25:
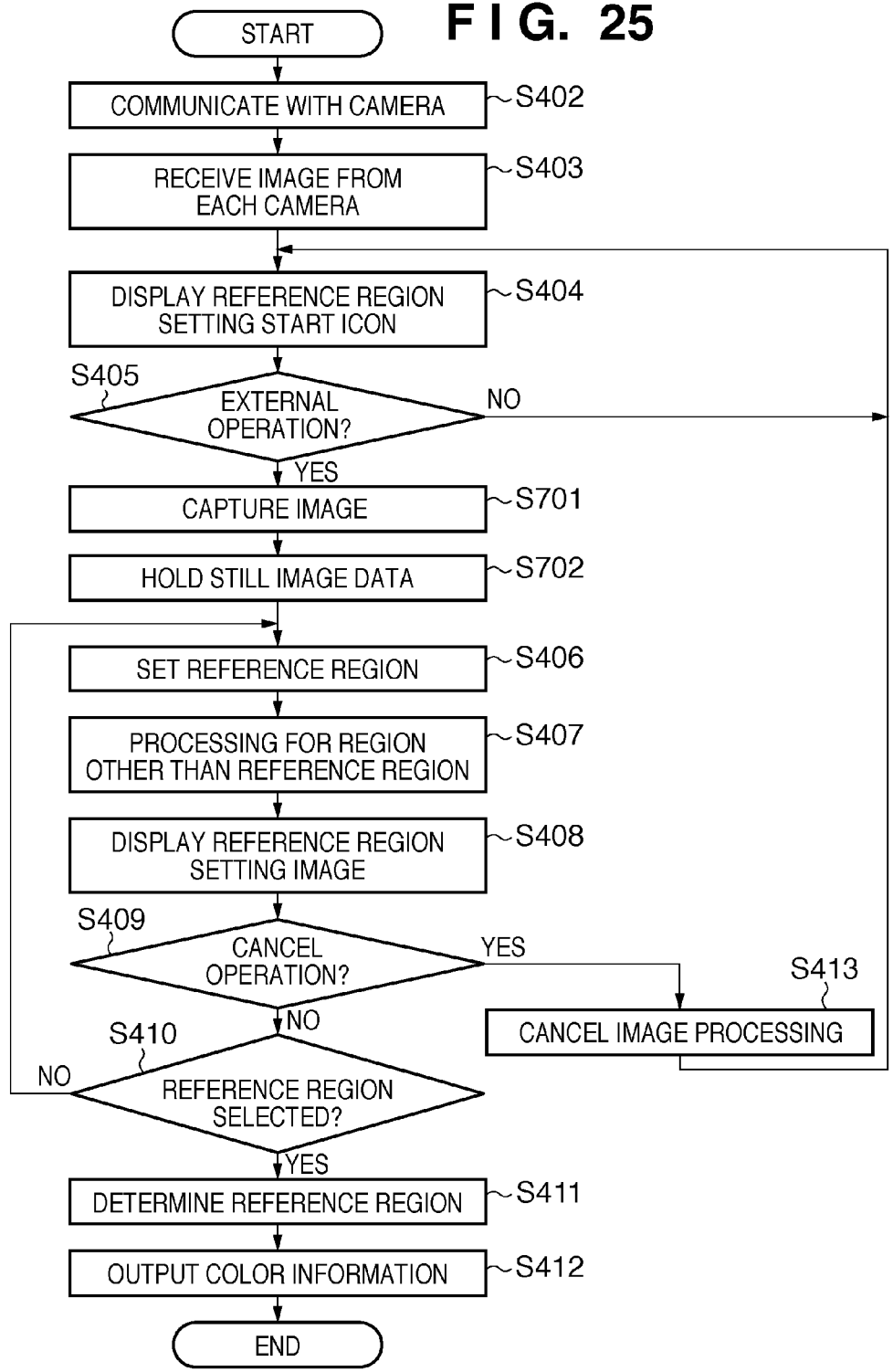
FIG. 25 is a flowchart showing image display processing by a system according to the 10th embodiment.

A 10th embodiment of the present invention will be described below referring to the drawings. FIG. 24 is a block diagram showing the arrangement of a display apparatus integrated with a camera control apparatus according to the 10th embodiment. FIG. 25 is a flowchart showing image display processing by a camera system of this embodiment.

As shown in FIG. 24, the display apparatus includes an image storage unit 37 which comprises a RAM or the like used to hold still image data processed by a second image processing unit 41. Image data processed by the second image processing unit 41 are output from this image storage unit 37 to a reduction processing unit B 44 and selector 45. Since other components are the same as those in FIG. 15, a repetitive description thereof will be avoided.

Also, the same step numbers in FIG. 25 denote the same processes (S402 to S405, S406 to S413) as in FIG. 16, and a repetitive description thereof will be avoided.

In step S701, a CPU 42 controls the second image processing unit 41 to capture still images after a predetermined frame from respective images (movies) of cameras 5a to 5d.

In step S702, the still images captured in step S701 are stored in the image storage unit 37.

After that, the process advances to step S406. In step S406, the second image processing unit 41 detects regions indicating a color which is set in advance from the still image data held in the image storage unit 37, analyzes color difference information of the corresponding images, and the positions of the regions indicating that color in the data on the screen, and feeds back the analysis result to the CPU 42.

Unlike in the seventh embodiment, the reference region setting images are not movies but still images, and the same applies to the eighth and ninth embodiments.

The display method of images on a display unit 47 and user's operation method are the same as those in any of the seventh to ninth embodiments.

According to this embodiment, upon designation of reference regions of AWB control of the plurality of cameras, since setting images are still images, the color of regions to be set can be easily designated.

Figure 26:
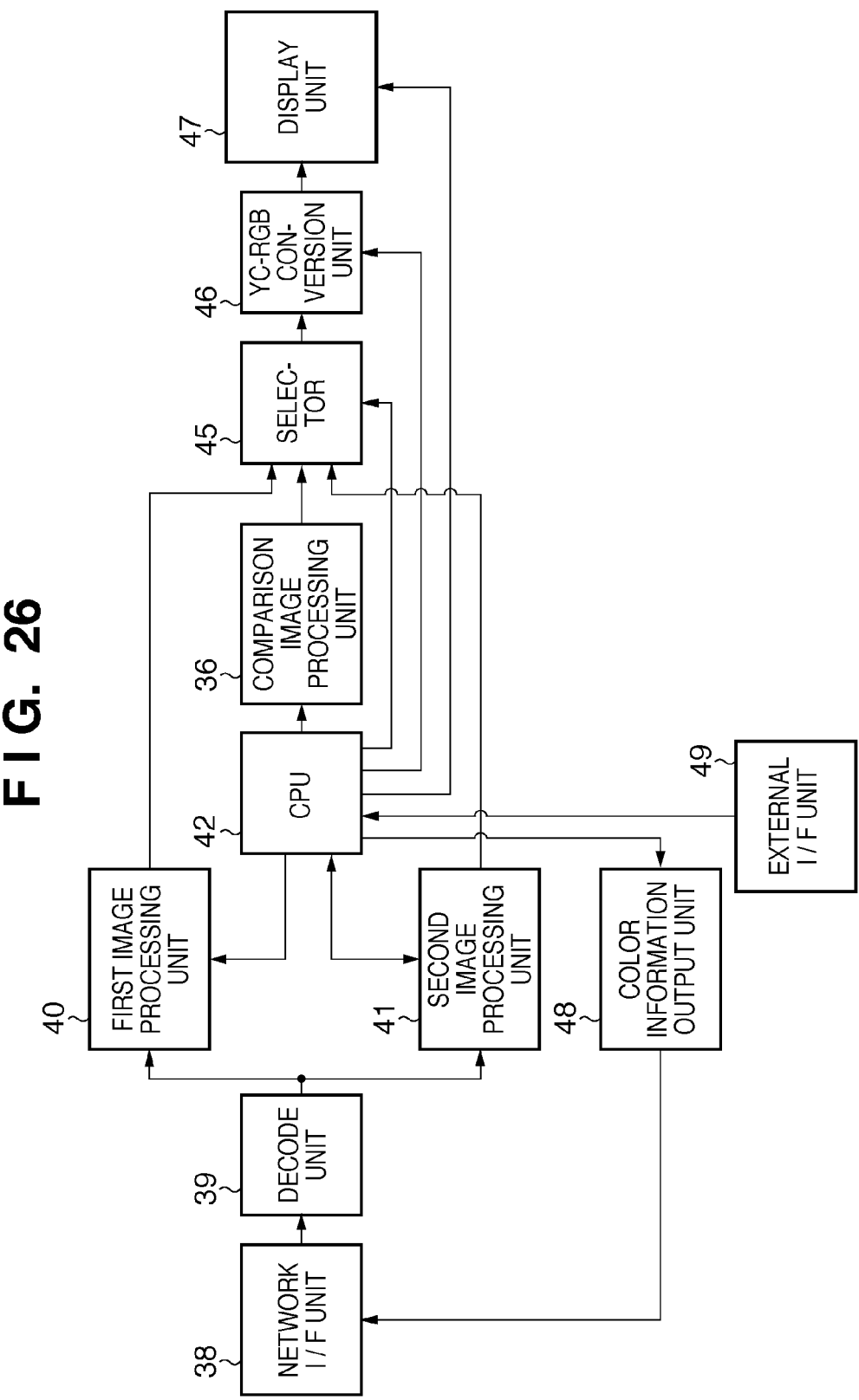
FIG. 26 is a block diagram showing the arrangement of a display apparatus according to the 11th Embodiment.
Figure 27:
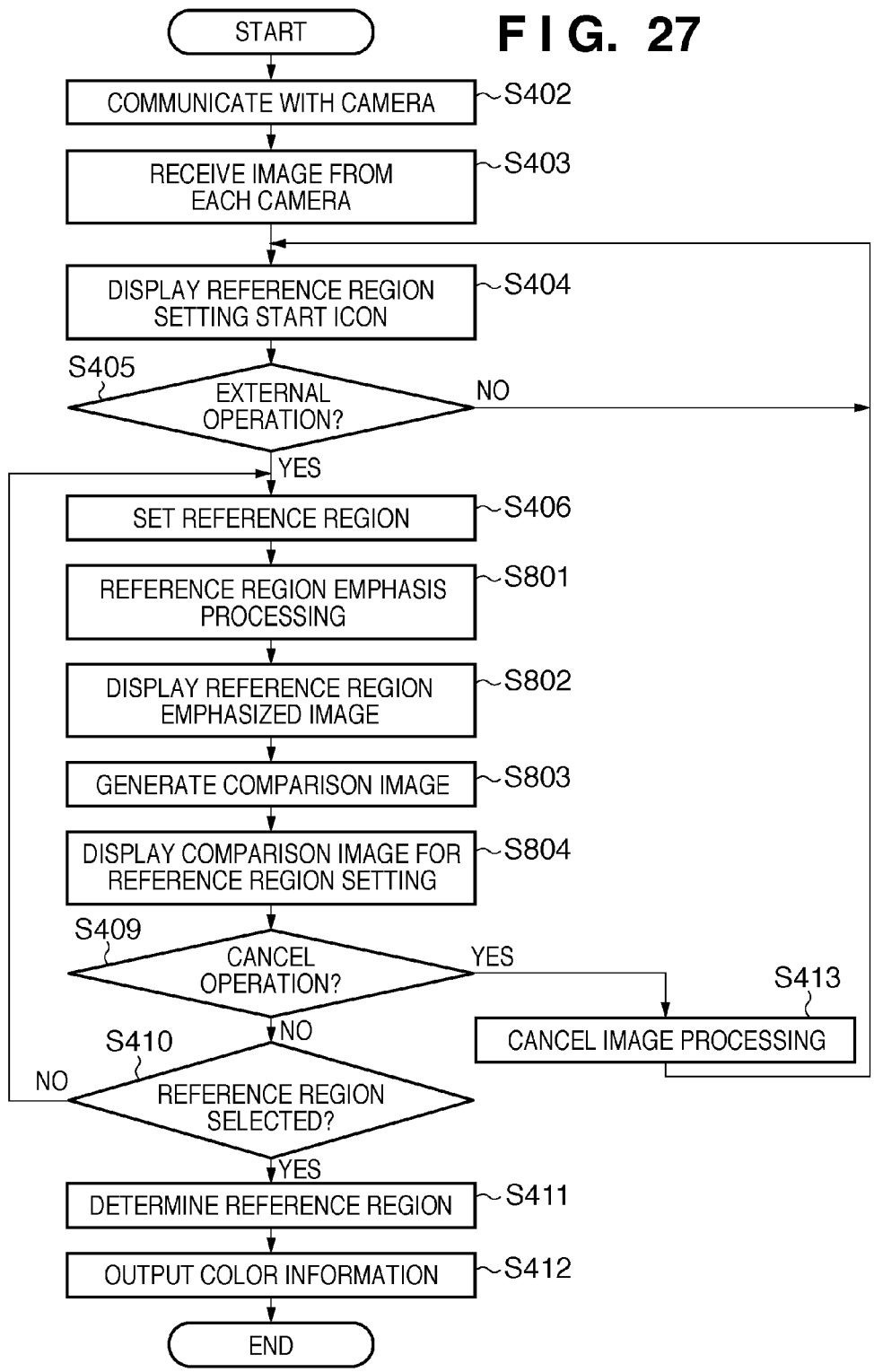
FIG. 27 is a flowchart showing image display processing by a system according to the 11th embodiment.
Figure 28:
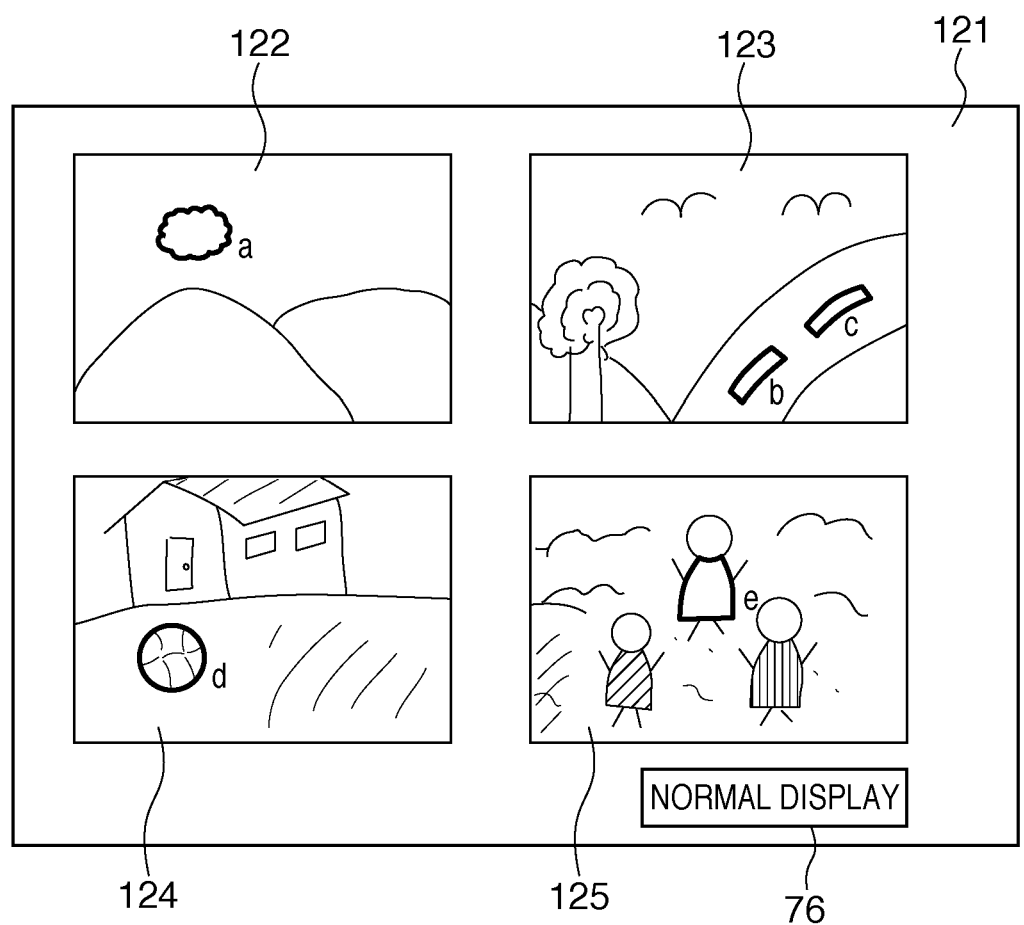
FIG. 28 is a view showing a display example of a UI screen by the system according to the 11th embodiment.
Figure 29:
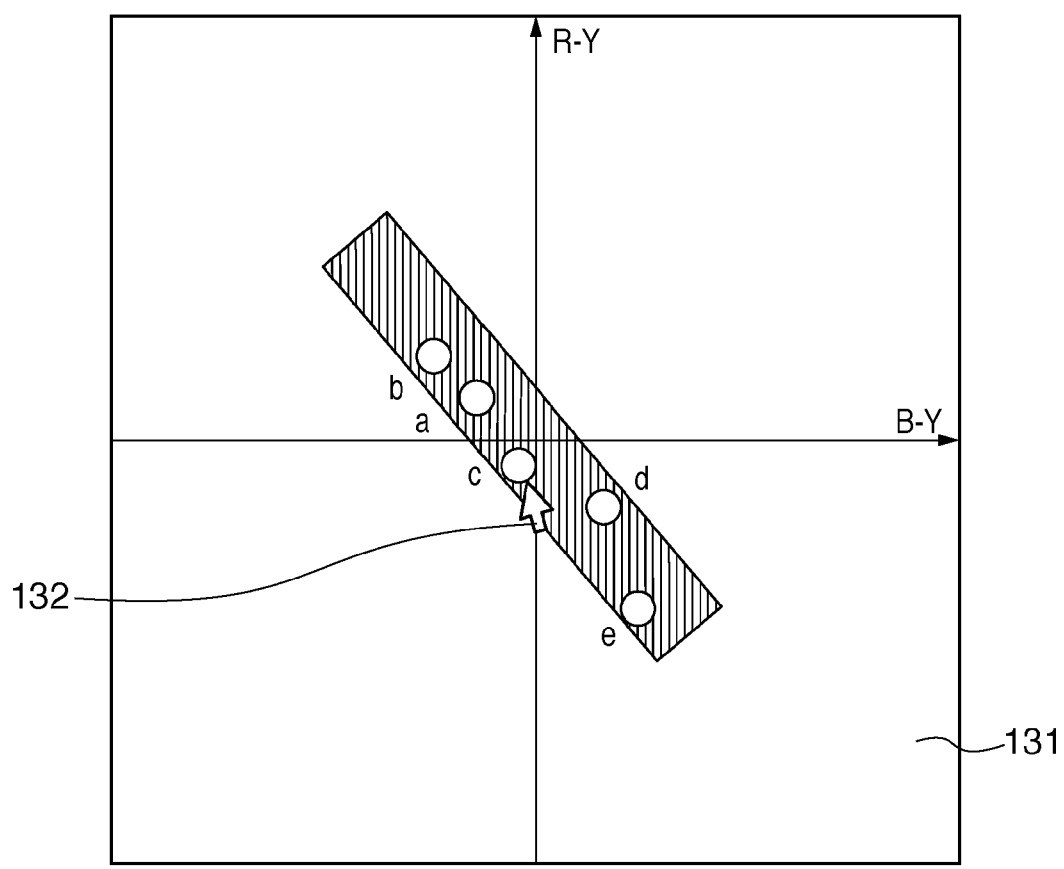
FIG. 29 is a view showing a display example of a UI screen by the system according to the 11th embodiment.

An 11th embodiment of the present invention will be described below referring to the drawings. FIG. 26 is a block diagram showing the arrangement of a display apparatus integrated with a camera control apparatus according to the 11th embodiment. FIG. 27 is a flowchart showing image display processing by a camera system of this embodiment. FIGS. 28 and 29 are views showing UI screen examples by the system of this embodiment.

As shown in FIG. 26, the display apparatus comprises a comparison image processing unit 36 which displays the color characteristics of reference candidate regions of respective images on a comparison matrix based on color difference information of certain parts fed back from a second image processing unit 41 to a CPU 42. Since other components are the same as those in FIG. 15, a repetitive description thereof will be avoided.

Also, the same step numbers in FIG. 27 denote the same processes (S402 to S406, S409 to S413) as in FIG. 16, and a repetitive description thereof will be avoided.

In step S801, the second image processing unit 41 sets regions indicating a color which is set in advance as reference candidate regions. The second image processing unit 41 executes processing for attaching frames for emphasis to the reference candidate regions, and also processing for appending tags "a", "b", "c", "d", and "e" to positions near the reference candidate regions.

In step S802, a selector 45 switches to output the images processed by the second image processing unit 41 in step S801 to subsequent blocks 46 and 47 in place of normal images from a first image processing unit 40. In this way, the images initially displayed as shown in FIG. 17 are switched to those shown in FIG. 28.

Referring to FIG. 28, reference numeral 121 denotes a size of the full screen of the display unit 47. Windows 122, 123, 124, and 125 respectively display images of cameras 5a, 5b, 5c, and 5d. In these images, the reference candidate regions "a", "b", "c", "d", and "e" are bounded by emphasis frames, and identifiers "a", "b", "c", "d", and "e" are displayed near these regions together with identification tags.

In step S802, an icon 76 used to make a cancel operation of the reference region setting display screen is displayed in place of an icon display used to set the reference regions displayed in step S404.

Referring back to FIG. 27, in step S803 an image obtained by plotting the color characteristics of the reference candidate regions in the images of the respective cameras is generated based on color difference information of the reference candidate regions, which is extracted by the second image processing unit 41 and is fed back to the CPU 42 in step S406. The process in this step is executed in such a manner that the CPU 42 transmits a control command together with required information to the comparison image processing unit 36.

In step S804, the selector 45 switches to output the image processed by the comparison image processing unit 36 in S803 to the subsequent blocks 46 and 47 in addition to the reference candidate region emphasized images from the second image processing unit 41. As a result, the image shown in FIG. 29 is displayed in addition to those shown in FIG. 28.

Referring to FIG. 29, reference numeral 131 denotes a color matrix for reference candidate region comparison as a whole. The abscissa direction indicates B−Y components, and the ordinate direction indicates R−Y components. In FIG. 29, five open circles shown near tags "a", "b", "c", "d", and "e" are displayed at positions corresponding to actual color characteristic values of the reference candidate regions "a", "b", "c", "d", and "e" in FIG. 28. Reference numeral 132 denotes an arrow cursor. When the user designates one of the five open circles indicating the color characteristics of the reference candidate regions shown in the matrix 131 by the cursor 132 and clicks it, he or she can select a reference region of his or her choice (S410).

It is checked in step S409 if the user makes a cancel operation using an input operation device 4. If the user makes a cancel operation, the process advances to step S413; otherwise, the process advances to step S410.

In step S413, the setting and display contents in steps S406 to S804 are reset, and the process returns to step S404 to display normal images sensed by the respective cameras.

It is checked in step S410 which of the open circles a, b, c, d, and e indicating the reference candidate regions on the screen of FIG. 29 the user selects. If the user does not make any operation, the process returns to step S406; if he or she selects one of the reference regions, the process advances to step S411.

In step S411, one of the reference candidate regions a, b, c, d, and e on the screen in FIG. 29, which is selected in step S410, is determined as a reference region. Assuming that the user selects a, since a is mapped on the color difference matrix shown in FIG. 29, this color difference value is determined as a white reference.

In this embodiment, the user designates the reference candidate region on the screen in FIG. 29. Alternatively, the user may designate one of the image regions "a" to "e", which are emphasis-displayed on the screen in FIG. 28, with reference to the information shown in FIG. 29. Also, the user may designate the reference candidate region on both the screens of FIGS. 28 and 29.

According to this embodiment, upon designating the reference regions of AWB control of the plurality of cameras, fine color characteristics of the reference regions among the cameras are displayed on the matrix to allow easy comparison, thus improving the operability.

Figure 30B:
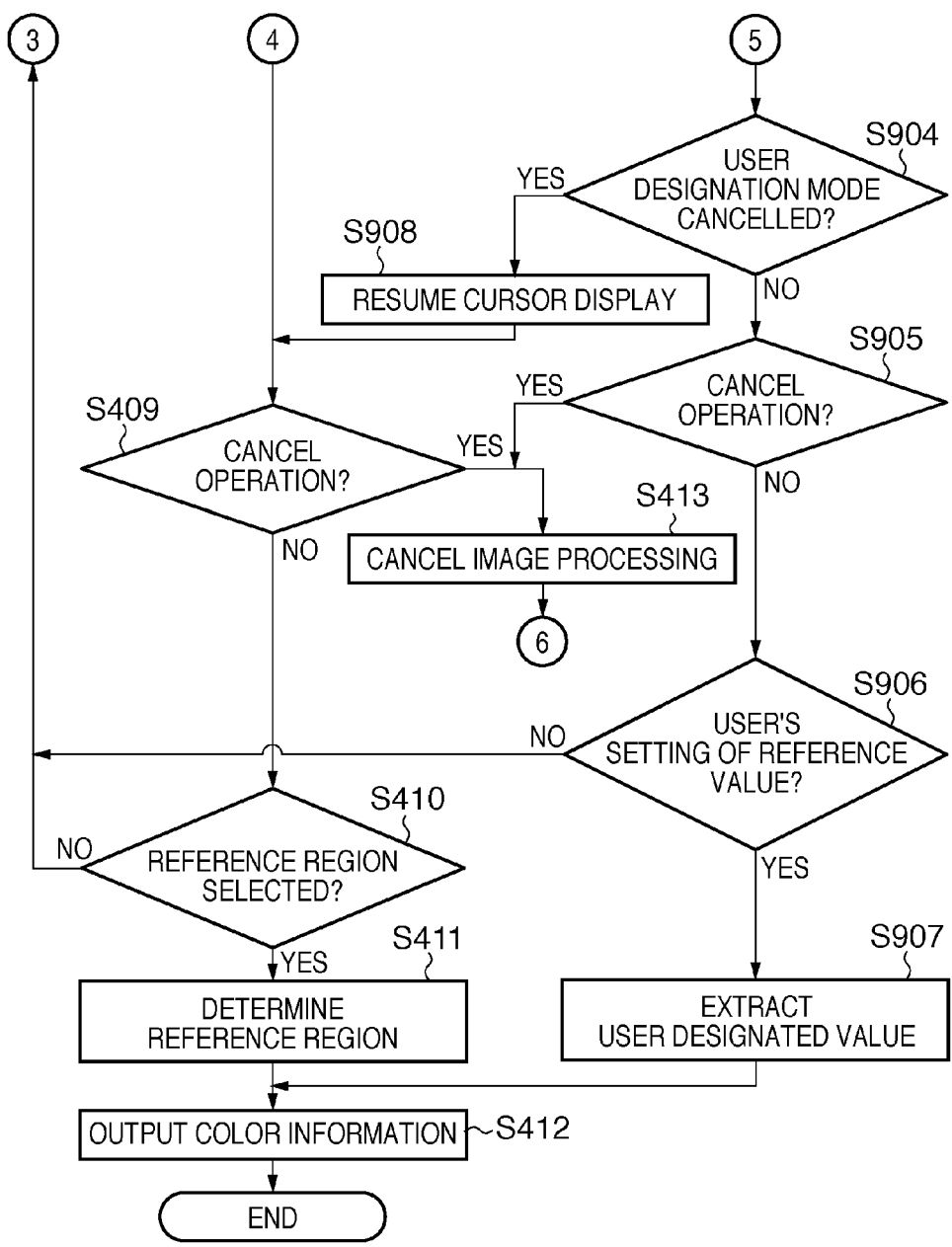
Figure 31:
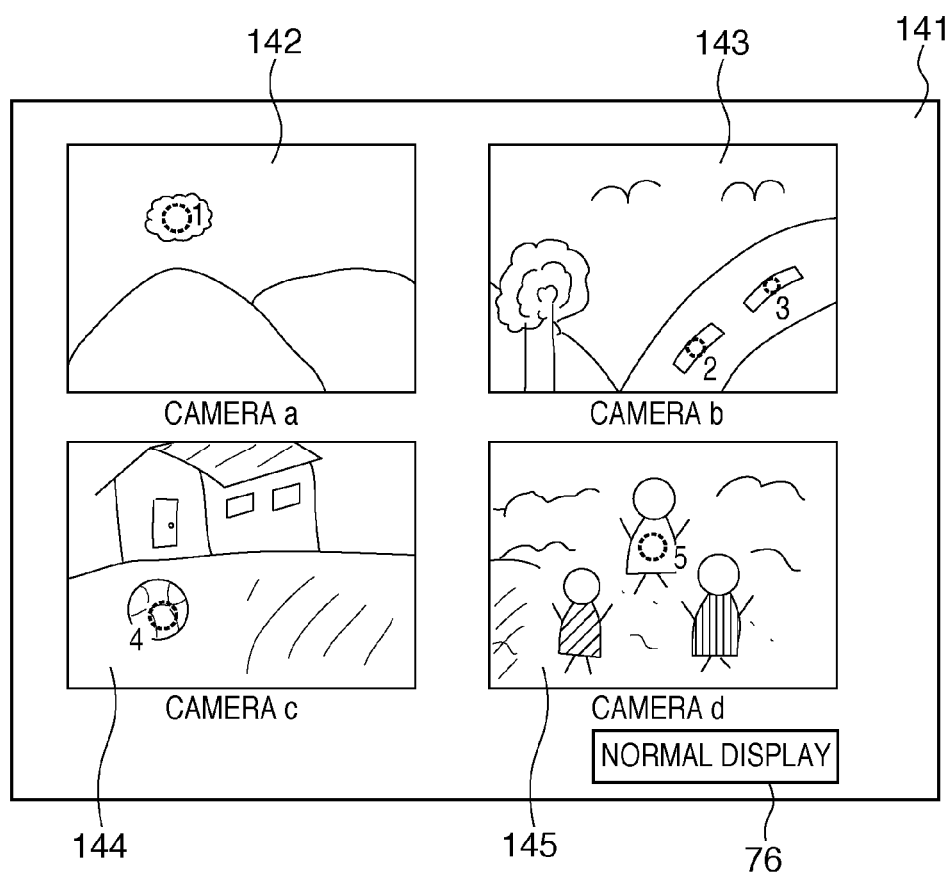
FIG. 31 is a view showing a display example of a UI screen by the system according to the 12th embodiment.
Figure 32:
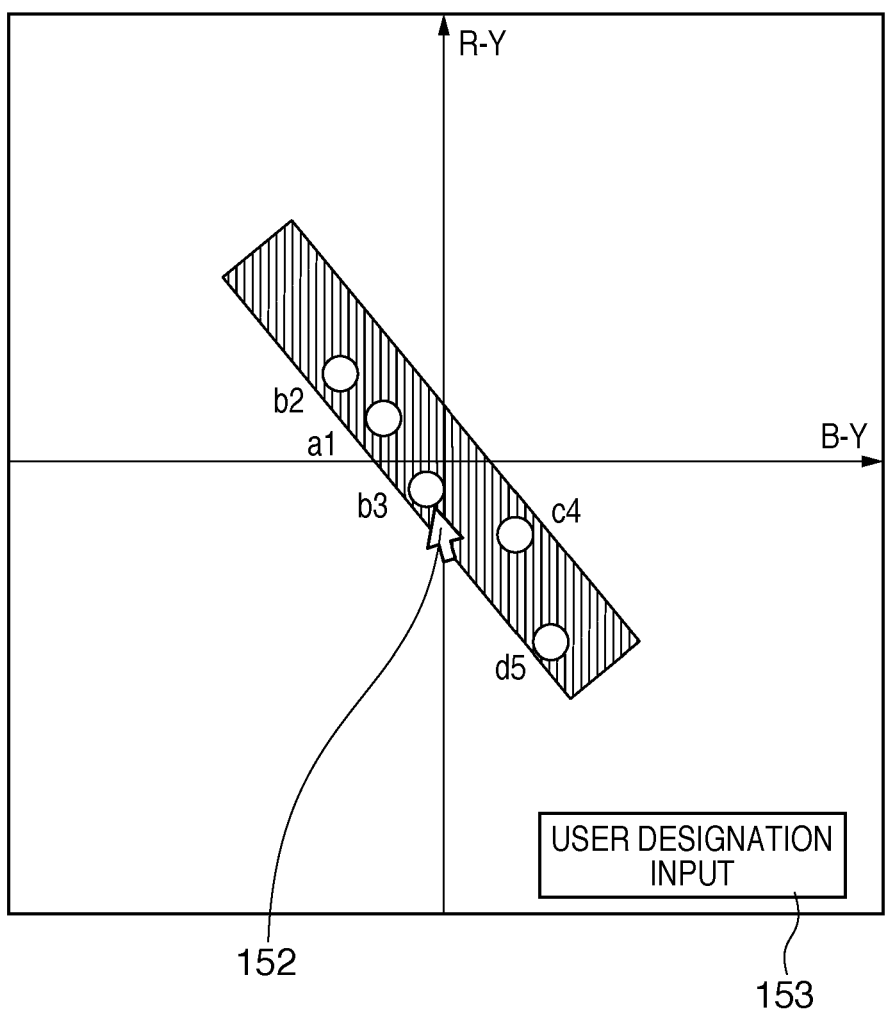
FIG. 32 is a view showing a display example of a UI screen by the system according to the 12th embodiment.
Figure 33:
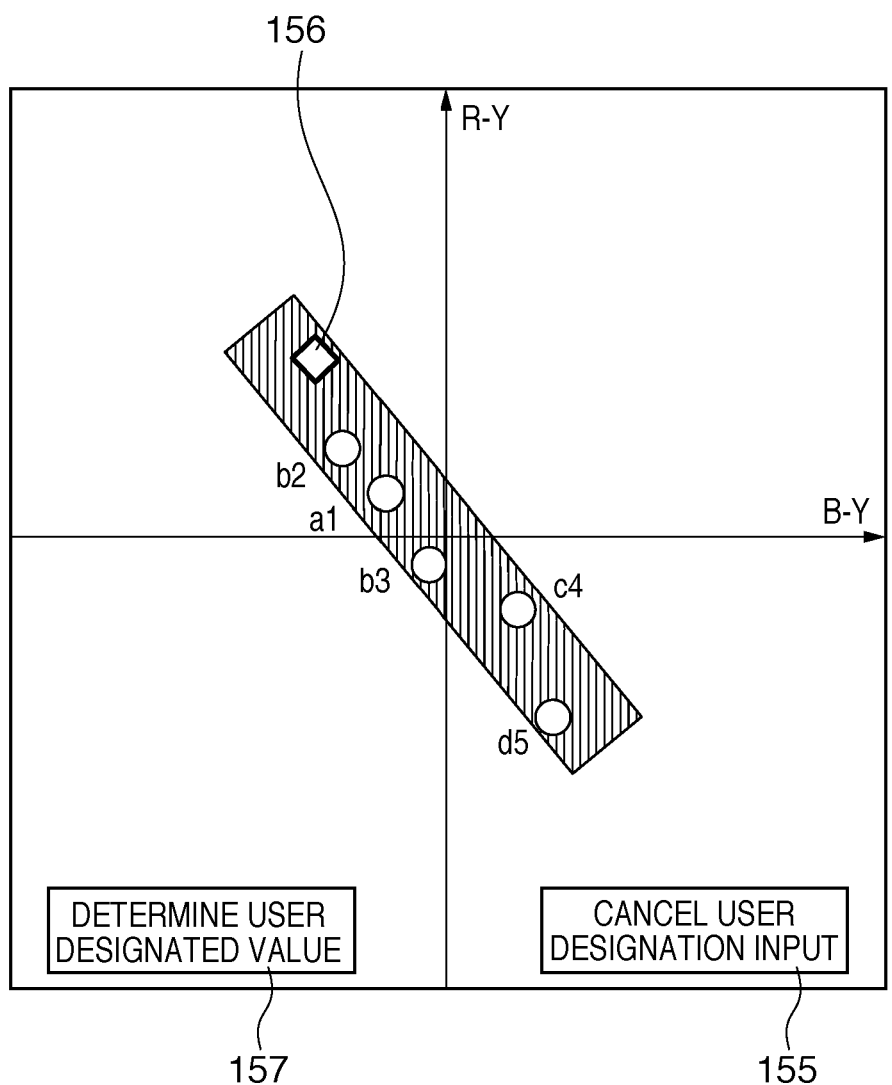
FIG. 33 is a view showing a display example of a UI screen by the system according to the 12th embodiment.

An 12th embodiment of the present invention will be described below referring to the drawings. FIGS. 30A and 30B are flowcharts showing image display processing by a camera system according to the 12th embodiment. FIGS. 31 to 33 are views showing UI screen examples by the system of this embodiment.

Since the arrangements of the camera system and a display apparatus of this embodiment are the same as those in FIGS. 14 and 26, a description thereof will not be given.

Also, the same step numbers in FIGS. 30A and 30B denote the same processes (S402 to S406, S409 to S413, S801 to S804) as in FIGS. 16 and 27, and a repetitive description thereof will be avoided.

A comparison image processing unit 36 of this embodiment has a function of displaying color characteristics which are input from an external I/F unit 49 and are designated by the user on a comparison matrix in addition to the function described in the 11th Embodiment.

Referring to FIGS. 30 A and 30B, after step S804, images shown in FIGS. 31 and 32 are displayed on a display unit 47.

FIG. 31 shows a UI screen example that displays reference candidate regions in images of the respective cameras. Referring to FIG. 31, reference numeral 141 denotes a size of the full screen of the display unit 47. Windows 142, 143, 144, and 145 respectively display images of cameras 5a, 5b, 5c, and 5d. In the images, respective parts of reference candidate regions "1", "2", "3", "4", and "5" are bounded by dotted circles, and identifiers "1", "2", "3", "4", and "5" are displayed near the dotted circles together with identification tags. Under the respective images, "camera a", "camera b", "camera c", and "camera d" are displayed as identification information of the respective cameras. Note that serial numbers or symbols common to images of the respective cameras are assigned as the identifiers of the reference candidate regions.

In the 11th embodiment, the reference candidate regions are bounded by emphasis frames. However, in this embodiment, particularly representative parts of the reference candidate regions are bounded by dotted circles.

FIG. 32 shows a UI screen used to compare the color characteristics of the reference candidate regions of the respective cameras. The configuration shown in FIG. 32 is basically the same as that in FIG. 29, but tags are assigned like "a1", "b2", "b3", "c4", and "d5" as combinations of the pieces of camera information a to d and serial numbers 1 to 5 of the reference candidate regions.

Also, the screen in FIG. 32 displays a rectangular icon 153 "user designation input" which is used to set a user designation mode that allows the user to directly input reference color difference information in place of selection from the reference candidate regions. The icon display method is also not particularly limited as in the above embodiments.

Referring back to FIGS. 30A and 30B, it is checked in step S901 if the user designation mode has already been set. If that mode has already been set, the process jumps to step S904.

It is checked in step S902 if the user inputs a change instruction to the user designation mode. The change instruction to the user designation mode is implemented when the user selects the "user designation input" icon 153 in FIG. 32 via the external I/F unit 49.

If it is determined in step S902 that the icon 153 is selected, a CPU 42 notifies the comparison image processing unit 36 of the change instruction to the user designation mode.

As a result, in step S903 the comparison image processing unit 36 changes the arrow cursor 152 in FIG. 32 to, for example, a rhombic cursor 156 in FIG. 33. Also, the comparison image processing unit 36 changes the "user designation input" icon 153 in FIG. 32 to a rectangular icon 155 "cancel user designation input" in FIG. 33, also displays a "determine user designated value" icon 157 in FIG. 33, and outputs them to subsequent blocks 45, 46, and 47.

It is checked in step S904 if the user makes a cancel operation of the user designation mode. Note that the cancel operation is implemented when the user selects the "cancel user designation input" icon 155 in FIG. 33.

If the user makes the cancel operation of the user designation mode, the process advances to step S908; otherwise, the process advances to step S905.

In step S908, the process opposite to step S903 is executed to revert the cursor display from FIG. 33 to FIG. 32. That is, the comparison image processing unit 36 changes the rhombic cursor 156 in FIG. 33 to the arrow cursor 152 in FIG. 32.

Also, the comparison image processing unit 36 displays the "user designation input" icon 153 in FIG. 32 in place of the "cancel user designation input" icon 155 in FIG. 33, and outputs them to the subsequent blocks 45, 46, and 47 in FIG. 26.

It is checked in step S905 if the user makes a cancel operation of the reference region setting processing. Note that the cancel operation is implemented when the user selects a "normal display" icon 76 in FIG. 31.

If the user makes the cancel operation, the process advances to step S413; otherwise, the process advances to step S906.

It is checked in step S906 if the user designates reference color characteristics on the color difference matrix in FIG. 33 using the cursor 156 in FIG. 33. In this case, the user designates color characteristics of his or her favor on the color difference matrix by moving the cursor 156 in FIG. 33. Then, the user selects the "determine user designated value" icon 157 in FIG. 33, thus setting the characteristic value on the color difference matrix at a position of the cursor 156 as reference color difference information. Note that the characteristic value on the color difference matrix at the position of the cursor 156 is set as the reference color difference information when the user selects the "determine user designated value" icon 157. However, the present invention is not limited to such specific method. For example, if no "determine user designated value" icon 157 is displayed, the user can issue a setting instruction by associating an operation for double-clicking the cursor position with that instruction.

If the user makes the setting operation, the process advances to step S907; otherwise, the process returns to step S406.

In step S907, the characteristic value on the color difference matrix, which is set in step S906 and designated by the icon 157 in FIG. 33, is determined as reference color difference information, and a value at the center of the rhombus of the cursor 156 is determined as a white reference.

According to this embodiment, the user can easily set a color difference characteristic value of his or her favor as a reference value of the AWB control.

Figure 34:
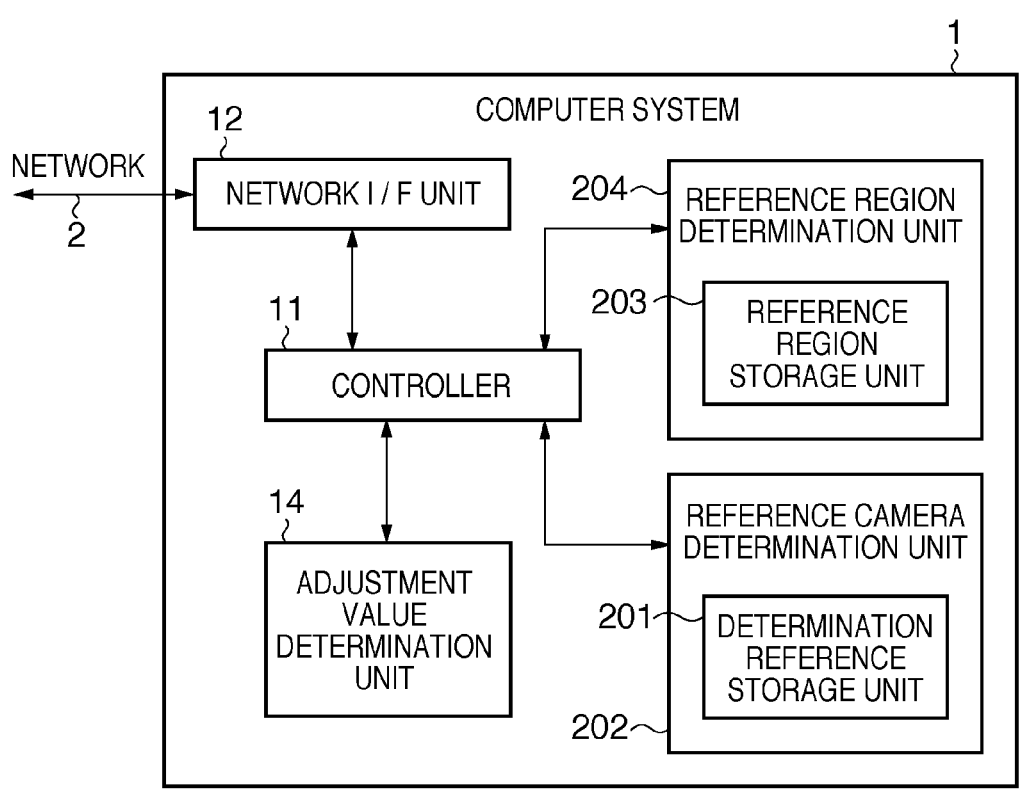
FIG. 34 is a block diagram showing the arrangement of a camera control apparatus according to the 13th embodiment.

A 13th embodiment of the present invention will be described below referring to the drawings. FIG. 34 is a block diagram showing the arrangement of a camera control apparatus according to the 13th embodiment, which is applied to the camera system shown in FIG. 1, and the same reference numerals in FIG. 34 denote the same parts as in FIG. 2. The arrangement and operation of cameras 5a to 5c are as have been described with reference to FIG. 3.

Referring to FIG. 34, a reference camera determination unit 202 has a determination reference storage unit 201 which stores a determination condition of a camera that senses an image to be used as a reference of color reproducibility (reference camera). The reference camera determination unit 202 executes processing for determining and changing a reference camera for color gain adjustment from the cameras 5a to 5c based on the predetermined determination condition stored in the determination reference storage unit 201. Note that the user may visually confirm images which are sensed by the cameras 5a to 5c and are displayed on a display apparatus 3 connected to a network 2, and may transmit a reference camera designation command or change command by operating an input operation device 4 arranged near the display apparatus 3.

The reference camera determination processing by the reference camera determination unit 202 will be described below with reference to the flowchart of FIG. 35.

In the following description, whether or not to satisfy the reference camera determination condition is checked in turn from the camera 5a.

It is checked if a predetermined period of time has elapsed after the reference camera was determined or changed (S1001). If the predetermined period of time has not elapsed yet, this processing ends; otherwise, a sensed image of the camera 5a is acquired (S1002).

It is checked if the color temperature of the sensed image acquired from the camera 5a falls within a predetermined range stored in the determination reference storage unit 201 (S1003). If the color temperature falls within the predetermined range, the camera 5a is determined as a reference camera (S1004).

On the other hand, if the color temperature falls outside the predetermined range, it is checked if the process for checking whether or not to satisfy the reference camera determination condition is complete for all sensed images (S1005).

In this case, since the checking process is not complete for all the sensed images yet, a sensed image of the next camera 5b is acquired (S1002), and it is checked if the sensed image of the camera 5b satisfies the reference camera determination condition as in the camera 5a. If the sensed image of the camera 5b does not satisfy the reference camera determination condition, either, a sensed image of the camera 5c is acquired to execute the same checking process. If the sensed image of the camera 5c does not satisfy the reference camera determination condition, either, since the images of all the cameras do not satisfy the reference camera determination condition, the processing ends without changing the reference camera.

In this embodiment, the color temperature of the sensed image acquired from the camera is used as the reference camera determination condition. Alternatively, it may be checked if a luminance value of the sensed image is equal to or higher than a predetermined threshold.

Also, it may be checked if the number of pixels (to be referred to as W pixels hereinafter) within a color difference range of a white extraction range W shown in FIG. 5 in the sensed image is equal to or larger than a threshold stored in the determination reference storage unit 201. Then, a camera which satisfies this condition or includes the largest number of W pixels may be determined as a reference camera.

Furthermore, it may be checked if an area of continuous W pixels in the sensed image is equal to or larger than a threshold stored in the determination reference storage unit 201. Then, a camera which satisfies this condition or has the largest area of continuous W pixels may be determined as a reference camera.

Moreover, if the sensed image does not include high frequency components more than a frequency stored in the determination reference storage unit 201, that image may be determined as an out-of-focus image, and a sensed image of the next camera may be acquired.

A reference region determination unit 204 has a reference region storage unit 203. When a reference region designation command is received, the reference region determination unit 204 determines a region designated by the reference region designation command in each of the images sensed by the cameras 5a to 5c as a reference region of each camera, and stores it in the reference region storage unit 203.

On the other hand, when no reference region designation command is received, the reference region determination unit 204 determines a region including W pixels as many as the predetermined number of pixels or more within the color difference range of the white extraction range W shown in FIG. 5 from each of the images sensed by the cameras 5a to 5c as a reference region of each camera, and stores it in the reference region storage unit 203. In this case, if the reference region storage unit 203 stores the reference region of the reference camera at the time of previous color adjustment, and that reference region includes W pixels as many as the predetermined number of pixels or more, that region is used as the reference region intact.

In this embodiment, a controller 11, the reference camera determination unit 202, the reference region determination unit 204, and an adjustment value determination unit 14 have been described as independent components. However, all or some of these components may be mounted on an LSI together to provide a component having equivalent functions.

According to this embodiment, since an elapsed time period after the previous change of the reference camera is stored, when WB control is required after an elapse of the predetermined period of time, the reference camera used as a reference for color adjustment can be automatically switched.

Figure 36:
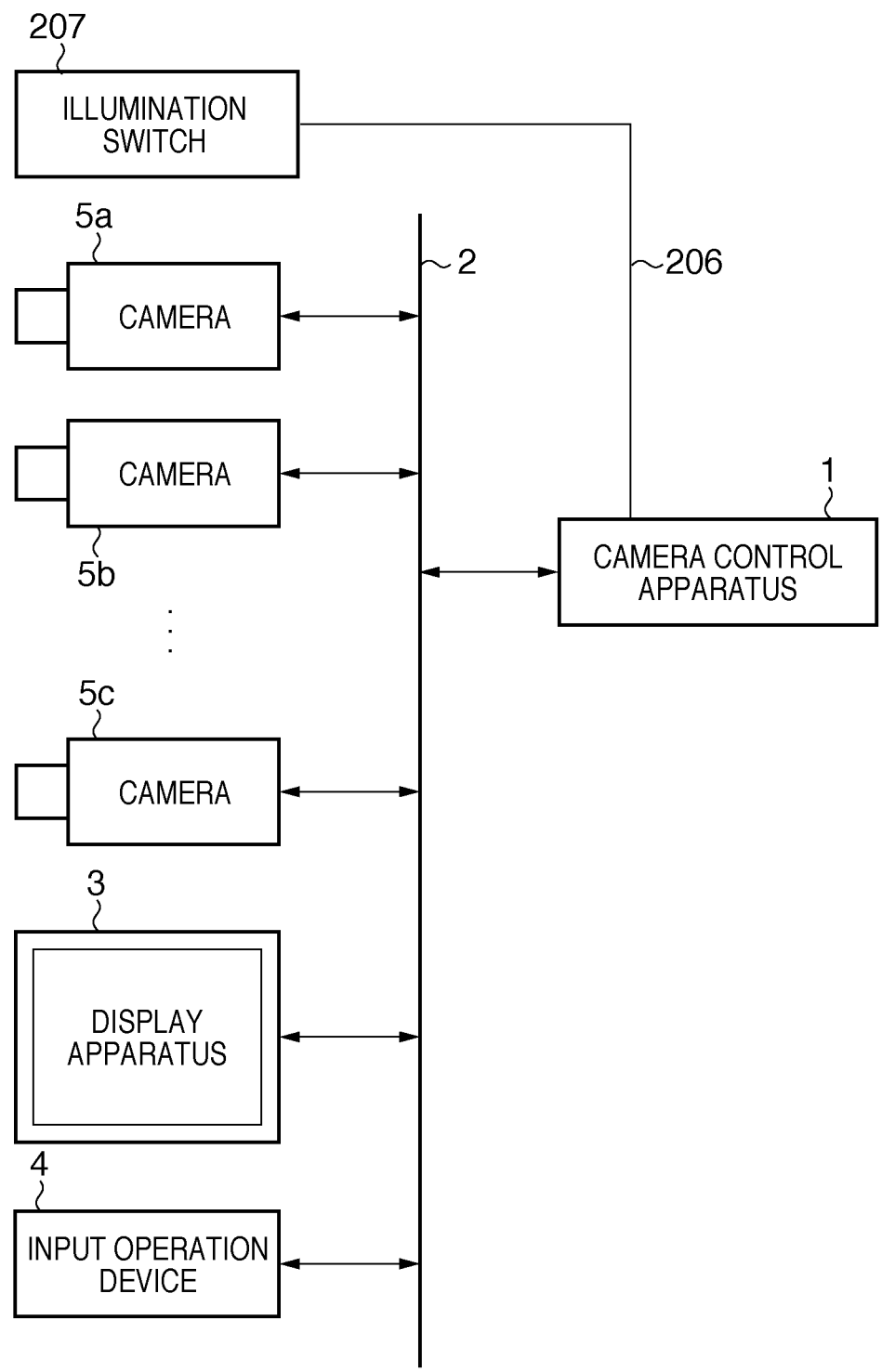
FIG. 36 is a block diagram showing the arrangement of a camera system according to the 14th embodiment.
Figure 37:
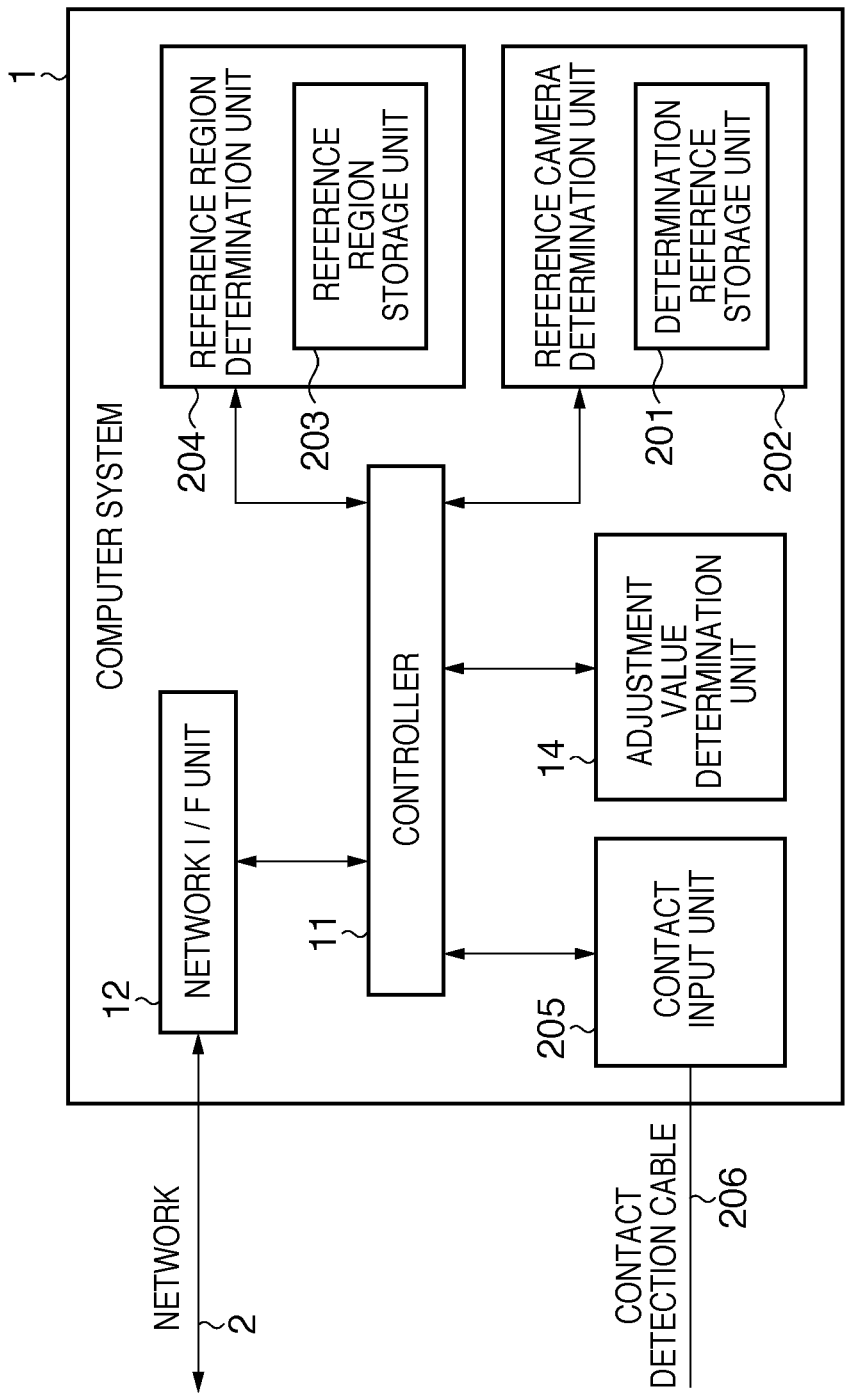
FIG. 37 is a block diagram showing the arrangement of a camera control apparatus according to the 14th embodiment.

A 14th embodiment of the present invention will be described below referring to the drawings. FIG. 36 is a block diagram showing the arrangement of a camera system according to the 14th embodiment. FIG. 37 is a block diagram showing the arrangement of a camera control apparatus according to the 14th embodiment. The same reference numerals in FIGS. 36 and 37 denote the same parts as in FIG. 1 of the first embodiment and FIG. 34 of the 13th embodiment.

In the system of the 14th embodiment, an illumination switch 207 as a peripheral device is added to a camera control apparatus 1 via a contact detection cable 206, as shown in FIG. 36.

Referring to FIG. 37, the camera control apparatus 1 of this embodiment has a contact input unit 205 which is connected to the contact detection cable 206. The contact input unit 205 detects via the contact detection cable 206 that the illumination switch 207 is turned on, and notifies a reference camera determination unit 202 of the ON state via a controller 11.

Figure 38:
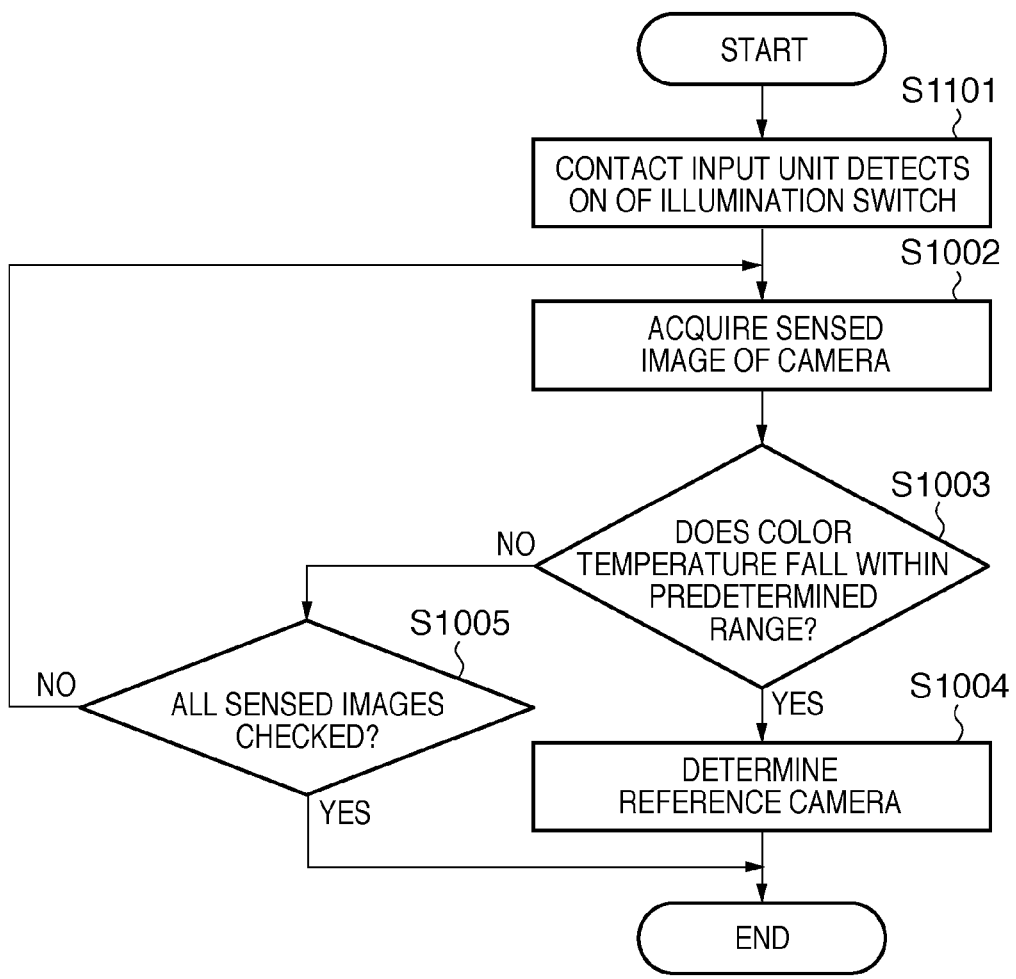
FIG. 38 is a flowchart showing reference camera determination processing according to the 14th embodiment.

The reference camera determination processing of the reference camera determination unit 202 will be described below with reference to the flowchart of FIG. 38. Note that the same step numbers in FIG. 38 denote the same processes (S1002 to S1005) as in FIG. 35, and a repetitive description thereof will be avoided.

In the following description, whether or not to satisfy the reference camera determination condition is checked in turn from a camera 5a.

Figure 35:
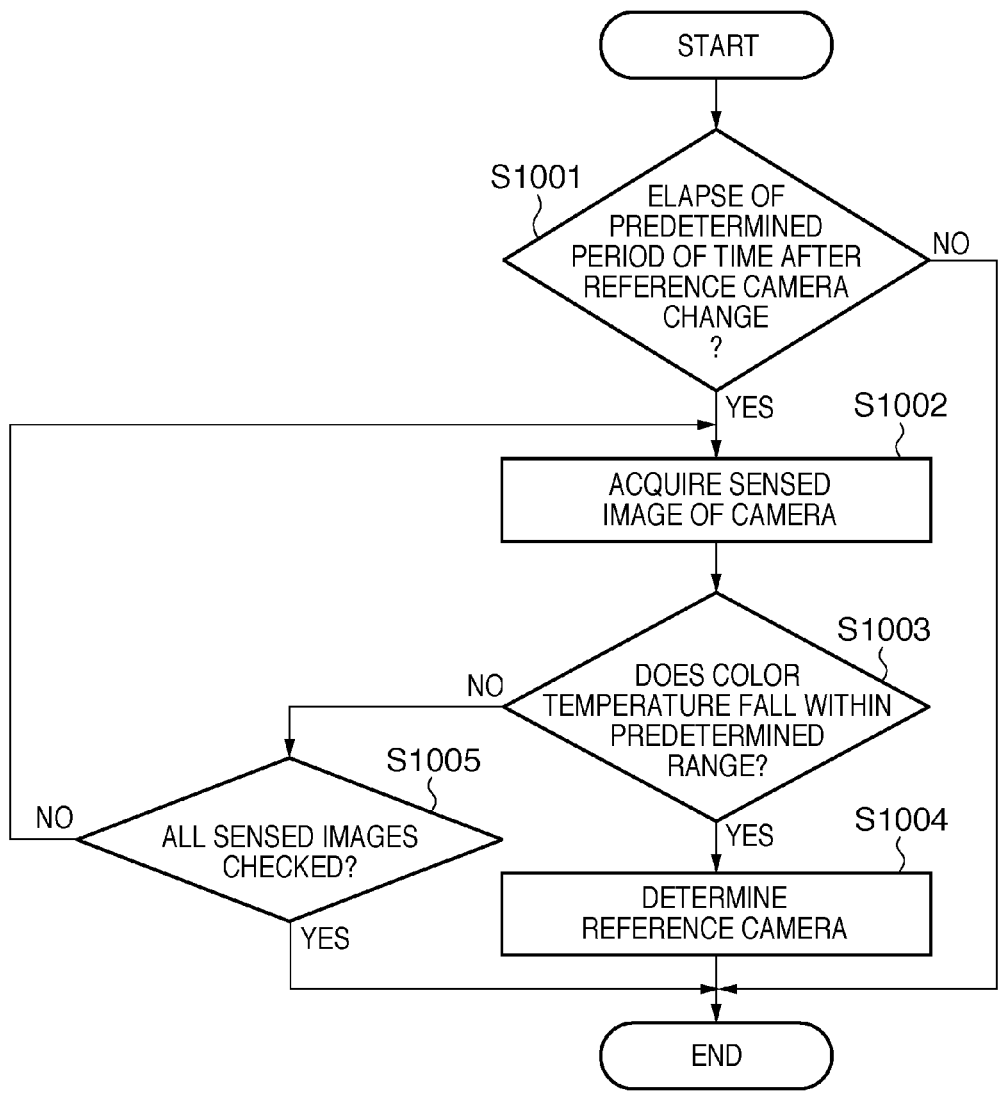
FIG. 35 is a flowchart showing reference camera determination processing according to the 13th embodiment.

In this embodiment, if the contact input unit 205 detects that the illumination switch 207 is turned on (S1101), the processes in step S1002 and subsequent steps in FIG. 35 are executed.

According to this embodiment, the same effects as in the 13th embodiment can be obtained in response to the ON timing of the illumination switch 207 as a trigger without storing any elapsed time period after the previous change of the reference camera in a determination reference storage unit 201.

In the above description, the camera control apparatus 1 includes the contact input unit 205. However, the contact input unit 205 may be arranged outside the camera control apparatus 1, and may transmit a packet that notifies a state change of the illumination switch 207 via the network 2 in response to that state change.

As an example of the state change outside the apparatus, a reference camera determination condition interlocked with the illumination switch 207 is adapted. However, the operation state such as power ON/OFF of each camera or the like may be detected, and may be used as a reference camera determination condition.

Figure 39:
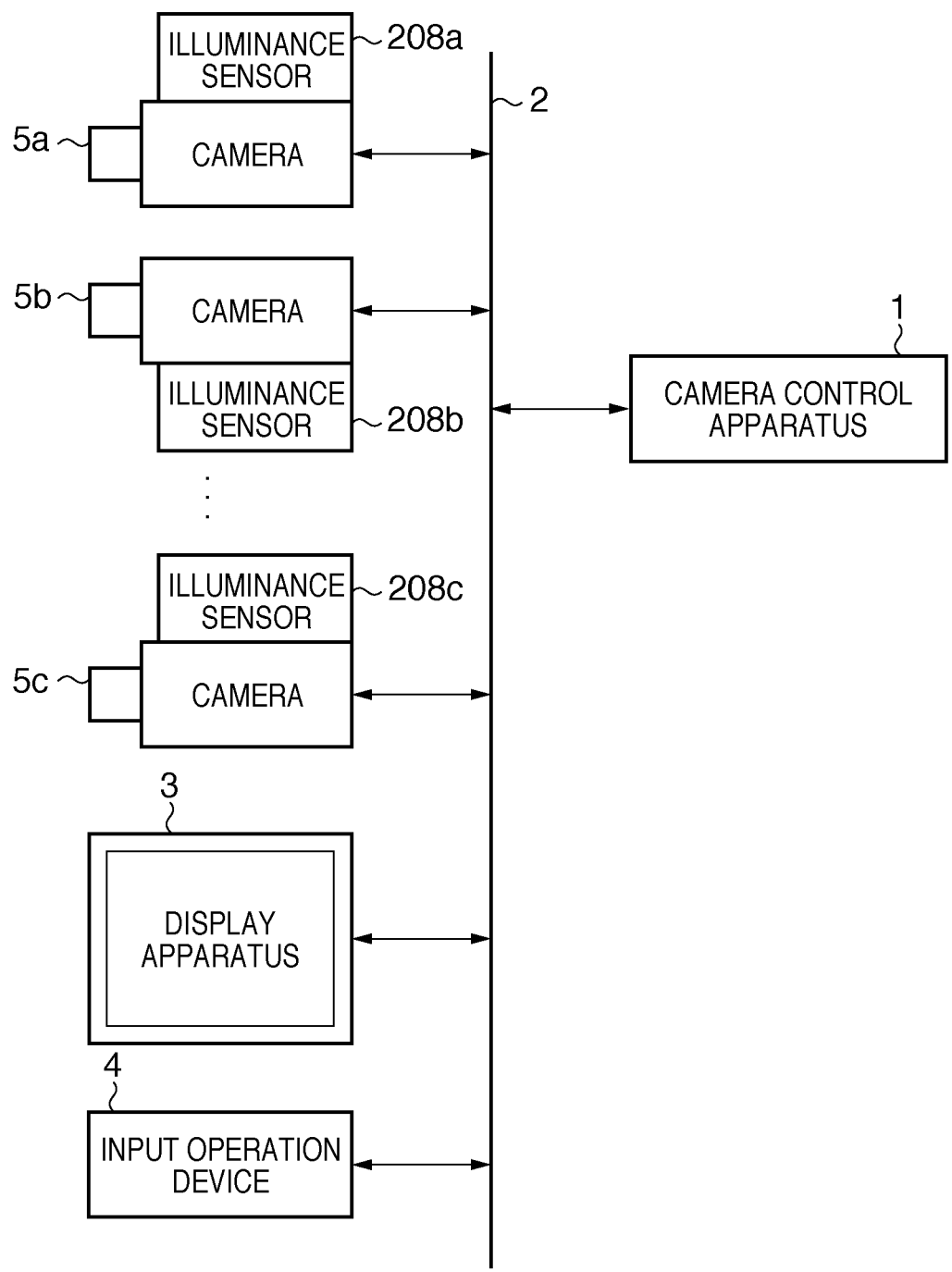
FIG. 39 is a block diagram showing the arrangement of a camera system according to the 15th embodiment.

A 15th first embodiment of the present invention will be described below referring to the drawings. FIG. 39 is a block diagram showing an example of the arrangement of a monitoring system to which a camera control apparatus according to the 15th embodiment is applied, and the same reference numerals in FIG. 39 denote the same parts as in FIG. 1 of the first embodiment.

In the system of the 15th embodiment, illuminance sensors 208a to 208c are respectively mounted on cameras 5a to 5c, as shown in FIG. 39. The illuminance sensors 208a to 208c are optical sensors which detect the brightness values of the image sensing ranges of the cameras 5a to 5c. The values detected by the illuminance sensors 208a to 208c are periodically transmitted from the cameras 5a to 5c to a camera control apparatus 1 at predetermined time intervals. The periodic transmission of the values is set in advance in the cameras 5a to 5c. Alternatively, the camera control apparatus 1 may request the cameras 5a to 5c to periodically transmit the values detected by the illuminance sensors 208a to 208c.

The following description will be given under the assumption that the illuminance sensors 208a to 208c are mounted on the cameras 5a to 5c. However, these sensors need not be mounted on the cameras as long as they can detect the brightness values of the image sensing ranges, and can exchange information with the camera control apparatus 1.

Figure 40:
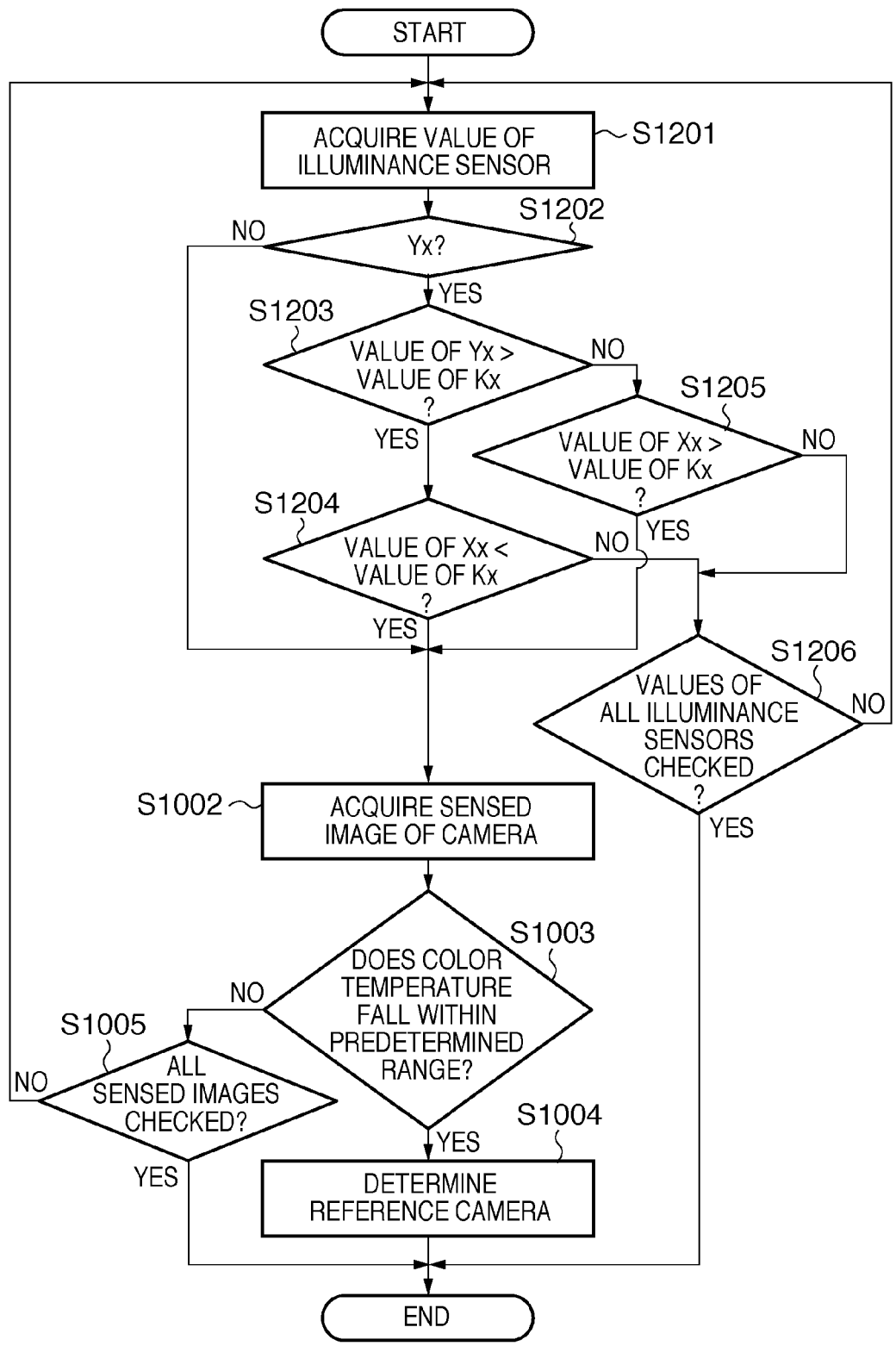
FIG. 40 is a flowchart showing reference camera determination processing according to the 15th embodiment.

The reference camera determination processing of a reference camera determination unit 202 will be described below with reference to the flowchart of FIG. 40. Note that the same step numbers in FIG. 40 denote the same processes (S1002 to S1005) as in FIG. 35, and a repetitive description thereof will be avoided. Also, x, y, and z in FIG. 40 correspond to any of identifiers a, b, and c of the cameras 5a to 5c to be processed.

In the following description, whether or not to satisfy the reference camera determination condition is checked in turn from the camera 5a.

A value Xa (to be simply referred to as Xa hereinafter) of the illuminance sensor 208a is acquired first (S1201).

It is checked if a previously acquired value Ya (to be simply referred to as Ya hereinafter) of the illuminance sensor 208a is stored in a determination reference storage unit 201 (S1202). If Ya is stored in the determination reference storage unit 201, it is checked if Ya is larger than a predetermined value Ka (to be simply referred to as Ka hereinafter) stored in the determination reference storage unit 201 (S1203). If Ya is not stored, Xa is stored in the determination reference storage unit 201, and the processes in step S1002 and subsequent steps in FIG. 35 are executed.

If the value of Ya is larger than Ka in step S1203, the value of Xa is stored in the determination reference storage unit 201, and it is checked if the value of Xa is smaller than Ka (S1204). If the value of Xa is smaller than Ka, the processes in step S1002 and subsequent steps in FIG. 35 are executed. If the value of Xa is larger than Ka, it is checked if the values of all the illuminance sensors have been checked (S1206). Since the values of all the illuminance sensors have not been checked yet, a value Xb of the illuminance sensor 208b is acquired (S1201), and the same checking process is executed for the illuminance sensor 208b. If the values of all the illuminance sensors have been checked, this processing ends without changing the reference camera.

If the value of Ya is smaller than Ka in step S1203, the value of Xa is stored in the determination reference storage unit 201, and it is checked if the value of Xa is larger than Ka (S1205). If the value of Xa is larger than Ka, the processes in step S1002 and subsequent steps in FIG. 35 are executed. If the value of Xa is smaller than Ka, it is checked if the values of all the illuminance sensors have been checked (S1206). In this case, since the values of all the illuminance sensors have not been checked yet, the value Xb of the illuminance sensor 208b is acquired (S1201), and the same checking process is executed for the illuminance sensor 208b.

According to the above embodiment, the same effects as in the 13th embodiment can be obtained using the periodically acquired values of the illuminance sensors without storing an elapsed time period after the previous change of the reference camera in the determination reference storage unit 201.

In the description of the above example, every time the value of each illuminance sensor is periodically acquired, the reference camera is changed. Alternatively, the reference camera may be changed using, for example, an average value of the periodically acquired values of each illuminance sensor or the like.

The example using the illuminance sensors have been explained. However, various other sensors which can acquire a state change of a sensed image may be used. For example, the illuminance may be determined based on the aperture value, shutter speed (exposure time), gain value, or the like of the camera.

Figure 41:
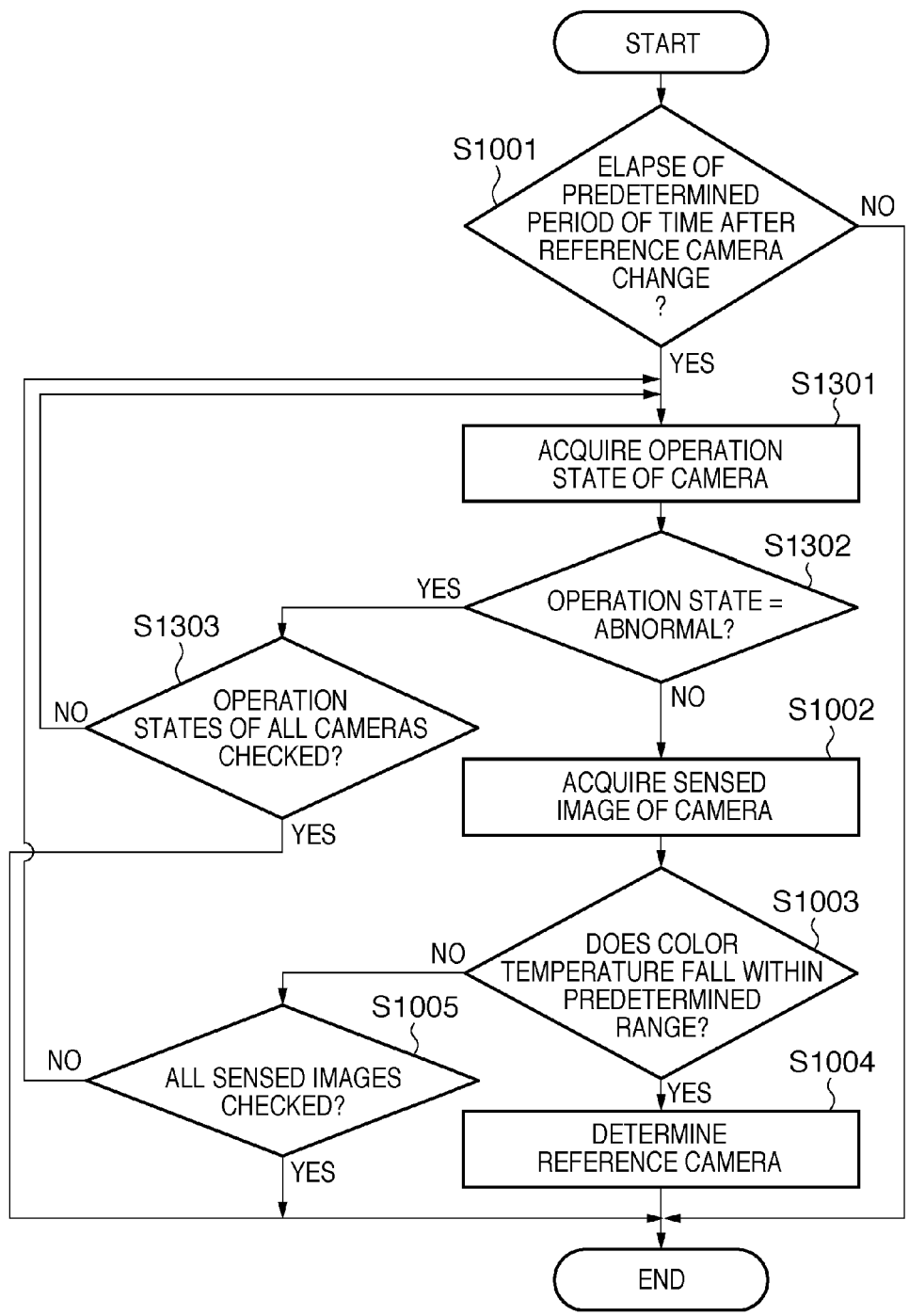
FIG. 41 is a flowchart showing reference camera determination processing according to the 16th embodiment.

A 16th embodiment of the present invention will be described below referring to the drawings. FIG. 41 is a flowchart showing reference camera determination processing by a camera system according to the 16th embodiment.

Note that the arrangements of the camera system and a camera control apparatus of this embodiment are the same as those in FIGS. 1 and 34, and a repetitive description thereof will be avoided.

Also, the same step numbers in FIG. 41 denote the same processes (S1001 to S1005) as in FIG. 35, and a repetitive description thereof will be avoided.

In the following description, whether or not to satisfy a reference camera determination condition is checked in turn from a camera 5a.

If it is determined in step S1001 that a predetermined period of time has elapsed after a reference camera was determined or changed, information associated with an operation state of the camera 5a is acquired (S1301). As the operation state, for example, information such as ON/OFF of a power supply of the camera 5a, attachment/detachment of a lens cap, ON/OFF of a focusing motor, and the like may be used.

A reference camera determination unit 202 checks if the operation state of the camera 5a is abnormal (S1302). If the operation state of the camera 5a is abnormal, the reference camera determination unit 202 checks if the process for checking the operation state is complete for all cameras (S1303). In this case, since the checking process is not complete for all the cameras yet, an operation state of a camera 5b is then acquired (S1301), and the operation state is checked in the same manner as in the camera 5a (S1302).

If it is determined in step S1303 that the process for checking the operation state is complete for all the cameras, since the operation states of all the cameras are abnormal, the processing ends without changing the reference camera.

On the other hand, if the operation state of the camera 5a is not abnormal in step S1302, the processes in step S1002 and subsequent steps are executed.

According to this embodiment, the same effects as in the 13th embodiment can be obtained according to the operation state of the camera after an elapse of a predetermined period of time since the reference camera was determined or changed.

Figure 42:
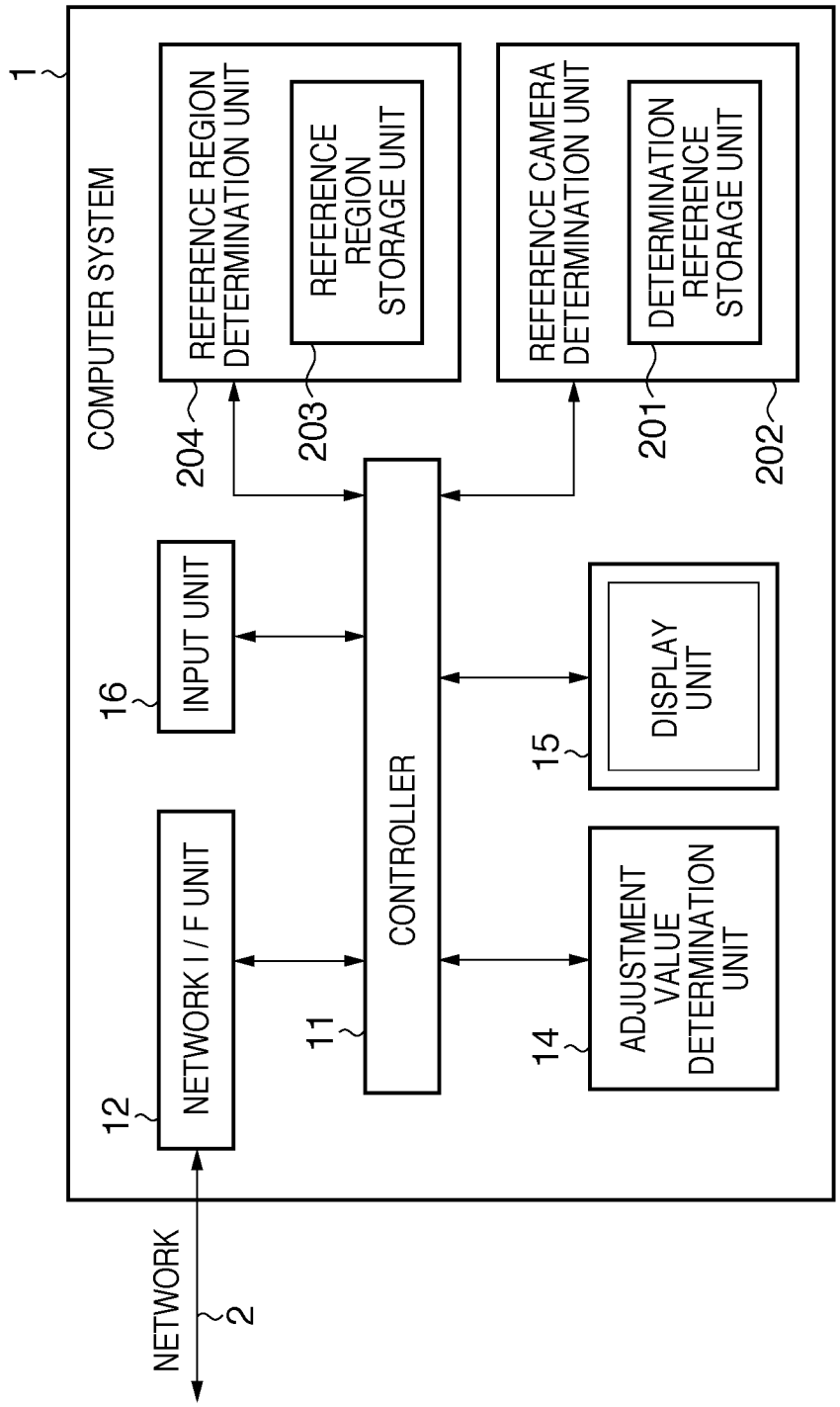
FIG. 42 is a block diagram showing the arrangement of a camera control apparatus according to the 17th embodiment.

A 17th embodiment of the present invention will be described below referring to the drawings. FIG. 42 is a block diagram showing the arrangement of a camera control apparatus according to the 17th embodiment, and the same reference numerals in FIG. 42 denote the same parts as in FIG. 1 of the first embodiment and FIG. 34 of the 13th embodiment. Also, the camera control apparatus of this embodiment is applied to the camera system shown in FIG. 6.

Note that in the camera system of FIG. 6, a display apparatus 3 and input operation device 4 are excluded from the arrangement shown in FIG. 1, and a camera control apparatus 1 incorporates a display unit 15 and input unit 16 instead, as shown in FIG. 42.

The display unit 15 is a display device such as a CRT, LCD, or the like, and displays images received from other cameras, a user interface (UI) screen of the camera control apparatus 1, and the like.

The input unit 16 may be implemented by a keyboard, buttons, mouse, and the like, or may be implemented by a touch panel and may be integrated with the display unit 15.

The user visually confirms images which are sensed by cameras 5a to 5c and are displayed on the display unit 15, and transmits a reference region designation command by operating the input unit 16.

The arrangements and operations of a reference camera determination unit 202 and the cameras 5a to 5c are as have been described in the 13th embodiment.

As described above, even when the camera control apparatus 1 incorporates the display unit and input unit, the same effects as in the 13th embodiment can be provided.

An 18th embodiment of the present invention will be described below referring to the drawings. The present invention can also be achieved when a computer program that implements the functions of the seventh to 17th embodiments is directly or remotely supplied to a system or apparatus. In this case, a program code itself read out from a storage medium implements the functions of the aforementioned embodiments, and the storage medium storing that program code constitutes the present invention.

An example of a system or apparatus which reads out and executes the program code stored in this storage medium is as shown in FIG. 8. Examples of the programs of the seventh to 12th embodiments are as shown in the flowcharts of FIGS. 16, 20, 22, 25, and 30.

With the above arrangement, the same effects as in the seventh to 12th embodiments can be provided.

FIG. 43 is a flowchart showing an example of a program which implements the functions of the 13th to 17th embodiments.

In FIG. 43, if it is determined in step S1003 that the color temperature of a sensed image acquired from a camera 5a falls outside a predetermined range stored in a determination reference storage unit 201, the process returns to step S1002 without checking if the process for checking whether or not to satisfy a reference camera determination condition is complete for all sensed images. In addition, the same step numbers in FIG. 43 denote the same processes (S1001 to S1004) as in FIG. 35, and a repetitive description thereof will be avoided.

After a reference camera is determined in step S1004, it is checked if an old reference region includes all W pixels in FIG. 5, and is reusable (S1401). If the old reference region is reusable, it is determined as a reference region (S1404).

On the other hand, if it is determined in step S1401 that the old reference region is not reusable, it is checked if a reference region designation command is received (S1402). If the reference region designation command is received, a region designated by the reference region designation command in each of images sensed by cameras 5a to 5c is determined as a reference region of each camera (S1404).

On the other hand, if the reference region designation command is not received, a region including W pixels as many as the predetermined number of pixels or more within a color difference range of a white extraction range W in FIG. 5 is detected from each of images sensed by the cameras 5a to 5c (S1403). The detected region is determined as a reference region of each camera (S1404).

After the reference regions are determined, color gain adjustment values which approximate color difference signals R−Y and B−Y of pixels in the reference regions of the cameras 5a and 5b are calculated and determined (S1405). For example, in FIG. 5, assuming that pixels in the reference region of the camera 5a have a value Wa, and those in the reference region of the camera 5b have a value Wb, the pixels in the reference region of the camera 5b are approximated to the value Wa. R and B gain adjustment values at that time are calculated. A camera control command which requests to change AWB control based on color gain adjustment values including these R and B gain adjustment values is transmitted to the camera 5b (S1406).

The processes in steps S1405 and S1406 are executed for the camera 5c in the same manner as in the sequence for the camera 5b.

As the storage medium for supplying the program code, for example, a flexible disk, hard disk, optical disk, magneto-optical disk, CD-ROM, CD-R, magnetic tape, nonvolatile memory card, ROM, DVD, and the like may be used.

The functions of the aforementioned embodiments can also be implemented not only when the computer executes the readout program but also when an OS or the like running on the computer executes some or all of actual processes based on an instruction of that program.

Furthermore, the functions of the aforementioned embodiments can also be implemented when the program read out from the storage medium is written in a memory of a function expansion board or unit which is inserted into or connected to the computer, and a CPU of the board or the like then executes some or all of the actual processes.

With the above arrangement, the same effects as in the 13th to 17th embodiments can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A camera control apparatus connected to a plurality of cameras via a network, the plurality of cameras each having a color adjustment unit adapted to perform color adjustment of a sensed image, the camera control apparatus including:

a receiver adapted to receive sensed images from the plurality of cameras;

a camera designation unit adapted to designate, from the plurality of cameras, a reference camera used as a color reference for the plurality of sensed images received from the plurality of cameras and to change the designated reference camera based on a sensed image;

an adjustment value determination unit adapted to determine a color adjustment value for another camera based on the sensed image of the reference camera and sensed image of the another camera; and a transmitter adapted to transmit the color adjustment value and a command to control the color adjustment unit to execute color adjustment based on the color adjustment value to the another camera via the network, wherein the camera designation unit changes the designated reference camera based on an elapsed time period after a previous change of the reference camera.

2. The apparatus according to claim 1, wherein the camera designation unit changes the designated reference camera based on a state change of a peripheral device.

3. The apparatus according to claim 1, wherein the camera designation unit changes the designated reference camera based on an operation state of each camera.

4. The apparatus according to claim 1, wherein the a camera designation unit changes the designated reference camera based on an illuminance of an image sensing range of each camera.

5. A camera control apparatus connected to a plurality of cameras via a network, the plurality of cameras each having a color adjustment unit adapted to perform color adjustment of a sensed image, the camera control apparatus including:
- a receiver adapted to receive sensed images from the plurality of cameras;
- a camera designation unit adapted to designate, from the plurality of cameras, a reference camera used as a color reference for the plurality of sensed images received from the plurality of cameras and to change the designated reference camera based on a sensed image;
- an adjustment value determination unit adapted to determine a color adjustment value for another camera based on the sensed image of the reference camera and sensed image of the another camera; and
- a transmitter adapted to transmit the color adjustment value and a command to control the color adjustment unit to execute color adjustment based on the color adjustment value to the another camera via the network,
- wherein the adjustment value determination unit determines a reference region including an equivalent color among the plurality of sensed images received from the plurality of cameras, in the sensed image received from the reference camera, and determines the color adjustment value for another camera based on the color of the reference region of the sensed image of the reference camera and the color of the region corresponding to the reference region in the sensed image of the another camera.

6. The apparatus according to claim 5, further comprising an input unit adapted to accept a designation command of the reference region via the network in response to a user's operation.

7. The apparatus according to claim 5, wherein the receiver receives a designation command of the reference region via the network.

8. The apparatus according to claim 6, wherein the adjustment value determination unit determines, as the reference region, a region including white or achromatic pixels not less than a predetermined number of pixels for each of the plurality of sensed images received from the plurality of cameras in a case that the input unit does not accept the designation command of the reference region.

9. The apparatus according to claim 7, wherein the adjustment value determination unit determines, as the reference region, a region including white or achromatic pixels not less than a predetermined number of pixels for each of the plurality of sensed images received from the plurality of cameras in a case that the receiver does not receive the designation command of the reference region.

10. The apparatus according to claim 5, wherein the color adjustment unit performs white balance adjustment of the sensed image of each camera, and
wherein the color adjustment value is an offset value capable of addition or subtraction to a color gain which is used to perform the white balance adjustment in the camera which receives the color adjustment value.

11. The apparatus according to claim 1, further comprising a display unit adapted to display the sensed images received from the plurality of cameras.

12. A camera system comprising:
- a plurality of cameras each having a color adjustment unit adapted to perform color adjustment of a sensed image; and
- a camera control apparatus connected to the plurality of cameras via a network, the camera control apparatus including:
  - a receiver adapted to receive sensed images from the plurality of cameras;
  - a camera designation unit adapted to designate, from the plurality of cameras, a reference camera used as a color reference for the plurality of sensed images received from the plurality of cameras and to change the designated reference camera based on a sensed image;
  - an adjustment value determination unit adapted to determine a color adjustment value for another camera based on the sensed image of the reference camera and sensed image of the another camera; and
  - a transmitter adapted to transmit the color adjustment value and a command to control the color adjustment unit to execute color adjustment based on the color adjustment value to the another camera via the network,
- wherein the camera designation unit changes the designated reference camera based on an elapsed time period after a previous change of the reference camera,
- wherein each camera includes a transmitter adapted to transmit a sensed image to the camera control apparatus via the network, and
- wherein the color adjustment unit of each camera performs the command and color adjustment of the sensed image based on the color adjustment value received from the camera control apparatus via the network.

13. A camera control method of controlling a plurality of cameras, each having a color adjustment unit adapted to execute color adjustment of a sensed image, via a network, the camera control method comprising:
- receiving sensed images from the plurality of cameras;
- designating, from the plurality of cameras, a reference camera used as a color reference for the plurality of sensed images received from the plurality of cameras;
- changing the designated reference camera based on a sensed image;
- determining a color adjustment value for another camera based on the sensed image of the reference camera and sensed image of the another camera; and
- transmitting the color adjustment value and a command to control the color adjustment unit to execute color adjustment based on the color adjustment value to the another camera via the network,
- wherein the designated reference camera is changed based on an elapsed time period after a previous change of the reference camera.

14. A non-transitory computer-readable medium containing computer-executable instructions for controlling a plurality of cameras, each having a color adjustment unit adapted to execute color adjustment of a sensed image, via a network, the medium comprising:
- computer-executable instructions for receiving sensed images from the plurality of cameras;
- computer-executable instructions for designating, from the plurality of cameras, a reference camera used as a color reference for the plurality of sensed images received from the plurality of cameras;
- computer-executable instructions for changing the designated reference camera based on a sensed image;
- computer-executable instructions for determining a color adjustment value for another camera based on the sensed image of the reference camera and sensed image of the another camera; and
- computer-executable instructions for transmitting the color adjustment value and a command to control the color adjustment unit to execute color adjustment based on the color adjustment value to the another camera via the network,
- wherein the designated reference camera is changed based on an elapsed time period after a previous change of the reference camera.

15. A camera system comprising:
- a plurality of cameras each having a color adjustment unit adapted to perform color adjustment of a sensed image; and
- a camera control apparatus connected to the plurality of cameras via a network, the camera control apparatus including:
  - a receiver adapted to receive sensed images from the plurality of cameras;
  - a camera designation unit adapted to designate, from the plurality of cameras, a reference camera used as a color reference for the plurality of sensed images received from the plurality of cameras and to change the designated reference camera based on a sensed image;
  - an adjustment value determination unit adapted to determine a color adjustment value for another camera based on the sensed image of the reference camera and sensed image of the another camera; and
  - a transmitter adapted to transmit the color adjustment value and a command to control the color adjustment unit to execute color adjustment based on the color adjustment value to the another camera via the network,
- wherein the adjustment value determination unit determines a reference region including an equivalent color among the plurality of sensed images received from the plurality of cameras, in the sensed image received from the reference camera, and determines the color adjustment value for another camera based on the color of the reference region of the sensed image of the reference camera and the color of the region corresponding to the reference region in the sensed image of the another camera,
- wherein each camera includes a transmitter adapted to transmit a sensed image to the camera control apparatus via the network, and
- wherein the color adjustment unit of each camera performs the command and color adjustment of the sensed image based on the color adjustment value received from the camera control apparatus via the network.

16. A camera control method of controlling a plurality of cameras, each camera having a color adjustment unit adapted to execute color adjustment of a sensed image, via a network, the camera control method comprising:
- receiving sensed images from the plurality of cameras;
- designating, from the plurality of cameras, a reference camera used as a color reference for the plurality of sensed images received from the plurality of cameras;
- changing the designated reference camera based on a sensed image;
- determining a color adjustment value for another camera based on the sensed image of the reference camera and sensed image of the another camera; and
- transmitting the color adjustment value and a command to control the color adjustment unit to execute color adjustment based on the color adjustment value to the another camera via the network,
- wherein a reference region including an equivalent color among the plurality of sensed images received from the plurality of cameras, in the sensed image received from the reference camera, is determined, and
- wherein the color adjustment value for another camera is determined based on the color of the reference region of the sensed image of the reference camera and the color of the region corresponding to the reference region in the sensed image of the another camera.

17. A non-transitory computer-readable medium containing computer-executable instructions for controlling a plurality of cameras, each camera having a color adjustment unit adapted to execute color adjustment of a sensed image, via a network, the medium comprising:
- computer-executable instructions for receiving sensed images from the plurality of cameras;
- computer-executable instructions for designating, from the plurality of cameras, a reference camera used as a color reference for the plurality of sensed images received from the plurality of cameras;
- computer-executable instructions for changing the designated reference camera based on a sensed image;
- computer-executable instructions for determining a color adjustment value for another camera based on the sensed image of the reference camera and sensed image of the another camera; and
- computer-executable instructions for transmitting the color adjustment value and a command to control the color adjustment unit to execute color adjustment based on the color adjustment value to the another camera via the network,
- wherein a reference region including an equivalent color among the plurality of sensed images received from the plurality of cameras, in the sensed image received from the reference camera, is determined, and
- wherein the color adjustment value for another camera is determined based on the color of the reference region of the sensed image of the reference camera and the color of the region corresponding to the reference region in the sensed image of the another camera.

18. The apparatus according to claim 1, wherein the camera designation unit changes the designated reference camera based on information associated with color temperatures of the sensed images.

* * * * *